United States Patent
Yang

(10) Patent No.: US 7,977,841 B2
(45) Date of Patent: Jul. 12, 2011

(54) ELECTRIC MACHINERY WITH A CONDUCTION WINDING EXCITED MAGNETIC POLES WRAPS PM MAGNETIC POLE

(76) Inventor: Tai-Her Yang, Dzan-Hwa (TW)

(*) Notice: Subject to any disclaimer, the term of this patent is extended or adjusted under 35 U.S.C. 154(b) by 313 days.

(21) Appl. No.: 12/000,691

(22) Filed: Dec. 17, 2007

(65) Prior Publication Data

US 2009/0152956 A1    Jun. 18, 2009

(51) Int. Cl.
*H02K 1/00* (2006.01)
(52) U.S. Cl. ............................................. 310/181
(58) Field of Classification Search .................. 310/181, 310/112–114
See application file for complete search history.

(56) References Cited

U.S. PATENT DOCUMENTS

| | | | | |
|---|---|---|---|---|
| 2,968,755 | A * | 1/1961 | Baermann | 318/400.41 |
| 4,673,852 | A * | 6/1987 | Geiger | 388/823 |
| 6,262,508 | B1 * | 7/2001 | Shibayama et al. | 310/181 |
| 6,756,870 | B2 * | 6/2004 | Kuwahara | 335/224 |
| 6,777,842 | B2 * | 8/2004 | Horst | 310/154.11 |
| 6,784,585 | B2 * | 8/2004 | Shah et al. | 310/181 |
| 7,414,343 | B2 * | 8/2008 | Arita et al. | 310/181 |
| 7,501,733 | B2 * | 3/2009 | Takeuchi | 310/156.35 |

* cited by examiner

*Primary Examiner* — Dang D Le
(74) *Attorney, Agent, or Firm* — Bacon & Thomas, PLLC

(57) ABSTRACT

An electric machinery provided with a PM magnetic pole wrapped by conduction winding excited magnetic poles is related to an innovative design of having a PM magnetic pole wrapped by individual magnetic poles of conduction winding excited so to prevent the PM magnetic pole from falling off due to vibration and to prevent from weakening magnetic force by inverse excitation when the electric machinery is running.

23 Claims, 56 Drawing Sheets

US 7,977,841 B2

ELECTRIC MACHINERY WITH A CONDUCTION WINDING EXCITED MAGNETIC POLES WRAPS PM MAGNETIC POLE

BACKGROUND OF THE INVENTION (a) Field of the Invention

The present invention is related to an electric machinery provided with a PM magnetic pole wrapped by conduction winding excited magnetic poles, and more particularly, to one that has a PM magnetic pole wrapped in the mid section of the magnetic circuit from an individual magnetic pole excited by conduction winding, or between an individual magnetic pole and a magnetic circuit, or between two individual magnetic circuits with different polarities of an individual magnetic pole excited by conduction winding and another individual magnetic pole excited by conduction winding of different polarities mounted in various types of electric machinery of the prior art.

(b) Description of the Prior Art

A magnetic polar structure to produce EME operation is mounted in a conventional DC or AC revolving or linear electric machinery, whether it is of commutator brush, brushless, ring brush, synchronous, asynchronous, internal revolving, external revolving, revolving with the electric magnetic structure at middle, double-acting, triple-acting, multi-layer, multi-ring, linear, DC brushless, or inverter electric machinery, or an electric machinery functioning as a generator or as a motor or as both a generator and a motor, coupling transmission device, as an EME vortex coupling transmission device, or an EME vortex braking device.

The magnetic pole structure of the prior art is comprised of:
PM magnetic pole structure;
DC or AC conduction winding excited individual magnetic pole structure; and
A conduction winding excited individual magnetic pole having on its pole-face disposed with an accumulative or differential excitation PM magnetic pole.

As illustrated in FIG. 1 of the accompanying drawings for a schematic view showing a structure of an accumulative or differential excitement PM magnetic pole disposed on a pole-face of a conventional conduction winding excited individual magnetic pole, a PM magnetic pole 103 of accumulative excitement is disposed on a surface of a conduction winding 100 excited magnetic pole 101. The structure as illustrated in FIG. 1 provides advantage of reduction of excitement current but it is found with a flaw that the PM magnetic pole is vulnerable to falling off due to vibration or that magnetic force is weakened due to inverse excitation when the electric machinery is running; and the same flaw is also found with the structure of the PM magnetic pole.

SUMMARY OF THE INVENTION

The primary purpose of the present invention is related to an electric machinery provided with a PM magnetic pole wrapped by conduction winding excited magnetic poles, and more particularly, to one that has a PM magnetic pole wrapped in the mid section of the magnetic circuit from an individual magnetic pole excited by conduction winding, or between an individual magnetic pole and a magnetic circuit, or between two individual magnetic circuits with different polarities of an individual magnetic pole excited by conduction winding and another individual magnetic pole excited by conduction winding of different polarities mounted in various types of electric machinery of the prior art.

With an innovative design of having the PM magnetic pole to be wrapped by individual magnetic poles of conduction winding excited, the electric machinery provided with the PM magnetic pole wrapped by conduction winding excited magnetic poles of the present invention is capable of preventing the PM magnetic pole from falling off due to vibration and preventing magnetic force from being weakened by inverse excitation when the electric machinery is running.

Figure 1:
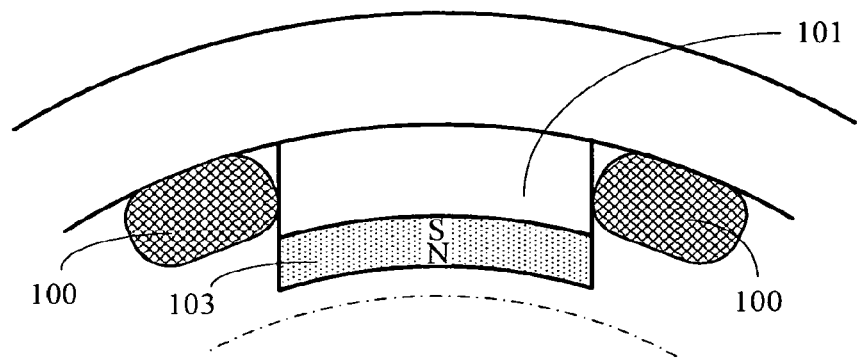
FIG. 1 is a schematic view showing a structure of an accumulative or differential excitement PM magnetic pole disposed on a pole-face of a conventional conduction winding excited individual magnetic pole.

LISTING OF COMPONENT AND CORRESPONDING LABEL 100 conduction winding
101 magnetic pole
102 magnetic circuit
103 PM magnetic pole
1 inner layer electric machinery structure
2 outer layer electric machinery structure
11 inner layer electric machinery structure of the cylinder electric machinery
12 outer layer electric machinery structure of the cylinder electric machinery
21 inner ring electric machinery structure of the coaxial 3-ring type electric machinery
22 mid ring electric machinery structure of the coaxial 3-ring type electric machinery
23 outer ring electric machinery structure of the coaxial 3-ring type electric machinery
31 inner layer plate electric machinery structure of the coaxial double layer type plate electric machinery
32 outer layer plate electric machinery structure of the coaxial double layer type plate electric machinery
41 inner layer plate electric machinery structure of the coaxial 3-layer type plate electric machinery
42 mid layer plate electric machinery structure of the coaxial 3-layer type plate electric machinery
43 outer layer plate electric machinery structure of the coaxial 3-layer type plate electric machinery
51 inner layer linear electric machinery structure of the linear double layer type electric machinery
52 outer layer linear electric machinery structure of the linear double layer type electric machinery
61 inner layer linear electric machinery structure of the linear 3-layer type electric machinery
62 mid layer linear electric machinery structure of the linear 3-layer type electric machinery
63 outer layer linear electric machinery structure of the linear 3-layer type electric machinery
1011, 1012, 1013, 1014 protective cap

DETAILED DESCRIPTION OF THE PREFERRED EMBODIMENTS

The present invention discloses an electric machinery provided with a PM magnetic pole wrapped by a conduction winding excited magnetic pole is related to a PM magnetic pole 103 wrapped by a conduction winding 100 excited magnetic pole 101 and a magnetic circuit 102 mounted in various types of the electric machinery of the prior art, wherein it is characterized by having the polarities between the conduction winding 100 excited individual magnetic pole 101 and the wrapped PM magnetic pole 103 is either an accumulative excitement effect of the same polarity or a differential excitement of opposite polarities;

The electric machinery provided with a PM magnetic pole wrapped by a conduction winding excited magnetic pole of the present invention, whereof ways to wrap the PM magnetic pole 103 is to form one or more than one side of the magnetic circuits made of permeable material between two magnetic poles of different polarities of the PM magnetic pole 103 after the combination of the magnetic pole 101 disposed with a conduction winding 100 and the magnetic circuit 102 whereof the magnetic circuit covering across the two magnetic poles of different polarities on the PM magnetic poles constitutes a permeable magnetic circuit wrapped with permeance on at least one side or overall for passing through partial magnetic line of force on the PM magnetic pole 103 while the PM magnetic pole 103 remains to form partial strength of the magnetic field on the pole-face of the magnetic pole 101, whereby the function is that when the PM magnetic pole 103 being inversely excited in the course of the operation, two magnetic poles of different polarities on the PM magnetic pole 103 keeps closed magnetic circuit to maintain its magnetic line of force so as to enhance the property to against inverse excitation.

The electric machinery provided with a PM magnetic pole wrapped by a conduction winding excited magnetic pole of the present invention, of which the magnetic pole 102 for coupling the magnetic pole 101 and the magnetic pole 101 for disposing the conduction winding is comprised of a material of silicon steel sheets, steel, or iron providing good permeability and made in an integral part or a stack of multiple sheets by lamination, or made by metallurgy from the dust of permeable material; a pole-face of the magnetic pole 101 faces a structure of another electric machinery that interacts to execute EME; and the pole-face of the magnetic pole 101 may be selected to indicate a convex, concave, or flat surface, or may be further disposed with a groove to indicate protrusion and indention pattern or a specific geometric form as applicable.

Figure 2:
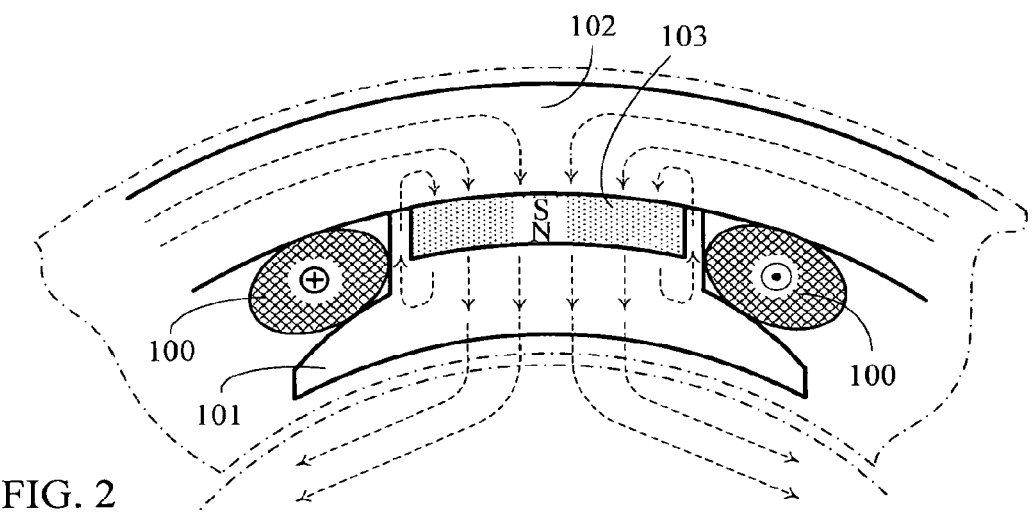
FIG. 2 is a schematic view showing a PM magnetic pole structure of the present invention applied in an individual magnetic pole wrapped between a conduction winding excited individual magnetic pole and a magnetic circuit that is capable of indicating accumulative excitement for the conduction winding excited individual magnetic pole.
Figure 3:
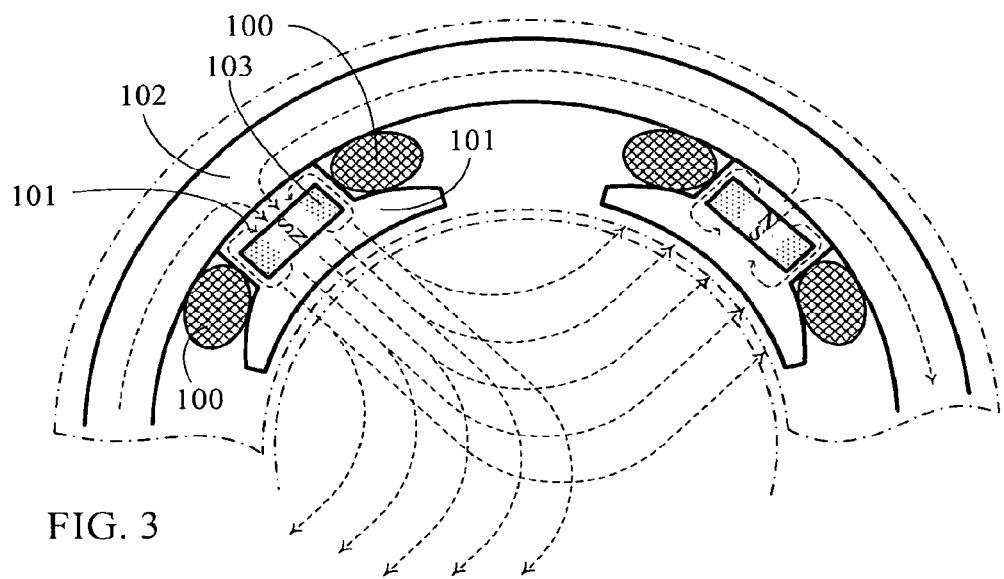
FIG. 3 is a schematic view showing a PM magnetic pole structure of the present invention applied in an individual magnetic pole wrapped between a conduction winding excited individual magnetic pole and a magnetic circuit that is capable of indicating differential excitement for the conduction winding excited individual magnetic pole.
Figure 4:
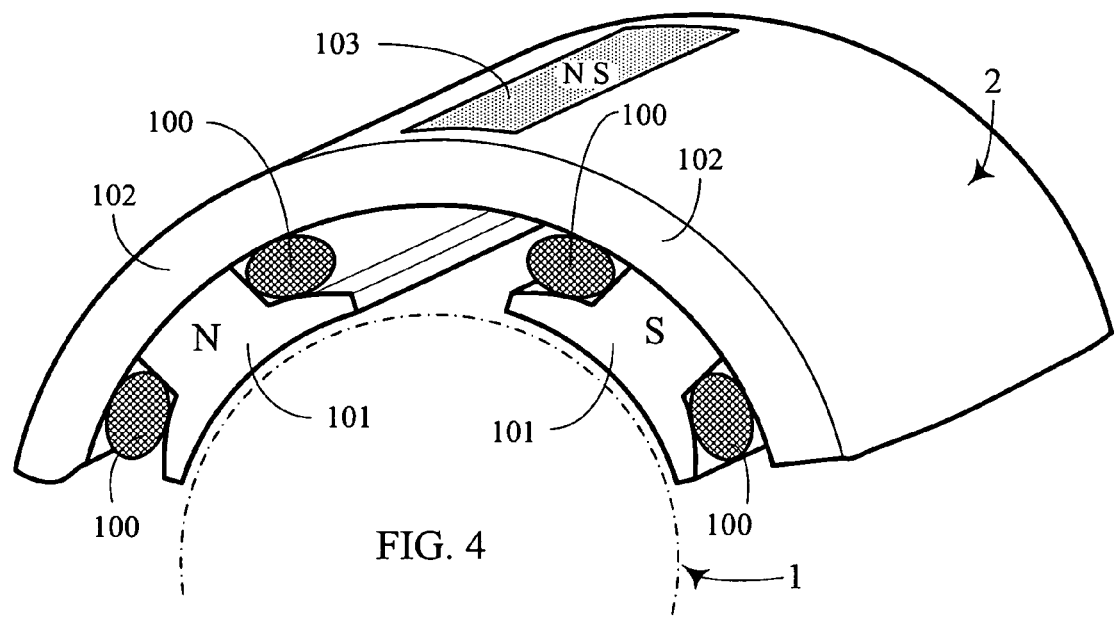
FIG. 4 is a schematic view showing a PM magnetic pole structure of the present invention applied in an individual magnetic pole wrapped in a mid section of a magnetic circuit that is capable of indicating accumulative excitement for each conduction winding excited individual magnetic pole of different polarities disposed on both ends of the magnetic circuit.

The PM magnetic pole is disposed in the following methods:

1. The PM magnetic pole 103 is disposed to be wrapped between a conduction winding 100 excited individual magnetic pole 101 and a magnetic circuit 102 mounted in various types of the electric machinery of the prior art, and wherein the relation of the polarity between the excited polarity of the conduction winding 100 and the PM magnetic pole 103 indicates the electric machinery property of either accumulative excitement or differential excitement as illustrated in FIG. 2 for a schematic view showing a PM magnetic pole structure of the present invention applied in an individual magnetic pole wrapped between a conduction winding excited individual magnetic pole and a magnetic circuit that is capable of indicating accumulative excitement for the conduction winding excited individual magnetic pole;

2. The PM magnetic pole 103 is disposed to be wrapped in the mid section of the conduction winding 100 excited magnetic pole 101, and wherein the relation of the polarity between the excited polarity of the conduction winding 100 and the PM magnetic pole 103 indicates the electric machinery property of either accumulative excitement or differential excitement as illustrated in FIG. 3 showing a PM magnetic pole structure of the present invention applied in an individual magnetic pole wrapped between a conduction winding excited individual magnetic pole and a magnetic circuit that is capable of indicating differential excitement for the conduction winding excited individual magnetic pole;

3. The PM magnetic pole 103 is disposed to be mounted securely or wrapped by the mid section of the magnetic circuit 102 between the conduction winding 100 excited individual magnetic poles 101 with different polarities, and wherein the relation of the polarity between the excited polarity of the conduction winding 100 and the PM magnetic pole 103 indicates the electric machinery property of either accumulative excitement or differential excitement as illustrated in FIG. 4 showing a PM magnetic pole structure of the present invention applied in an individual magnetic pole wrapped in a mid section of a magnetic circuit that is capable of indicating accumulative excitement for each conduction winding excited individual magnetic pole of different polarities disposed on both ends of the magnetic circuit.

Various structural types of the electric machinery provided with a PM magnetic pole wrapped by a conduction winding excited magnetic pole of the present invention may be applied in a DC or AC revolution electrical machinery or a linear electric machinery including commutator brush, brushless, ring brush, synchronous, asynchronous, internal revolving, external revolving, revolving at the middle of the electric machinery, double-acting, triple-acting, multi-layer type, multi-ring type, linear, DC brushless, or inverter electric machinery, or an electric machinery functioning as a generator or as a motor or as both a generator and a motor, coupling transmission device, as an EME vortex coupling transmission device, or an EME vortex braking device for functional operation.

The electric machinery provided with a PM magnetic pole wrapped by conduction winding excited magnetic poles is disposed with a magnetic pole 101 to wrap PM magnetic pole 103 jointly with the magnetic circuit 102; the magnetic circuit 102 or the magnetic pole 101 is comprised of a material of silicon steel sheets, steel, or iron providing good permeability and made in an integral part or a stack of multiple sheets by lamination, or made by metallurgy from the dust of permeable material; a pole-face of the magnetic pole 101 faces a structure of another electric machinery that interacts to execute EME; and the pole-face of the magnetic pole 101 may be selected to indicate a convex, concave, or flat surface, or may be further disposed with a groove to indicate protrusion and indention pattern or a specific geometric form as applicable.

The electric machinery provided with a PM magnetic pole wrapped by conduction winding excited magnetic poles by taking advantage of an innovative design of having a PM magnetic pole wrapped by conduction winding excited individual magnetic poles is able to prevent the PM magnetic pole from falling off due to vibration and to prevent from weakening magnetic force by inverse excitation when the electric machinery is running.

Figure 5:
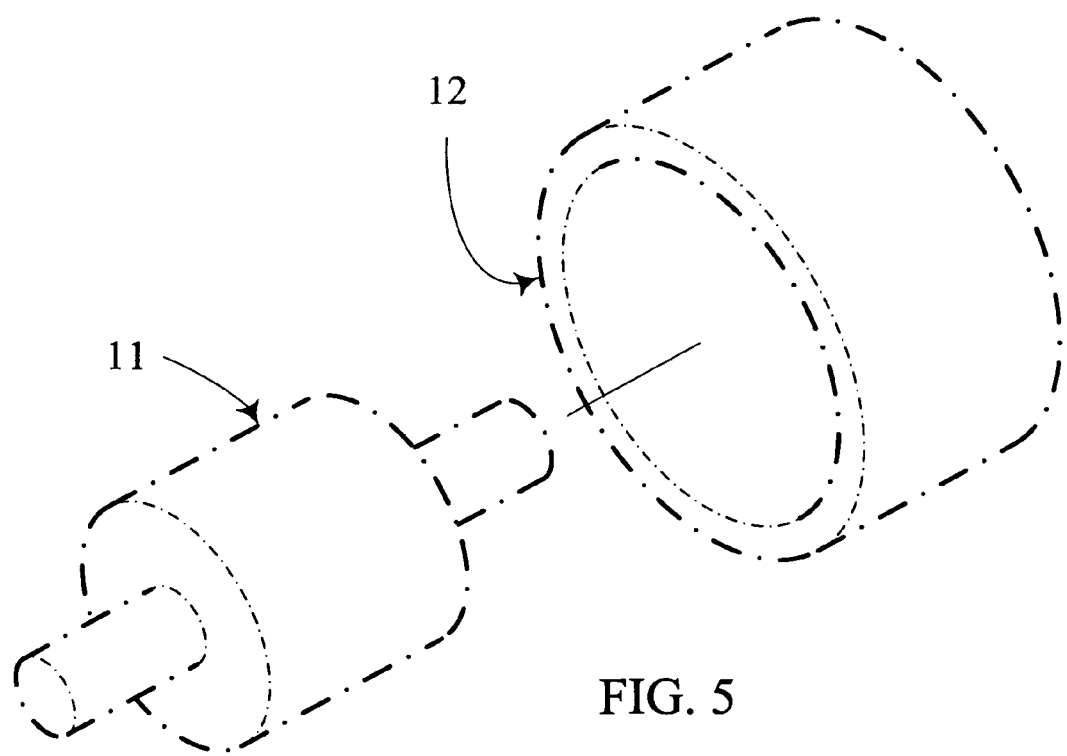
FIG. 5 is a schematic view showing a summary profile of a structure of a main unit of a conduction device of the present invention applied in a cylinder electric machinery without casing, bearing, locking member, cooling van, and optional conductive device.
Figure 6:
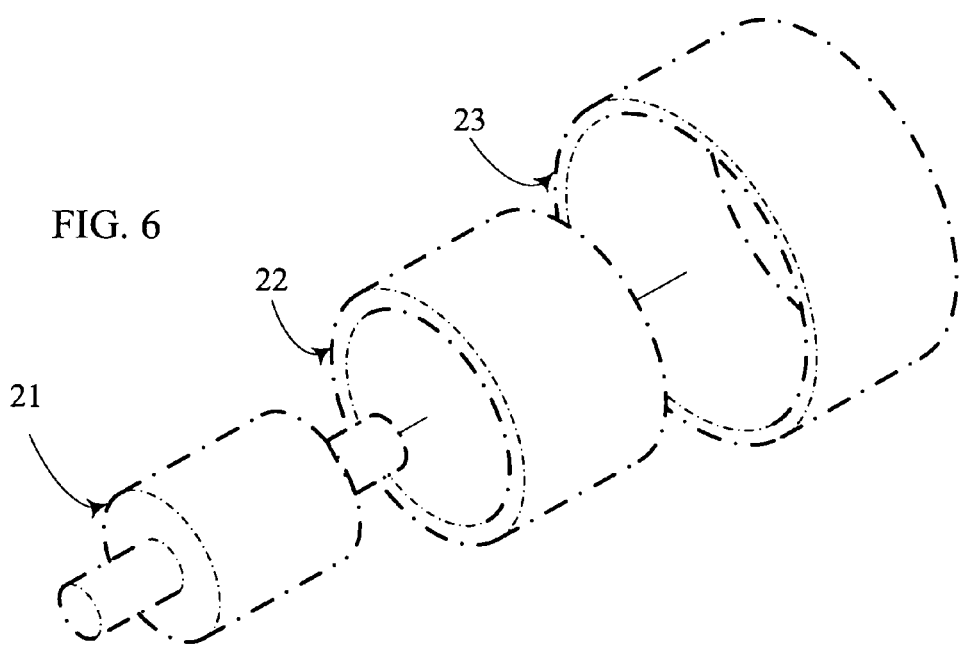
FIG. 6 is a schematic view showing a summary profile of a structure of a main unit of a conduction device of the present invention applied in a coaxial 3-ring type electric machinery without casing, bearing, locking member, cooling van, and optional conductive device.
Figure 7:
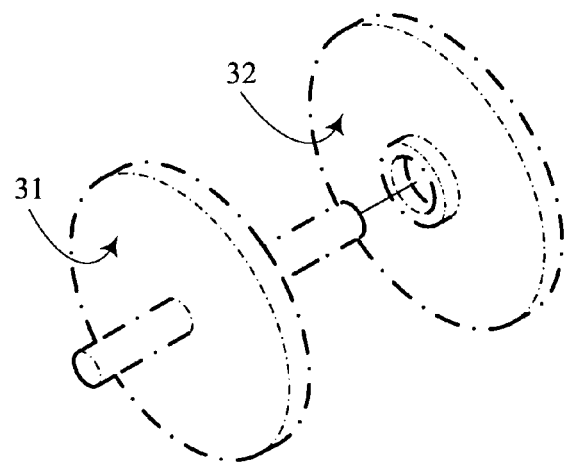
FIG. 7 is a schematic view showing a summary profile of a structure of a main unit of a conduction device of the present invention applied in a coaxial double layer type plate electric machinery without casing, bearing, locking member, cooling van, and optional conductive device.
Figure 8:
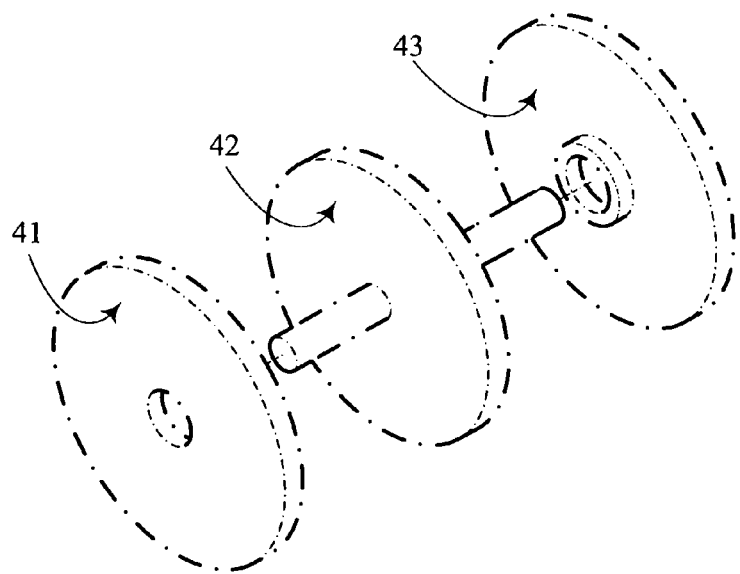
FIG. 8 is a schematic view showing a summary profile of a structure of a main unit of a conduction device of the present invention applied in a coaxial 3-layer type plate electric machinery without casing, bearing, locking member, cooling van, and optional conductive device.
Figure 9:
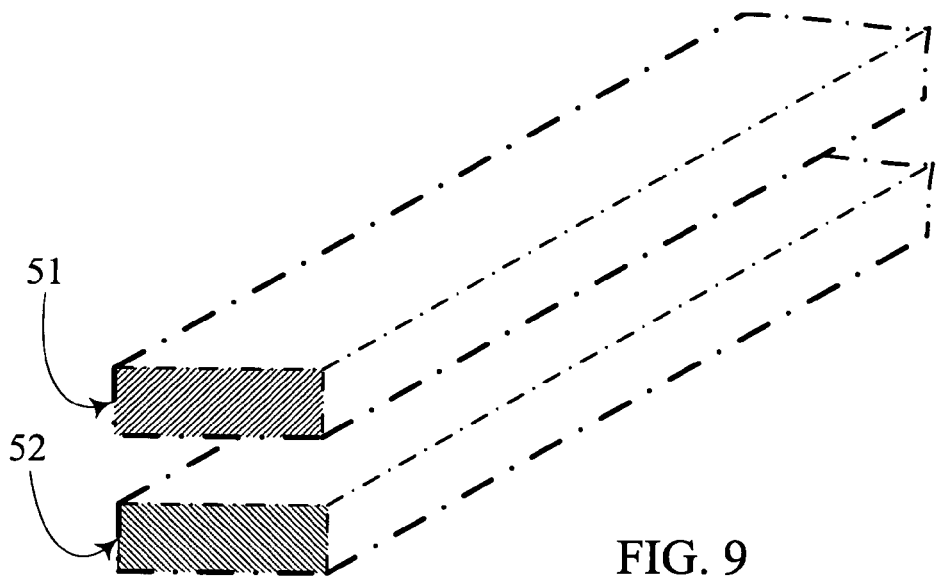
FIG. 9 is a schematic view showing a summary profile of a structure of a main unit of a conduction device of the present invention applied in a double layer type linear electric machinery without casing, bearing, locking member, cooling van, and optional conductive device.
Figure 10:
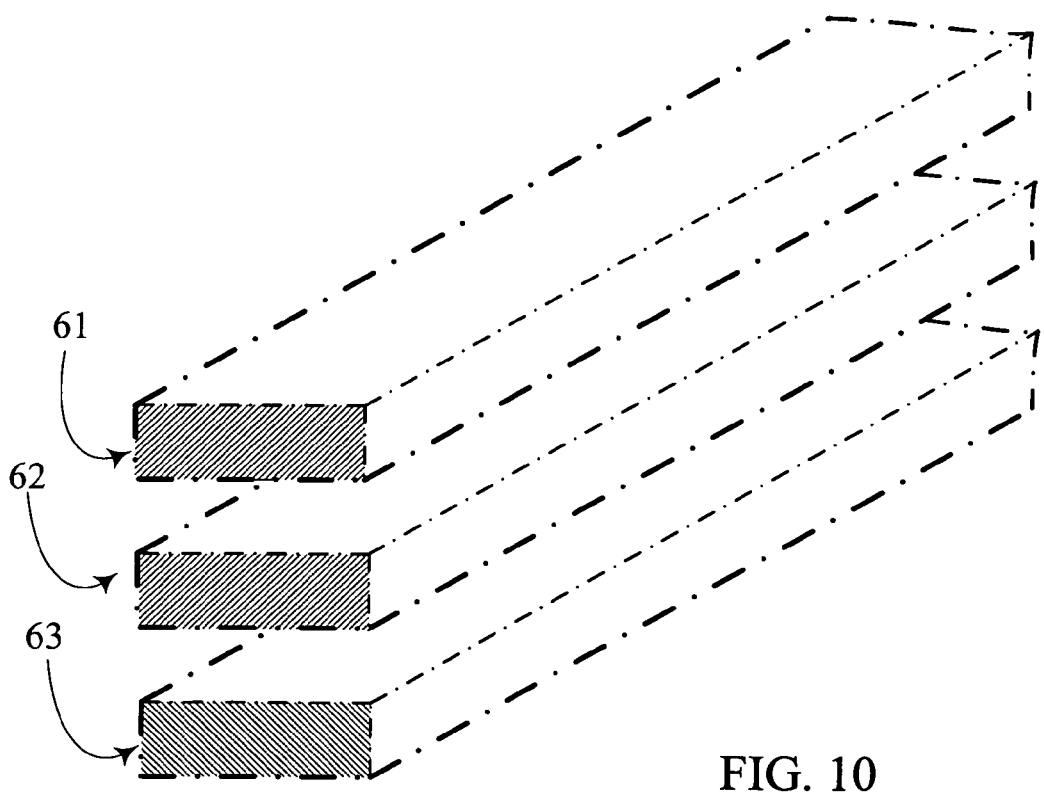
FIG. 10 is a schematic view showing a summary profile of a structure of a main unit of a conduction device of the present invention applied in a 3-layer type linear electric machinery without casing, bearing, locking member, cooling van, and optional conductive device.

Types of electric machinery for applying the electric machinery provided with a PM magnetic pole wrapped by conduction winding excited magnetic poles of the present invention include:

1. A cylinder electric machinery in a construction comprised of an inner layer electric machinery structure and an outer layer electric machinery structure, comprises an inner layer electric machinery structure 11 and an outer layer electric machinery structure 12 as illustrated in FIG. 5 showing a summary profile of a structure of a main unit of a conduction device of the present invention applied in a cylinder electric machinery without casing, bearing, locking member, cooling van, and optional conductive device;

2. A coaxial 3-ring type electric machinery to engage in coaxial operation by insertion of an inner ring, a mid ring, and the outer ring electric machinery structures comprises the inner ring electric machinery structure 21, the mid ring electric machinery structure 22, and the outer ring electric machinery structure 23 as illustrated in FIG. 6 showing a summary profile of a structure of a main unit of a conduction device of the present invention applied in a coaxial 3-ring type electric machinery without casing, bearing, locking member, cooling van, and optional conductive device;

3. A coaxial double layer type plate electric machinery comprised of two layers of electric machinery structure laminated to engage in coaxial operation comprises the inner layer plate electric machinery structure 31 and the outer layer plate electric machinery structure 32 as illustrated in FIG. 7 showing a summary profile of a structure of a main unit of a conduction device of the present invention applied in a coaxial double layer type plate electric machinery without casing, bearing, locking member, cooling van, and optional conductive device;

4. A coaxial 3-layer type plate electric machinery comprised of an inner, a mid, and an outer layer electric machinery structures laminated to engage in coaxial operation comprises the inner layer plate electric machinery structure 41, the mid layer plate electric machinery structure 42, and the outer layer plate electric machinery structure 43 as illustrated in FIG. 8 showing a summary profile of a structure of a main unit of a conduction device of the present invention applied in a coaxial 3-layer type plate electric machinery without casing, bearing, locking member, cooling van, and optional conductive device;

5. A linearly coupled linear double layer type electric machinery comprised of two layers of linear electric machinery structures comprises the inner layer linear electric machinery structure 51 and the outer layer linear electric machinery structure 52 as illustrated in FIG. 9 showing a summary profile of a structure of a main unit of a conduction device of the present invention applied in a linear, double layer type electric machinery without casing, bearing, locking member, cooling van, and optional conductive device;

6. A linearly coupled linear 3-layer type electric machinery comprised of an inner layer, a mid layer, and the outer layer linear electric machinery structures includes the inner layer linear electric machinery structure 61, the mid layer linear electric machinery structure 62, and the outer layer linear electric machinery structure 63 as illustrated in FIG. 10 showing a summary profile of a structure of a main unit of a conduction device of the present invention applied in a linear, 3-layer type electric machinery without casing, bearing, locking member, cooling van, and optional conductive device.

Application examples of various types of structure of the present invention are described below, including 2-piece cylinder, plate or linear electric machinery structure and 3-piece coaxial 3-ring, coaxial 3-layer type plate, or 3-layer type linear electric machinery structure; an electric machinery structure comprised of other 2-piece, 3-piece, or more elements to execute EME interaction could be achieved according to the same operation principle, therefore it will not be elaborated herein.

Figure 11:
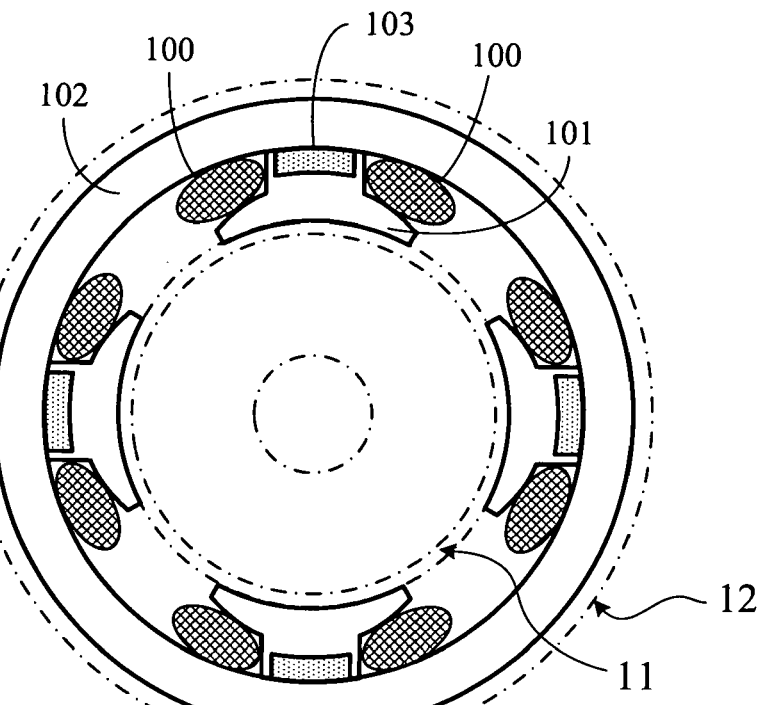
FIG. 11 is a schematic view showing a structure of the present invention applied in a cylinder electric machinery structure, wherein a PM magnetic pole indicating accumulative excitement wrapped between a conduction winding excited individual magnetic pole and a magnetic circuit is disposed to an EME coupling aspect of the outer layer electric machinery structure in a direction facing the inner layer electric machinery structure to execute EME coupling with the inner layer electric machinery structure.

FIG. 11 is a schematic view showing a structure of the present invention applied in a cylinder electric machinery structure, wherein a PM magnetic pole indicating accumulative excitement wrapped between a conduction winding excited individual magnetic pole and a magnetic circuit is disposed on an EME coupling aspect of the outer layer electric machinery structure in a direction facing the inner layer electric machinery structure to execute EME coupling with the inner layer electric machinery structure.

As illustrated in FIG. 11 for a cylinder electric machinery structure, the outer layer electric machinery structure 12 to execute EME coupling with the inner layer electric machinery structure 11 has disposed on its EME coupling aspect in a direction facing the inner layer electric machinery structure 11 the PM magnetic pole 103 indicating accumulative excitement wrapped either in the mid section of the magnetic circuit of the conduction winding 100 excited individual magnetic pole 101 or between the individual magnetic pole 101 and the magnetic circuit 102 thus to constitute the cylinder electric machinery provided with the PM magnetic pole 103 with accumulative excitement being wrapped by the conduction winding excited magnetic pole 101 and the magnetic circuit 102.

Figure 12:
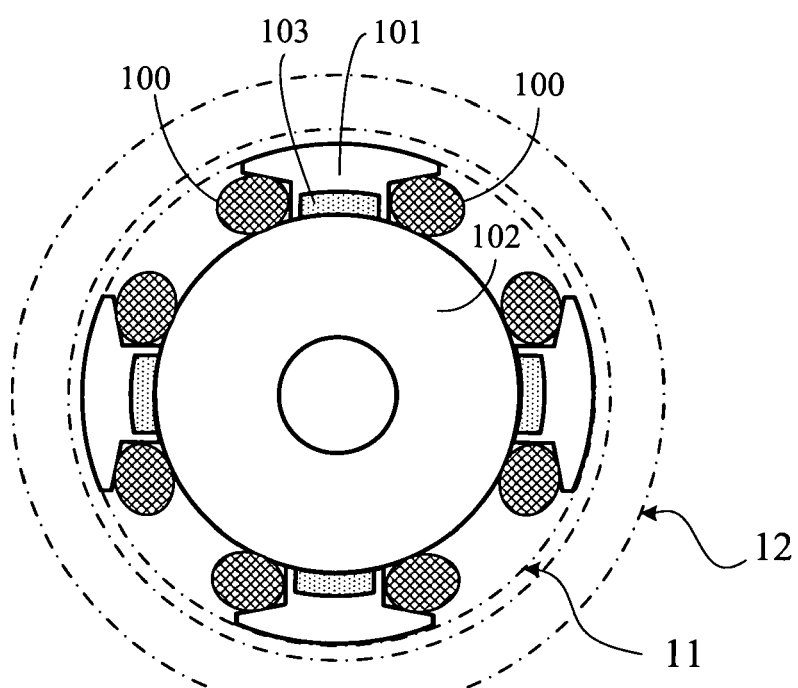
FIG. 12 is a schematic view showing a structure of the present invention applied in a cylinder electric machinery structure, wherein a PM magnetic pole indicating accumulative excitement wrapped between a conduction winding excited individual magnetic pole and a magnetic circuit is disposed on an EME coupling aspect of the inner layer electric machinery structure in a direction facing the outer layer electric machinery structure to execute EME coupling with the outer layer electric machinery structure.

FIG. 12 is a schematic view showing a structure of the present invention applied in a cylinder electric machinery structure, wherein a PM magnetic pole indicating accumulative excitement wrapped between a conduction winding excited individual magnetic pole and a magnetic circuit is disposed on an EME coupling aspect of the inner layer electric machinery structure in a direction facing the outer layer electric machinery structure to execute EME coupling with the outer layer electric machinery structure.

As illustrated in FIG. 12 showing a cylinder electric machinery structure, the PM magnetic pole 103 indicating accumulative excitement wrapped either in the mid section of the magnetic circuit of a conduction winding 100 excited individual magnetic pole 101 or between the individual magnetic pole 101 and the magnetic circuit 102 is disposed on an EME coupling aspect of the inner layer electric machinery structure 11 in a direction facing the outer layer electric machinery structure 12 to execute EME coupling with the outer layer electric machinery structure 12 thus to constitute a cylinder electric machinery provided with the PM magnetic pole 103 with accumulative excitement being wrapped by the conduction winding excited magnetic pole 101 and the magnetic circuit 102.

Figure 13:
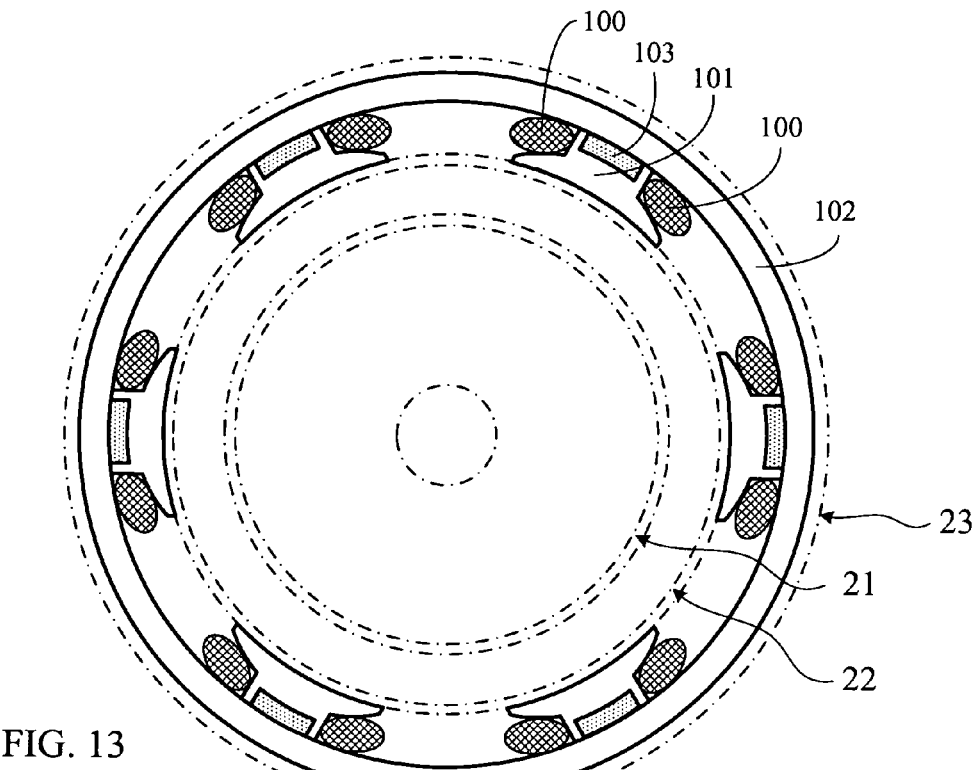
FIG. 13 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the outer ring electric machinery structure in a direction facing the mid ring electric machinery structure to execute EME coupling with the mid ring electric machinery structure.

FIG. 13 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the outer ring electric machinery structure in a direction facing the mid ring electric machinery structure to execute EME coupling with the mid ring electric machinery structure.

As illustrated in FIG. 13 showing a coaxial 3-ring type electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the mid ring electric machinery structure 22 is disposed on an EME coupling aspect of the outer ring electric machinery structure 23 in a direction facing the mid ring electric machinery structure 22 for executing EME coupling with the mid ring electric machinery structure 22, and the type of the electric machinery structure between the mid ring electric machinery structure 22 and the inner ring electric machinery structure 21 is selected upon its EME property thus to constitute a coaxial 3-ring type electric machinery provided with the PM magnetic pole 103 with accumulative excitement being wrapped by the conduction winding excited magnetic pole 101 and the magnetic circuit 102.

Figure 14:
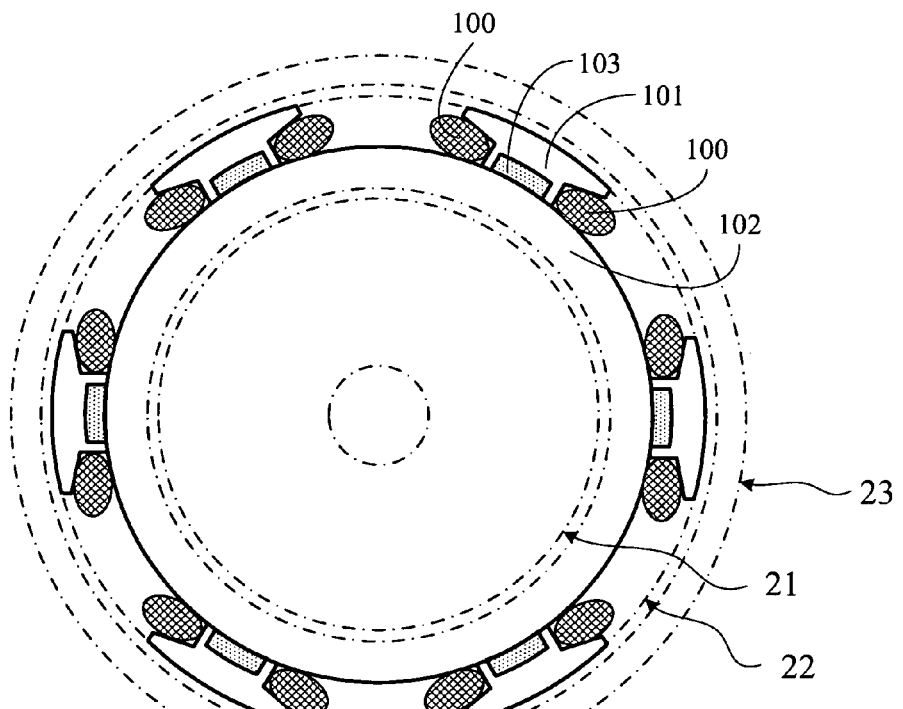
FIG. 14 is a schematic view showing a structure of the present invention applied in a coaxial 3-ring type electric machinery structure wherein a PM magnetic pole indicating accumulative excitement wrapped between a conduction winding excited individual magnetic pole and a magnetic circuit is disposed on an EME coupling aspect of the mid ring electric machinery structure in a direction facing the outer ring electric machinery structure to execute EME coupling with the outer ring electric machinery structure.

FIG. 14 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the mid ring electric machinery structure in a direction facing the outer ring electric machinery structure to execute EME coupling with the outer ring electric machinery structure.

As illustrated in FIG. 14 showing a coaxial 3-ring type electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the outer ring electric machinery structure 23 is disposed on an EME coupling aspect of the mid ring electric machinery structure 22 in a direction facing the outer ring electric machinery structure 23 for executing EME coupling with the outer ring electric machinery structure 23, and the type of the electric machinery structure between the mid ring electric machinery structure 22 and the inner ring electric machinery structure 21 is selected upon its EME property thus to constitute a coaxial 3-ring type electric machinery provided with the PM magnetic pole 103 with accumulative excitement being wrapped by the conduction winding excited magnetic pole 101 and the magnetic circuit 102.

Figure 15:
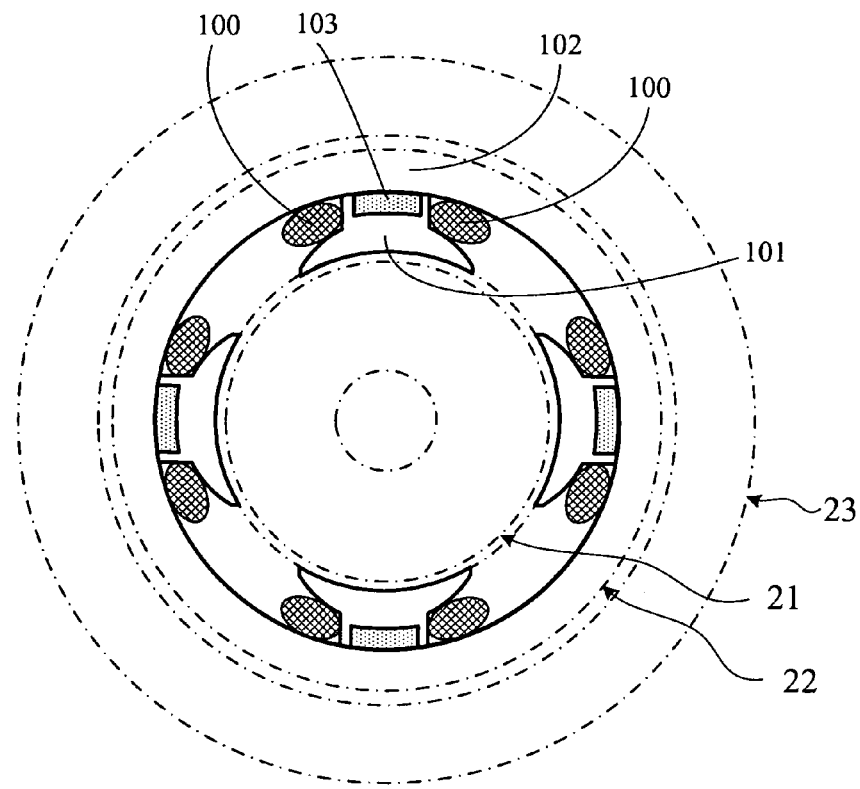
FIG. 15 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the mid ring electric machinery structure in a direction facing the inner ring electric machinery structure to execute EME coupling with the inner ring electric machinery structure.

FIG. 15 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the mid ring electric machinery structure in a direction facing the inner ring electric machinery structure to execute EME coupling with the inner ring electric machinery structure.

As illustrated in FIG. 15 showing a coaxial 3-ring type electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the inner ring electric machinery structure 21 is disposed on an EME coupling aspect of the mid ring electric machinery structure 22 in a direction facing the inner ring electric machinery structure 21 for executing EME coupling with the inner ring electric machinery structure 21, and the type of the electric machinery structure between the mid ring electric machinery structure 22 and the outer ring electric machinery structure 23 is selected upon its EME property thus to constitute a coaxial 3-ring type electric machinery provided with the PM magnetic pole 103 with accumulative excitement being wrapped by the conduction winding excited magnetic pole 101 and the magnetic circuit 102.

Figure 16:
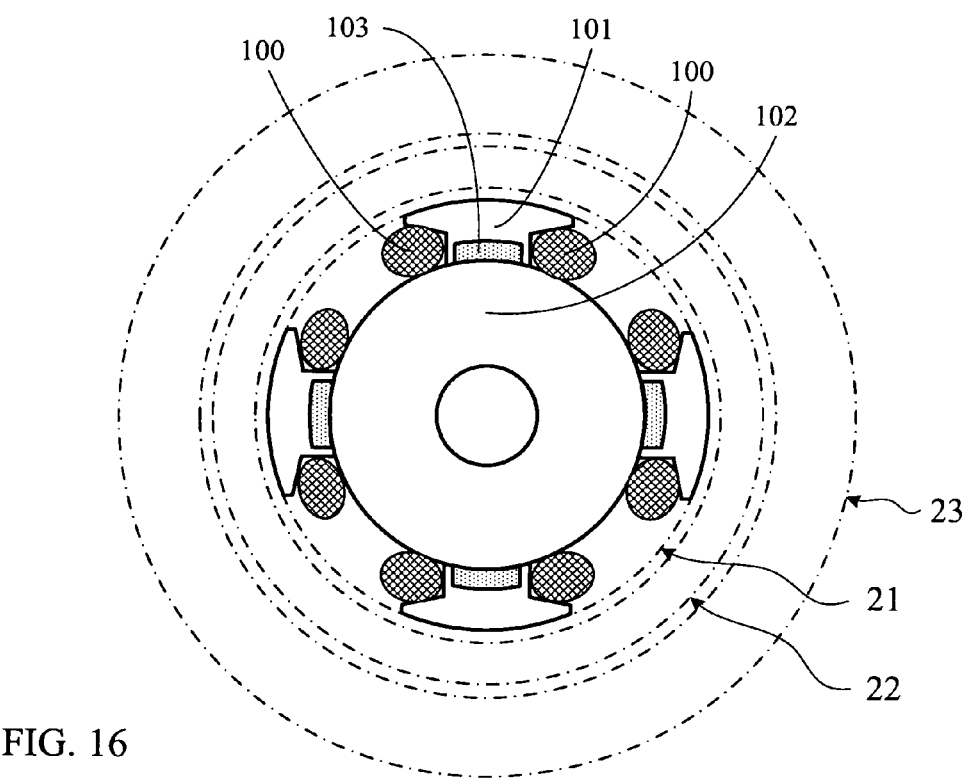
FIG. 16 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the inner ring electric machinery structure in a direction facing the mid ring electric machinery structure.

FIG. 16 is a schematic view showing a structure of the present invention applied in a coaxial 3-ring type electric machinery structure, wherein a PM magnetic pole indicating accumulative excitement wrapped between a conduction winding excited individual magnetic pole and a magnetic circuit is disposed on an EME coupling aspect of the inner ring electric machinery structure in a direction facing the mid ring electric machinery structure.

As illustrated in FIG. 16 showing a coaxial 3-ring type electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the mid ring electric machinery structure 22 is disposed on an EME coupling aspect of the inner ring electric machinery structure 21 in a direction facing the mid ring electric machinery structure 22 for executing EME coupling with the mid ring electric machinery structure 22, and the type of the electric machinery structure between the mid ring electric machinery structure 22 and the outer ring electric machinery structure 23 is selected upon its EME property thus to constitute a coaxial 3-ring type electric machinery provided with the PM magnetic pole 103 with accumulative excitement being wrapped by the conduction winding excited magnetic pole 101 and the magnetic circuit 102.

Figure 17:
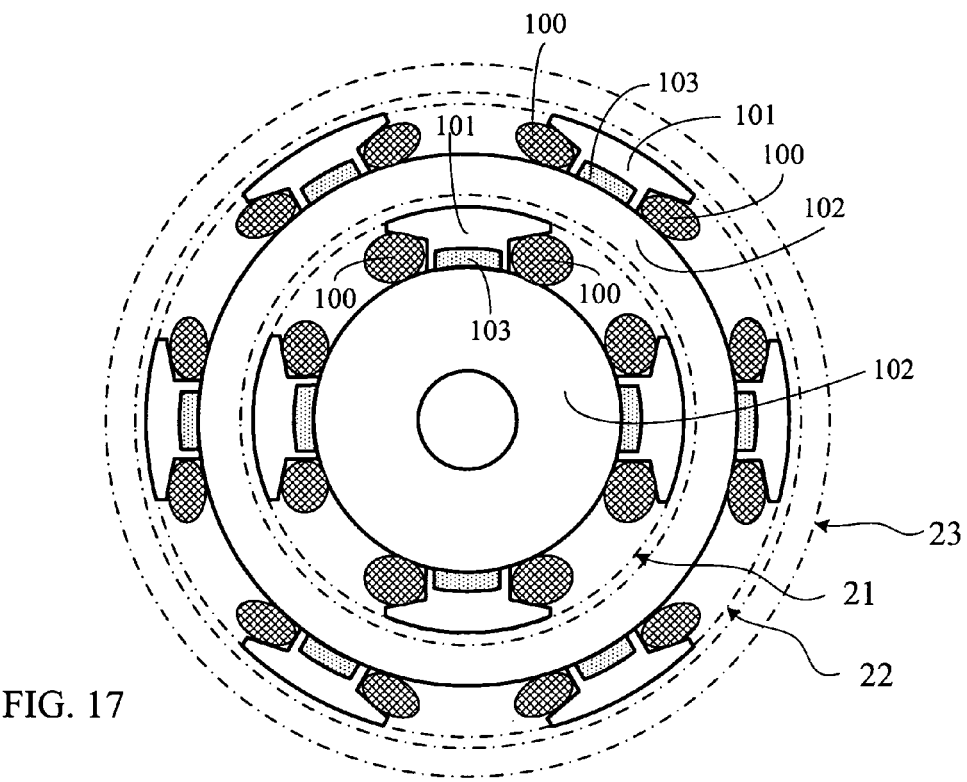
FIG. 17 is a schematic view showing a structure of the present invention applied in a coaxial 3-ring type electric machinery structure wherein two PM magnetic poles indicating accumulative excitement each wrapped between a conduction winding excited individual magnetic pole and a magnetic circuit are respectively disposed on an EME coupling aspect of the inner ring electric machinery structure in a direction facing the mid ring electric machinery structure and on an EME coupling aspect of the mid ring electric machinery structure in a direction facing the outer ring electric machinery structure.

FIG. 17 is a schematic view showing a structure of the present invention applied in a coaxial 3-ring type electric machinery structure wherein two PM magnetic poles indicating accumulative excitement each wrapped between a conduction winding excited individual magnetic pole and a magnetic circuit are respectively disposed on an EME coupling aspect of the inner ring electric machinery structure in a direction facing the mid ring electric machinery structure and on an EME coupling aspect of the mid ring electric machinery structure in a direction facing the outer ring electric machinery structure.

As illustrated in FIG. 17 showing a coaxial 3-ring type electric machinery structure, an EME coupling aspect of the inner ring electric machinery structure 21 in a direction facing the mid ring electric machinery structure 22 and an EME coupling aspect of the mid ring electric machinery structure 22 in a direction facing the outer ring electric machinery structure 23 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a coaxial 3-ring type electric machinery provided with two PM magnetic poles 103 with accumulative excitement being wrapped by the conduction winding excited magnetic pole 101 and the magnetic circuit 102.

Figure 18:
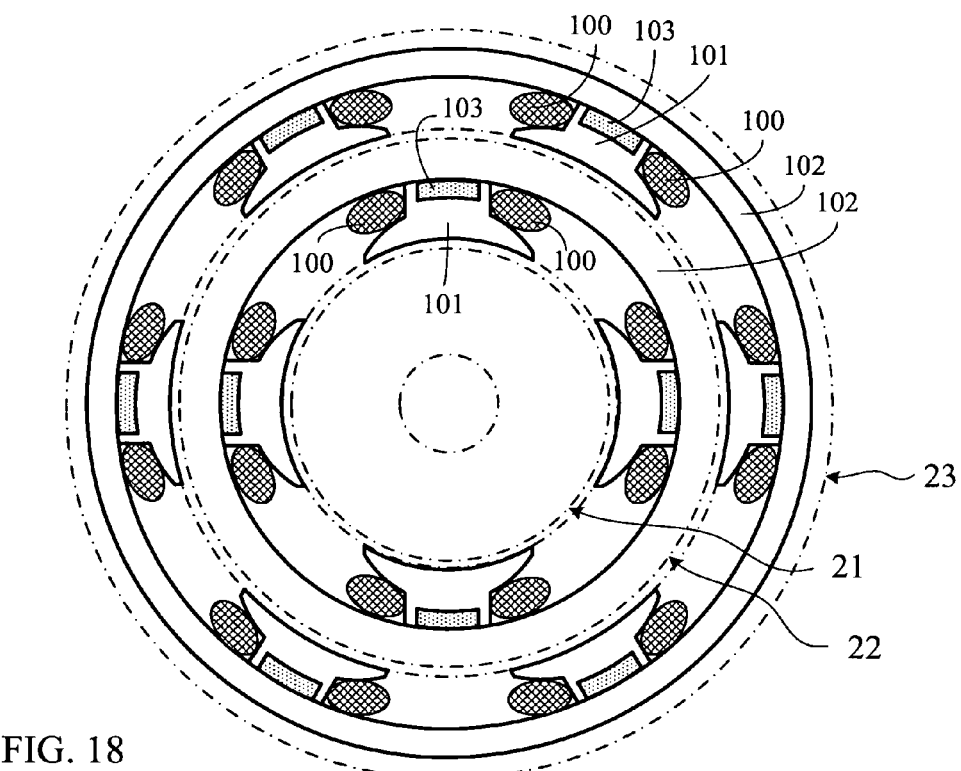
FIG. 18 is a schematic view showing a structure of the present invention applied in a coaxial 3-ring type electric machinery structure, wherein two PM magnetic poles indicating accumulative excitement each wrapped between a conduction winding excited individual magnetic pole and a magnetic circuit are respectively disposed on an EME coupling aspect of the outer ring electric machinery structure in a direction facing the mid ring electric machinery structure and on an EME coupling aspect of the mid ring electric machinery structure in a direction facing the inner ring electric machinery structure.

FIG. 18 is a schematic view showing a structure of the present invention applied in a coaxial 3-ring type electric machinery structure wherein two PM magnetic poles indicating accumulative excitement each wrapped between a conduction winding excited individual magnetic pole and a magnetic circuit are respectively disposed on an EME coupling aspect of the outer ring electric machinery structure in a direction facing the mid ring electric machinery structure and on an EME coupling aspect of the mid ring electric machinery structure in a direction facing the inner ring electric machinery structure.

As illustrated in FIG. 18 showing a coaxial 3-ring type electric machinery structure, an EME coupling aspect of the outer ring electric machinery structure 23 in a direction facing the mid ring electric machinery structure 22 and an EME coupling aspect of the mid ring electric machinery structure 22 in a direction facing the inner ring electric machinery structure 21 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a coaxial 3-ring type electric machinery provided with two PM magnetic poles 103 with accumulative excitement being wrapped by the conduction winding excited magnetic pole 101 and the magnetic circuit 102.

Figure 19:
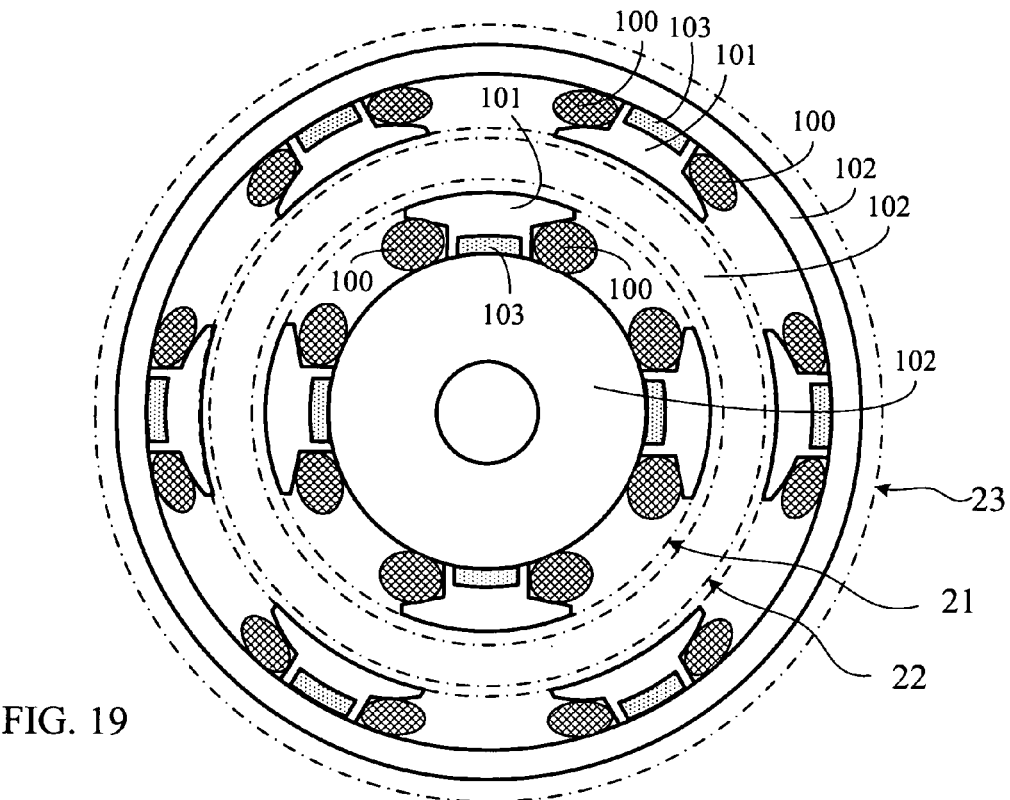
FIG. 19 is a schematic view showing a structure of the present invention applied in a coaxial 3-ring type electric machinery structure wherein two PM magnetic poles indicating accumulative excitement each wrapped between a conduction winding excited individual magnetic pole and a magnetic circuit are respectively disposed on an EME coupling aspect of the outer ring electric machinery structure in a direction facing the mid ring electric machinery structure and on an EME coupling aspect of the inner ring electric machinery structure in a direction facing the mid ring electric machinery structure.

FIG. 19 is a schematic view showing a structure of the present invention applied in a coaxial 3-ring type electric machinery structure wherein two PM magnetic poles indicating accumulative excitement each wrapped between a conduction winding excited individual magnetic pole and a magnetic circuit are respectively disposed on an EME coupling aspect of the outer ring electric machinery structure in a direction facing the mid ring electric machinery structure and on an EME coupling aspect of the inner ring electric machinery structure in a direction facing the mid ring electric machinery structure.

As illustrated in FIG. 19 showing a coaxial 3-ring type electric machinery structure, an EME coupling aspect of the outer ring electric machinery structure 23 in a direction facing the mid ring electric machinery structure 22 and an EME coupling aspect of the inner ring electric machinery structure 21 in a direction facing the mid ring electric machinery structure 22 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a coaxial 3-ring type electric machinery provided with two PM magnetic poles 103 with each indicating accumulative excitement and being wrapped by the conduction winding excited magnetic pole 101 and the magnetic circuit 102.

Figure 20:
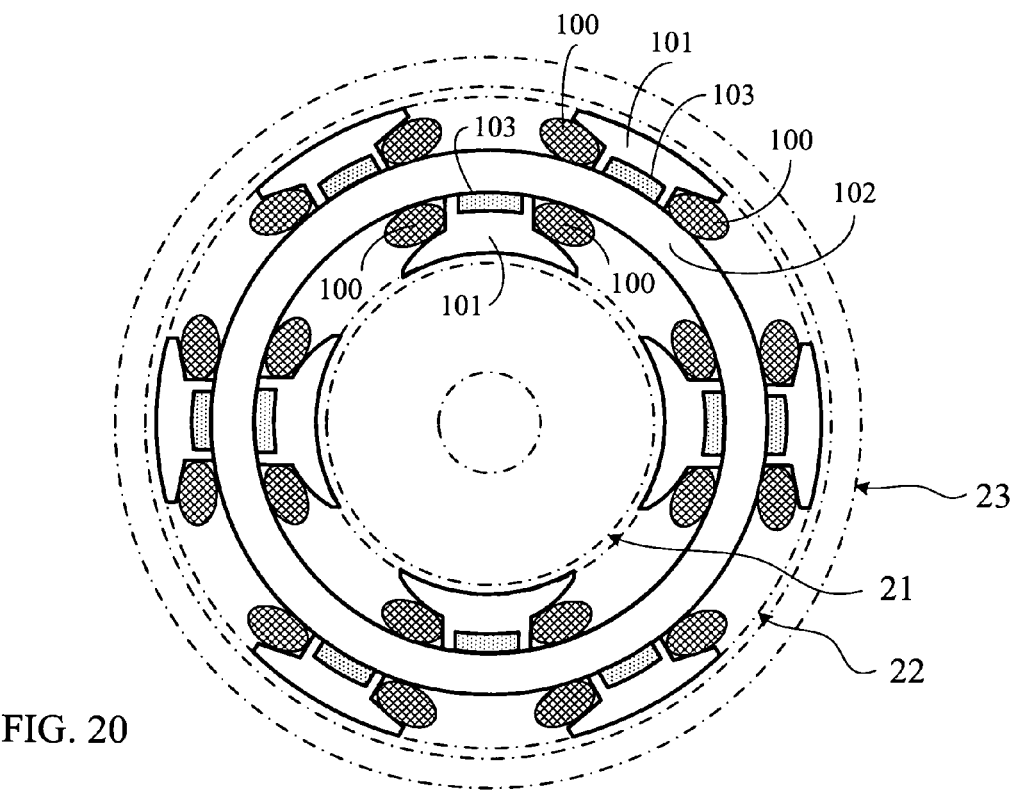
FIG. 20 is a schematic view showing a structure of the present invention applied in a coaxial 3-ring type electric machinery structure, wherein two PM magnetic poles indicating accumulative excitement each wrapped between a conduction winding excited individual magnetic pole and a magnetic circuit are respectively disposed on two EME coupling aspects on both sides of the mid ring electric machinery structure respectively in a direction facing the outer ring electric machinery structure and in another direction facing the inner ring electric machinery structure to execute EME coupling with both the outer and the inner ring electric machinery structures.

FIG. 20 is a schematic view showing a structure of the present invention applied in a coaxial 3-ring type electric machinery structure, wherein two PM magnetic poles indicating accumulative excitement each wrapped between a conduction winding excited individual magnetic pole and a magnetic circuit are respectively disposed on two EME coupling aspects on both sides of the mid ring electric machinery structure respectively in a direction facing the outer ring electric machinery structure and in another direction facing the inner ring electric machinery structure to execute EME coupling with both the outer and the inner ring electric machinery structures.

As illustrated in FIG. 20 showing a coaxial 3-ring type electric machinery structure, two PM magnetic poles 103 indicating accumulative excitement wrapped either in the mid section of the magnetic circuit of the conduction winding excited individual magnetic pole 101 or between the individual magnetic pole 101 and the magnetic circuit 102 are respectively disposed on two EME coupling aspects of the mid ring electric machinery structure 22 in a direction facing the inner ring electric machinery structure 21 and in another direction facing the outer ring electric machinery structure 23 to execute EME coupling with both the outer and the inner ring electric machinery structures 23 and 21 thus to constitute a coaxial 3-ring type electric machinery provided with the PM magnetic pole 103 with accumulative excitement being wrapped by the conduction winding excited magnetic pole 101 and the magnetic circuit 102.

Figure 21:
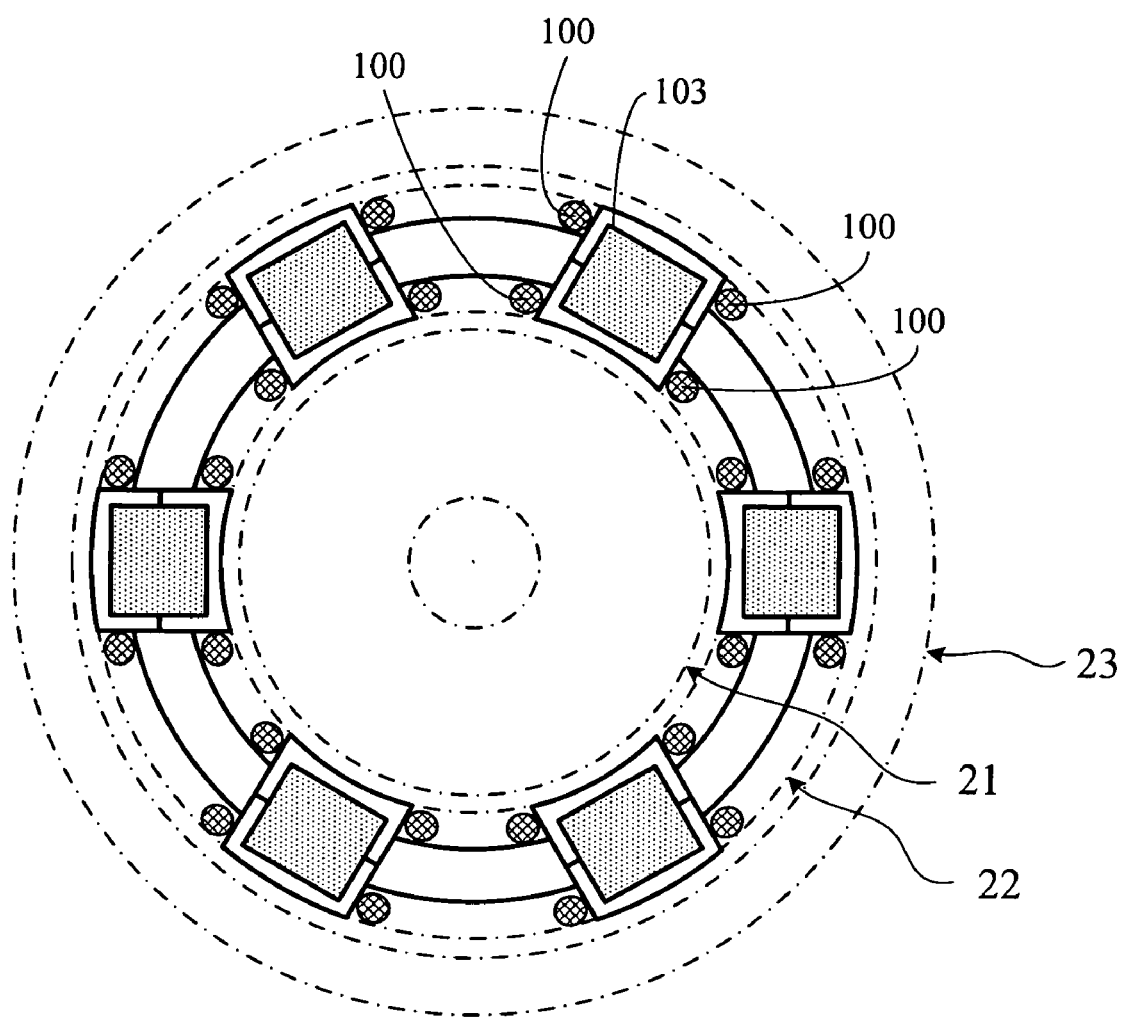
FIG. 21 is a schematic view showing a structure of the present invention applied in a coaxial 3-ring type electric machinery structure, wherein a PM magnetic pole for executing bilateral coupling with the inner and the outer ring electric machinery structures is wrapped by a permeable body to constitute a magnetic pole on the mid ring electric machinery structure that executes EME coupling with the inner and the outer ring electric machinery structures, and a conduction excitement winding indicating accumulative excitement is further wound to the PM magnetic pole.

FIG. 21 is a schematic view showing a structure of the present invention applied in a coaxial 3-ring type electric machinery structure, wherein a PM magnetic pole for executing bilateral coupling with the inner and the outer ring electric machinery structures is wrapped by a permeable body to constitute a magnetic pole on the mid ring electric machinery structure that executes EME coupling with the inner and the outer ring electric machinery structures, and a conduction excitement winding indicating accumulative excitement is further wound to the PM magnetic pole.

As illustrated in FIG. 21 showing a coaxial 3-ring type electric machinery structure, a PM magnetic pole 103 is wrapped by a permeable body on the mid ring electric machinery structure 22 that executes EME coupling with both the inner ring electric machinery structure 21 and the outer ring electric machinery structure 23 to constitute a magnetic pole, and the magnetic poles on both ends of the PM magnetic pole 103 execute bilateral coupling with the inner ring electric machinery structure 21 and the outer ring electric machinery structure 23 respectively to achieve EME interaction, and a conduction excitement winding 100 is wound to the PM magnetic pole 103 thus further constituting a coaxial 3-ring type electric machinery provided with an accumulative excitement winding being wound to the PM magnetic pole 103.

Figure 22:
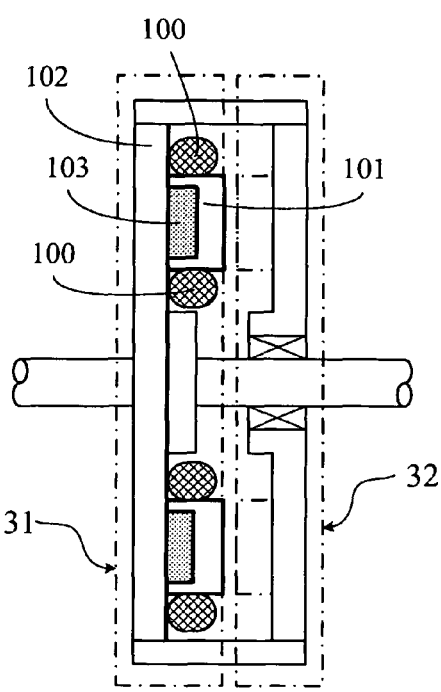
FIG. 22 is a schematic view showing a structure of the present invention applied in a double layer type plate electric machinery structure, wherein a PM magnetic pole indicating accumulative excitement wrapped between a conduction winding excited individual magnetic pole and a magnetic circuit is disposed on an EME coupling aspect of the inner layer plate electric machinery structure.

FIG. 22 is a schematic view showing a structure of the present invention applied in a double layer type plate electric machinery structure, wherein a PM magnetic pole indicating accumulative excitement wrapped between a conduction winding excited individual magnetic pole and a magnetic circuit is disposed on an EME coupling aspect of the inner layer plate electric machinery structure.

As illustrated in FIG. 22 showing a double layer type plate electric machinery structure, the PM magnetic pole 103 indicating accumulative excitement wrapped either in the mid section of the magnetic circuit of the conduction winding individual magnetic pole 101 or between the individual magnetic pole 101 and the magnetic circuit 102 to execute EME interaction with the outer layer plate electric machinery structure 32 is disposed on an EME coupling aspect of the inner layer plate electric machinery structure 31 in a direction facing the outer layer plate electric machinery structure 32, or the PM magnetic pole 103 indicating accumulative excitement wrapped either in the mid section of the magnetic circuit of the conduction winding individual magnetic pole 101 or between the individual magnetic pole 101 and the magnetic circuit 102 to execute EME interaction with the inner layer plate electric machinery structure 31 is disposed on an EME coupling aspect of the outer layer plate electric machinery structure 32 in a direction facing the inner layer plate electric machinery structure 31 thus to constitute a coaxial double layer type plate electric machinery provided with a PM magnetic pole 103 indicating accumulative excitement and being wrapped by the conduction winding excited magnetic pole 101 and the magnetic circuit 102.

Figure 23:
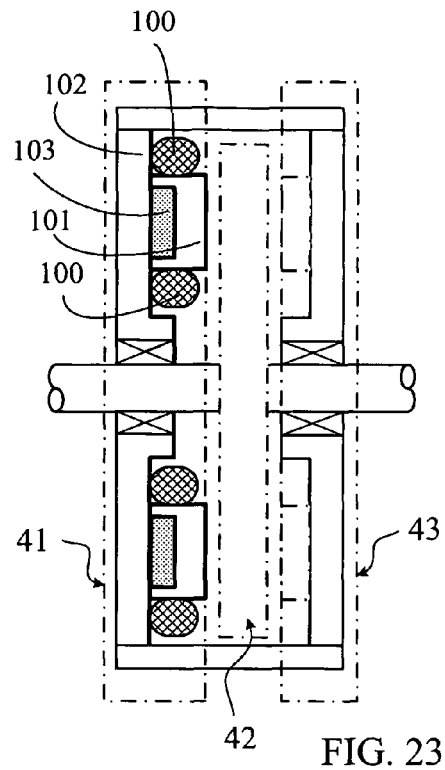
FIG. 23 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the inner layer plate electric machinery structure in a direction facing the mid layer plate electric machinery structure.

FIG. 23 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the inner layer plate electric machinery structure in a direction facing the mid layer plate electric machinery structure.

As illustrated in FIG. 23 showing a coaxial 3-layer type plate electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the mid layer plate electric machinery structure 42 is disposed on an EME coupling aspect of the inner layer plate electric machinery structure 41 in a direction facing the mid layer plate electric machinery structure 42, and the type of the electric machinery structure between the mid layer plate electric machinery structure 42 and the outer layer plate electric machinery structure 43 is selected upon its EME property to constitute a 3-layer type plate electric machinery provided with the PM magnetic pole 103 with accumulative excitement being wrapped by the conduction winding excited magnetic pole 101 and the magnetic circuit 102.

Figure 24:
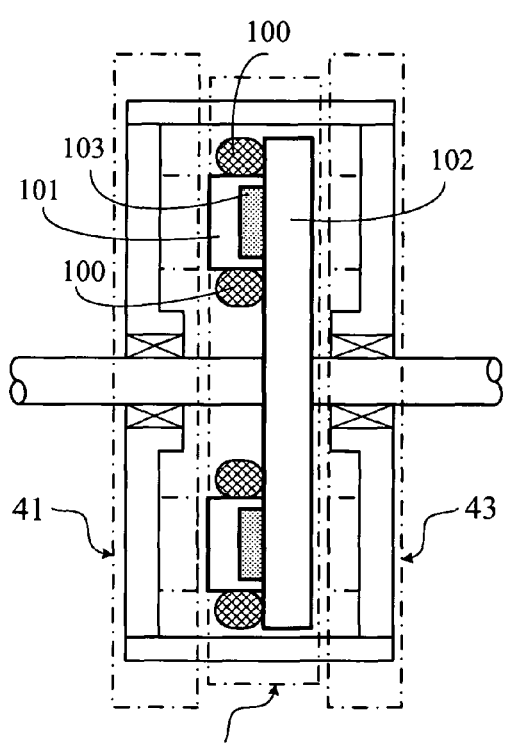
FIG. 24 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the mid layer plate electric machinery structure in a direction facing the inner layer plate electric machinery structure.

FIG. 24 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the mid layer plate electric machinery structure in a direction facing the inner layer plate electric machinery structure.

As illustrated in FIG. 24 showing a coaxial 3-layer type plate electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the inner layer plate electric machinery structure 41 is disposed on an EME coupling aspect of the mid layer plate electric machinery structure 42 in a direction facing the inner layer plate electric machinery structure 41, and the type of the electric machinery structure between the mid layer plate electric machinery structure 42 and the outer layer plate electric machinery structure 43 is selected upon its EME property to constitute a 3-layer type plate electric machinery provided with the PM magnetic pole 103 with accumulative excitement being wrapped by the conduction winding excited magnetic pole 101 and the magnetic circuit 102.

Figure 25:
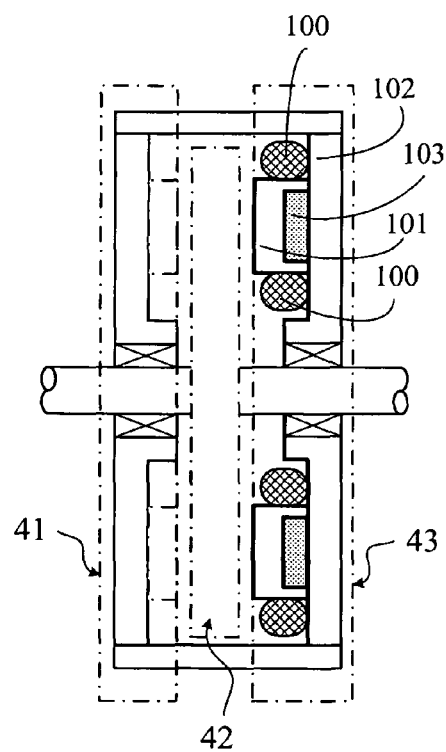
FIG. 25 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the outer layer plate electric machinery structure in a direction facing the mid layer plate electric machinery structure.

FIG. 25 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the outer layer plate electric machinery structure in a direction facing the mid layer plate electric machinery structure.

As illustrated in FIG. 25 showing a coaxial 3-layer type plate electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the mid layer plate electric machinery structure 42 is disposed on an EME coupling aspect of the outer layer plate electric machinery structure 43 in a direction facing the mid layer plate electric machinery structure 42, and the type of the electric machinery structure between the mid layer plate electric machinery structure 42 and the inner layer plate electric machinery structure 41 is selected upon its EME property to constitute a 3-layer type plate electric machinery provided with the PM magnetic pole 103 with accumulative excitement being wrapped by the conduction winding excited magnetic pole 101 and the magnetic circuit 102.

Figure 26:
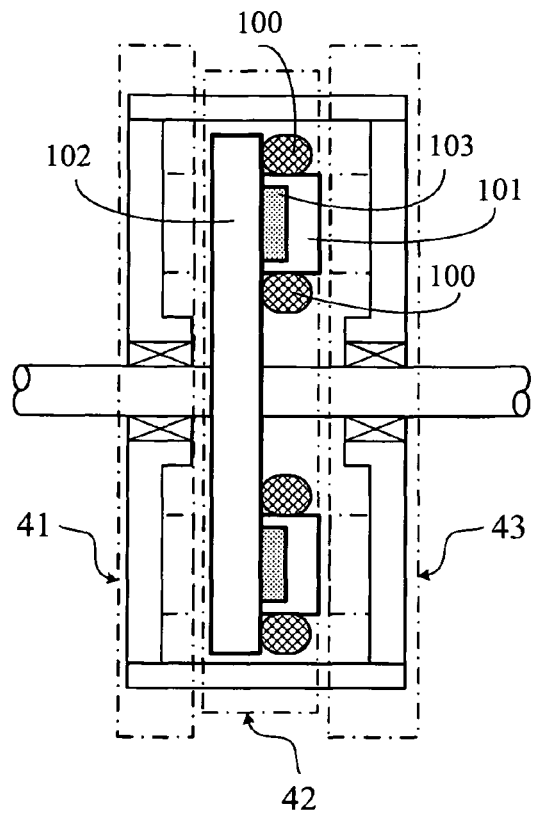
FIG. 26 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the mid layer plate electric machinery structure in a direction facing the outer layer plate electric machinery structure.

FIG. 26 is a schematic view showing a structure of the present invention applied in a coaxial 3-layer type plate electric machinery structure, wherein a PM magnetic pole indicating accumulative excitement wrapped between a conduction winding excited individual magnetic pole and a magnetic circuit is disposed on an EME coupling aspect of the mid layer plate electric machinery structure in a direction facing the outer layer plate electric machinery structure.

As illustrated in FIG. 26 showing a coaxial 3-layer type plate electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the outer layer plate electric machinery structure 43 is disposed on an EME coupling aspect of the mid layer plate electric machinery structure 42 in a direction facing the outer layer plate electric machinery structure 43, and the type of the electric machinery structure between the mid layer plate electric machinery structure 42 and the inner layer plate electric machinery structure 41 is selected upon its EME property to constitute a 3-layer type plate electric machinery provided with the PM magnetic pole 103 with accumulative excitement being wrapped by the conduction winding excited magnetic pole 101 and the magnetic circuit 102.

Figure 27:
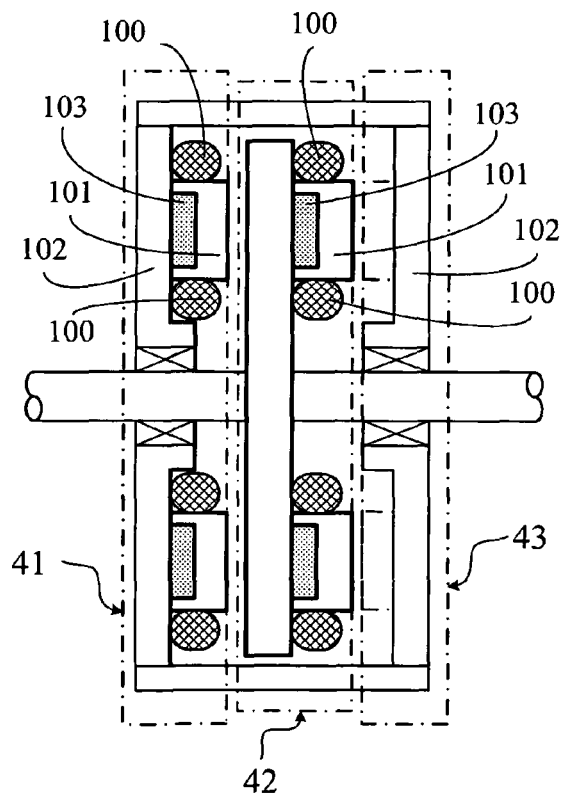
FIG. 27 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on an EME coupling aspect of the inner layer plate electric machinery structure in a direction facing the mid layer plate electric machinery structure and on an EME coupling aspect of the mid layer plate electric machinery structure in a direction facing the outer layer plate electric machinery structure.

FIG. 27 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on an EME coupling aspect of the inner layer plate electric machinery structure in a direction facing the mid layer plate electric machinery structure and on an EME coupling aspect of the mid layer plate electric machinery structure in a direction facing the outer layer plate electric machinery structure.

As illustrated in FIG. 27 showing a coaxial 3-layer type plate electric machinery structure, an EME coupling aspect of the inner layer plate electric machinery structure 41 in a direction facing the mid layer plate electric machinery structure 42 and an EME coupling aspect of the mid layer plate electric machinery structure 42 in a direction facing the outer layer plate electric machinery structure 43 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a coaxial 3-layer type plate electric machinery provided with two PM magnetic poles 103 with accumulative excitement being wrapped by the conduction winding excited magnetic pole 101 and the magnetic circuit 102.

Figure 28:
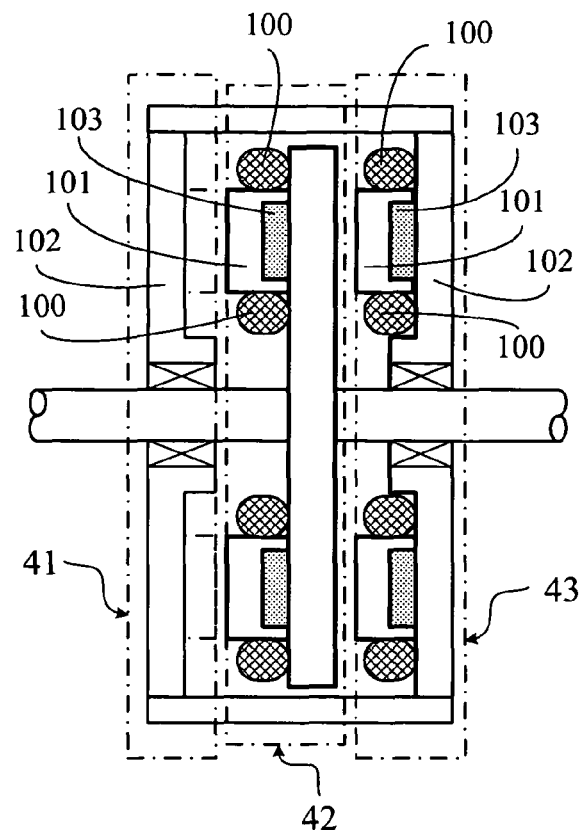
FIG. 28 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on an EME coupling aspect of the outer layer plate electric machinery structure in a direction facing the mid layer plate electric machinery structure and on an EME coupling aspect of the mid layer plate electric machinery structure in a direction facing the inner layer plate electric machinery structure.

FIG. 28 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on an EME coupling aspect of the outer layer plate electric machinery structure in a direction facing the mid layer plate electric machinery structure and on an EME coupling aspect of the mid layer plate electric machinery structure in a direction facing the inner layer plate electric machinery structure.

As illustrated in FIG. 28 showing a coaxial 3-layer type plate electric machinery structure, an EME coupling aspect of the outer layer plate electric machinery structure 43 in a direction facing the mid layer plate electric machinery structure 42 and an EME coupling aspect of the mid layer plate electric machinery structure 42 in a direction facing the inner layer plate electric machinery structure 41 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a coaxial 3-layer type plate electric machinery provided with two PM magnetic poles 103 with accumulative excitement being wrapped by the conduction winding excited magnetic pole 101 and the magnetic circuit 102.

Figure 29:
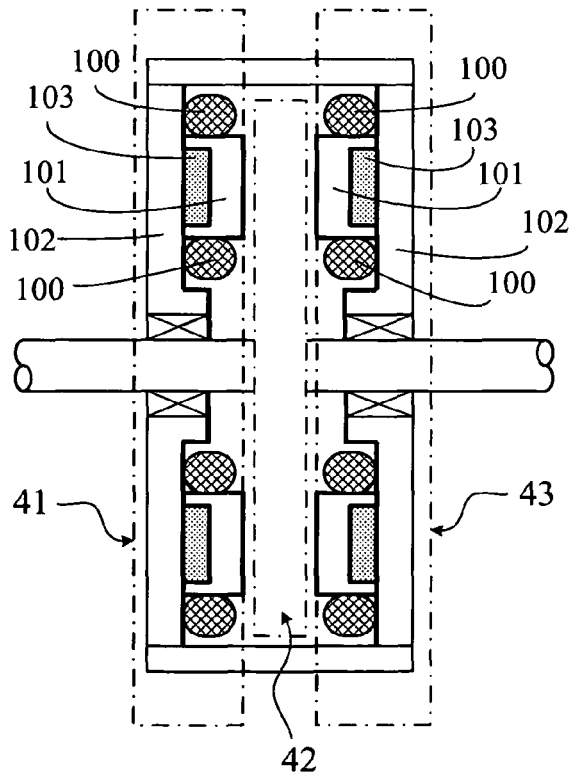
FIG. 29 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on an EME coupling aspect of the outer layer plate electric machinery structure in a direction facing the mid layer plate electric machinery structure and on an EME coupling aspect of the inner layer plate electric machinery structure in a direction facing the mid layer plate electric machinery structure.

FIG. 29 is a schematic view showing a structure of the present invention applied in a coaxial 3-layer type plate electric machinery structure wherein two PM magnetic poles indicating accumulative excitement each wrapped between a conduction winding excited individual magnetic pole and a magnetic circuit are respectively disposed on an EME coupling aspect of the outer layer plate electric machinery structure in a direction facing the mid layer plate electric machinery structure and on an EME coupling aspect of the inner layer plate electric machinery structure in a direction facing the mid layer plate electric machinery structure.

As illustrated in FIG. 29 showing a coaxial 3-layer type plate electric machinery structure, an EME coupling aspect of the outer layer plate electric machinery structure 43 in a direction facing the mid layer plate electric machinery structure 42 and an EME coupling aspect of the inner layer plate electric machinery structure 41 in a direction facing the mid layer plate electric machinery structure 42 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 to achieve EME interaction with the mid layer plate electric machinery structure 42 thus to constitute a coaxial 3-layer type plate electric machinery provided with two PM magnetic poles 103 with each indicating accumulative excitement and being wrapped by the conduction winding excited magnetic pole 101 and the magnetic circuit 102.

Figure 30:
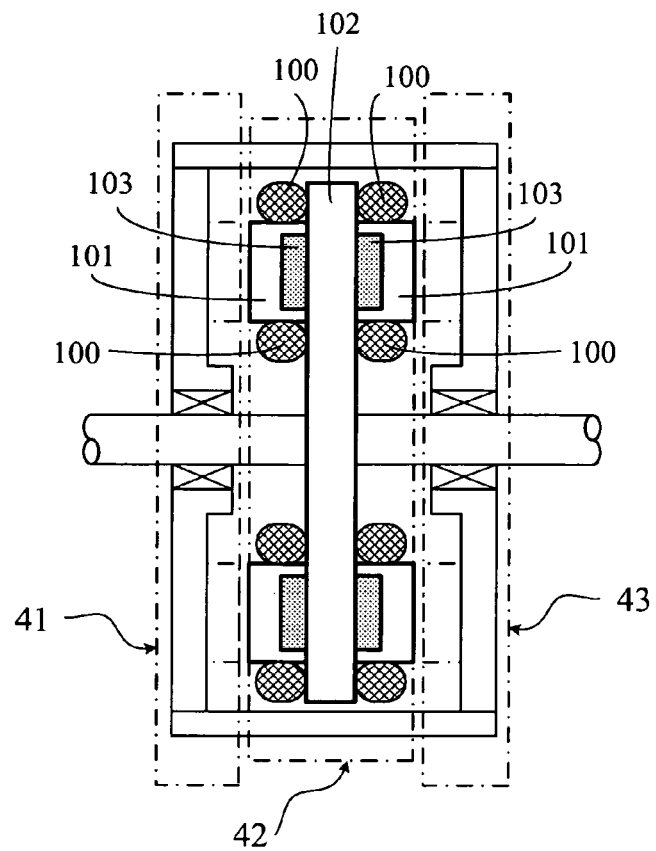
FIG. 30 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on two EME coupling aspects on both sides of the mid layer plate electric machinery structure in a direction facing the outer layer plate electric machinery structure and in another direction facing the inner layer plate electric machinery structure.

FIG. 30 is a schematic view showing a structure of the present invention applied in a coaxial 3-layer type plate electric machinery structure, wherein two PM magnetic poles indicating accumulative excitement each wrapped between a conduction winding excited individual magnetic pole and a magnetic circuit are respectively disposed on two EME coupling aspects on both sides of the mid layer plate electric machinery structure in a direction facing the outer layer plate electric machinery structure and in another direction facing the inner layer plate electric machinery structure.

As illustrated in FIG. 30 showing a coaxial 3-layer type plate electric machinery structure, two PM magnetic poles 103 indicating accumulative excitement wrapped either in the mid section of the magnetic circuit of the conduction winding excited individual magnetic pole 101 or between the individual magnetic pole 101 and the magnetic circuit 102 are respectively disposed on two EME coupling aspects of the mid layer plate electric machinery structure 42 in a direction facing the inner layer plate electric machinery structure 41 and in another direction facing the outer layer plate electric machinery structure 43 to execute EME coupling with both the outer and the inner layer plate electric machinery structures 43 and 41 thus to constitute a coaxial 3-layer type plate electric machinery provided with the PM magnetic pole 103 with accumulative excitement being wrapped by the conduction winding excited magnetic pole 101 and the magnetic circuit 102.

Figure 31:
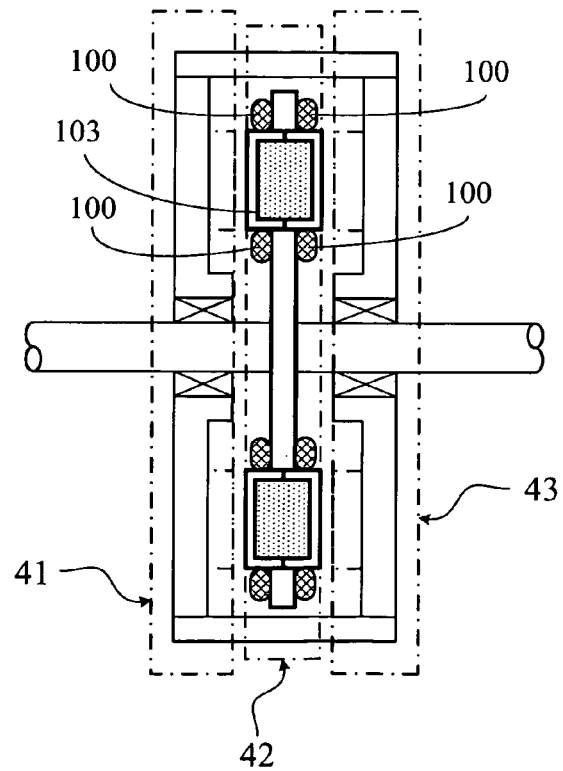
FIG. 31 is a schematic view showing a structure of the present invention applied in a coaxial 3-layer type plate electric machinery structure, wherein a PM magnetic pole for executing bilateral coupling with the inner and the outer layer plate electric machinery structures is wrapped by a permeable body to constitute a magnetic pole on the mid layer plate electric machinery structure that executes EME coupling with the inner and the outer layer plate electric machinery structures, and a conduction excitement winding indicating accumulative excitement is further wound to the PM magnetic pole.

FIG. 31 is a schematic view showing a structure of the present invention applied in a coaxial 3-layer type plate electric machinery structure, wherein a PM magnetic pole for executing bilateral coupling with the inner and the outer layer plate electric machinery structures is wrapped by a permeable body to constitute a magnetic pole on the mid layer plate electric machinery structure that executes EME coupling with the inner and the outer layer plate electric machinery structures, and a conduction excitement winding indicating accumulative excitement is further wound to the PM magnetic pole.

As illustrated in FIG. 31 showing a coaxial 3-layer type plate electric machinery structure, wherein a PM magnetic pole 103 is wrapped by a permeable body on the mid layer plate electric machinery structure 42 that executes EME coupling with both the inner layer plate electric machinery structure 41 and the outer layer plate electric machinery structure 43 to constitute a magnetic pole, and the magnetic poles on both ends of the PM magnetic pole 103 execute bilateral coupling with the inner layer plate electric machinery structure 41 and the outer layer plate electric machinery structure 43 respectively to achieve EME interaction, and a conduction excitement winding 100 is wound to the PM magnetic pole 103 thus further constituting a coaxial 3-layer type plate electric machinery provided with an accumulative excitement winding being wound to the PM magnetic pole 103.

Figure 32:
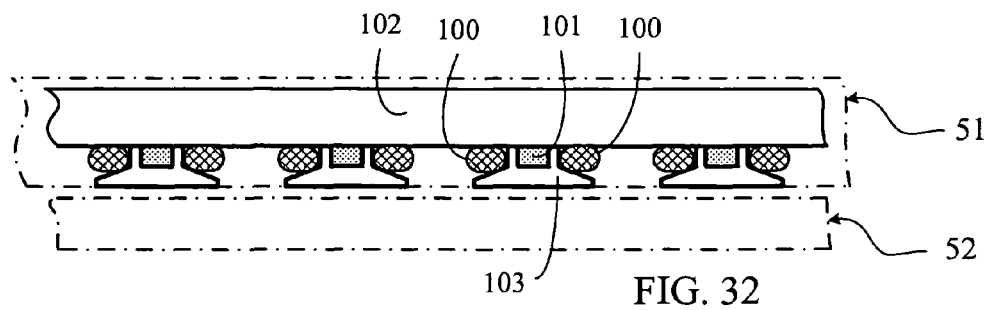
FIG. 32 is a schematic view showing a structure of the present invention applied in a linear, double layer type electric machinery structure, wherein a PM magnetic pole indicating accumulative excitement wrapped between a conduction winding excited individual magnetic pole and a magnetic circuit is disposed on an EME coupling aspect of the inner layer linear electric machinery structure.

FIG. 32 is a schematic view showing a structure of the present invention applied in a double layer type linear electric machinery structure, wherein a PM magnetic pole indicating accumulative excitement wrapped between a conduction winding excited individual magnetic pole and a magnetic circuit is disposed on an EME coupling aspect of the inner layer linear electric machinery structure.

As illustrated in FIG. 32 showing a double layer type linear electric machinery structure, the PM magnetic pole 103 indicating accumulative excitement wrapped either in the mid section of the magnetic circuit of the conduction winding individual magnetic pole 101 or between the individual magnetic pole 101 and the magnetic circuit 102 to execute EME interaction with the outer layer linear electric machinery structure 52 is disposed on an EME coupling aspect of the inner layer linear electric machinery structure 51 in a direction facing the outer layer linear electric machinery structure 52, or the PM magnetic pole 103 indicating accumulative excitement wrapped either in the mid section of the magnetic circuit of the conduction winding individual magnetic pole 101 or between the individual magnetic pole 101 and the magnetic circuit 102 to execute EME interaction with the inner layer linear electric machinery structure 51 is disposed on an EME coupling aspect of the outer layer linear electric machinery structure 52 in a direction facing the inner layer linear electric machinery structure 51 thus to constitute a double layer type linear electric machinery provided with a PM magnetic pole 103 indicating accumulative excitement and being wrapped by the conduction winding excited magnetic pole 101 and the magnetic circuit 102.

Figure 33:
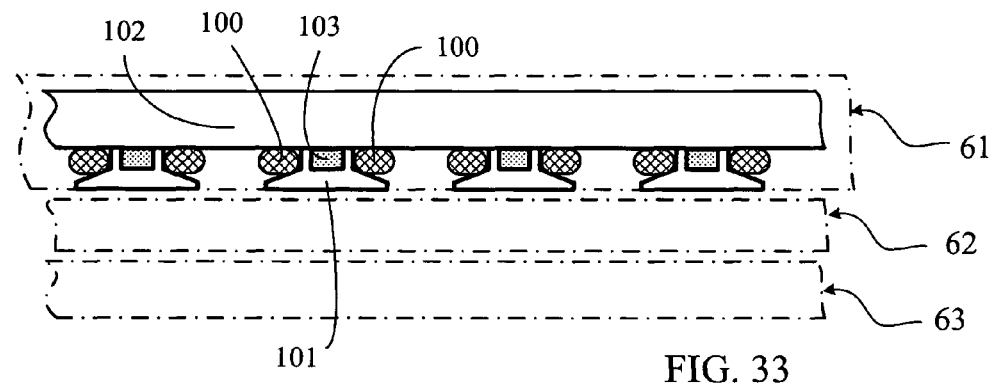
FIG. 33 is a schematic view showing a structure of the present invention applied in a 3-layer type plate electric machinery structure, wherein a PM magnetic pole indicating accumulative excitement wrapped between a conduction winding excited individual magnetic pole and a magnetic circuit is disposed on an EME coupling aspect of the inner layer linear electric machinery structure in a direction facing the mid layer linear electric machinery structure.

FIG. 33 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the inner layer linear electric machinery structure in a direction facing the mid layer linear electric machinery structure.

As illustrated in FIG. 33 showing a 3-layer type linear electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the mid layer linear electric machinery structure 62 is disposed on an EME coupling aspect of the inner layer linear electric machinery structure 61 in a direction facing the mid layer linear electric machinery structure 62, and the type of the electric machinery structure between the mid layer linear electric machinery structure 62 and the outer layer linear electric machinery structure 63 is selected upon its EME property to constitute a 3-layer type linear electric machinery provided with the PM magnetic pole 103 with accumulative excitement being wrapped by the conduction winding excited magnetic pole 101 and the magnetic circuit 102.

Figure 34:
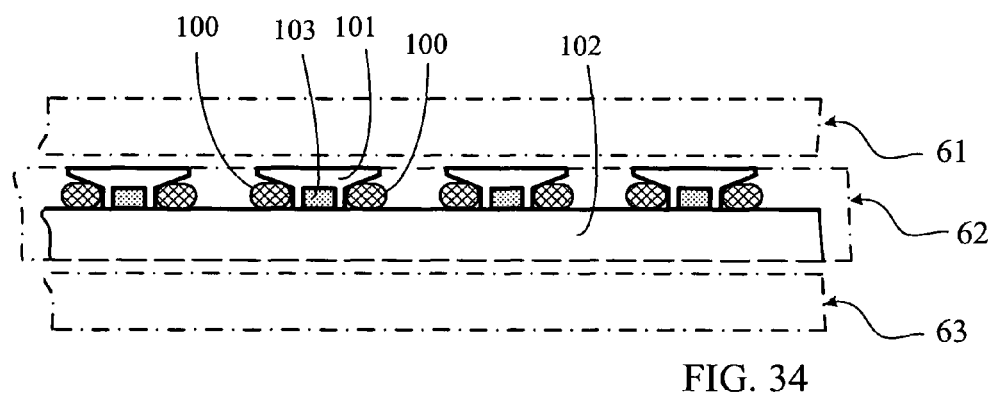
FIG. 34 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the mid layer linear electric machinery structure in a direction facing the inner layer linear electric machinery structure.

FIG. 34 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the mid layer linear electric machinery structure in a direction facing the inner layer linear electric machinery structure.

As illustrated in FIG. 34 showing a 3-layer type linear electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the inner layer linear electric machinery structure 61 is disposed on an EME coupling aspect of the mid layer linear electric machinery structure 62 in a direction facing the inner layer linear electric machinery structure 61, and the type of the electric machinery structure between the mid layer linear electric machinery structure 62 and the outer layer linear electric machinery structure 63 is selected upon its EME property to constitute a 3-layer type linear electric machinery provided with the PM magnetic pole 103 with accumulative excitement being wrapped by the conduction winding excited magnetic pole 101 and the magnetic circuit 102.

Figure 35:
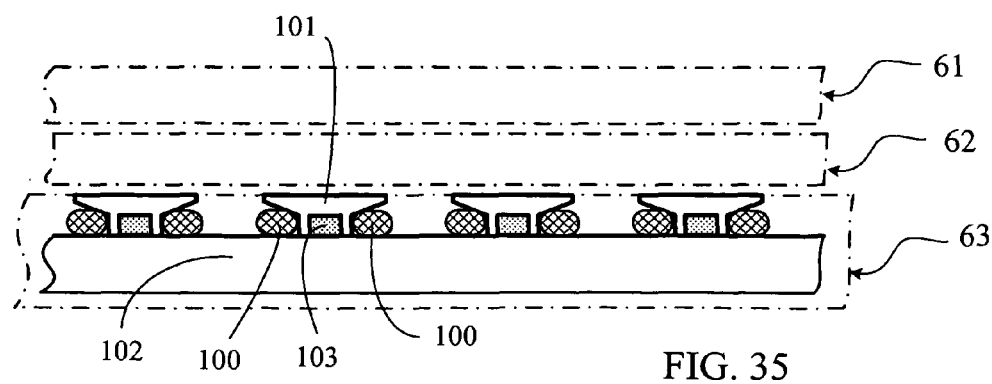
FIG. 35 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the outer layer linear electric machinery structure in a direction facing the mid layer linear electric machinery structure.

FIG. 35 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the outer layer linear electric machinery structure in a direction facing the mid layer linear electric machinery structure.

As illustrated in FIG. 35 showing a 3-layer type linear electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the mid layer linear electric machinery structure 62 is disposed on an EME coupling aspect of the outer layer linear electric machinery structure 63 in a direction facing the mid layer linear electric machinery structure 62, and the type of the electric machinery structure between the mid layer linear electric machinery structure 62 and the inner layer linear electric machinery structure 61 is selected upon its EME property to constitute a 3-layer type linear electric machinery provided with the PM magnetic pole 103 with accumulative excitement being wrapped by the conduction winding excited magnetic pole 101 and the magnetic circuit 102.

Figure 36:
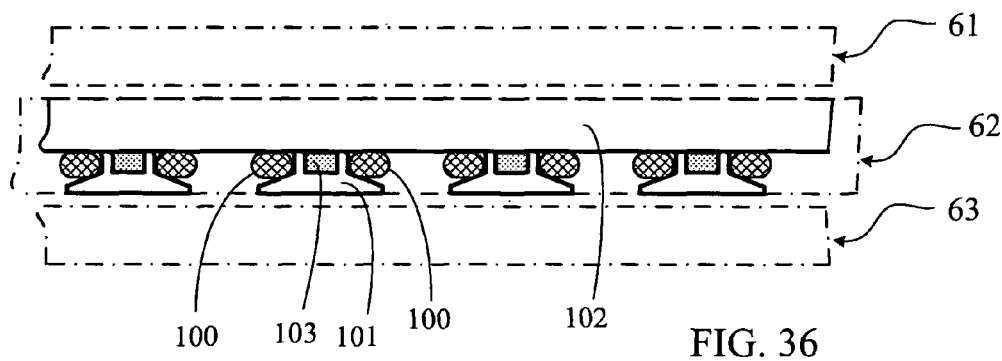
FIG. 36 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the mid layer linear electric machinery structure in a direction facing the outer layer linear electric machinery structure.

FIG. 36 is a schematic view showing a structure of the present invention applied in a 3-layer type linear electric machinery structure, wherein a PM magnetic pole indicating accumulative excitement wrapped between a conduction winding excited individual magnetic pole and a magnetic circuit is disposed on an EME coupling aspect of the mid layer linear electric machinery structure in a direction facing the outer layer linear electric machinery structure.

As illustrated in FIG. 36 showing a 3-layer type linear electric machinery structure, the PM magnetic pole 103 indicating accumulative excitement wrapped either in the mid section of the magnetic circuit of the conduction winding excited individual magnetic pole 101 or between the individual magnetic pole 101 and the magnetic circuit 102 to execute EME interaction with the outer layer linear electric machinery structure 63 is disposed on an EME coupling aspect of the mid layer linear electric machinery structure 62 in a direction facing the outer layer linear electric machinery structure 63, and the type of the electric machinery structure between the mid layer linear electric machinery structure 62 and the inner layer linear electric machinery structure 61 is selected upon its EME property to constitute a 3-layer type linear electric machinery provided with the PM magnetic pole 103 with accumulative excitement being wrapped by the conduction winding excited magnetic pole 101 and the magnetic circuit 102.

Figure 37:
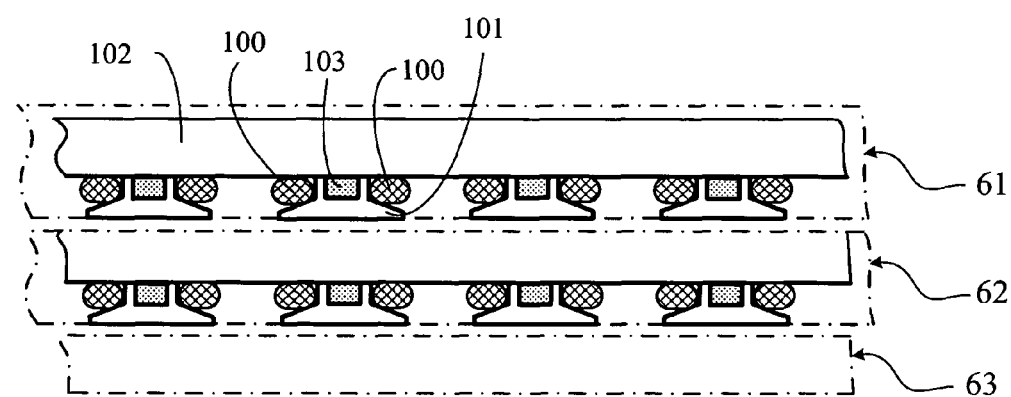
FIG. 37 is a schematic view showing a structure of the present invention applied in a 3-layer type linear electric machinery structure, wherein two PM magnetic poles indicating accumulative excitement each wrapped between a conduction winding excited individual magnetic pole and a magnetic circuit are respectively disposed on an EME coupling aspect of the inner layer linear electric machinery structure in a direction facing the mid layer linear electric machinery structure and on an EME coupling aspect of the mid layer linear electric machinery structure in a direction facing the outer layer linear electric machinery structure.

FIG. 37 is a schematic view showing a structure of the present invention applied in a 3-layer type linear electric machinery structure, wherein two PM magnetic poles indicating accumulative excitement each wrapped between a conduction winding excited individual magnetic pole and a magnetic circuit are respectively disposed on an EME coupling aspect of the inner layer linear electric machinery structure in a direction facing the mid layer linear electric machinery structure and on an EME coupling aspect of the mid layer linear electric machinery structure in a direction facing the outer layer linear electric machinery structure.

As illustrated in FIG. 37 showing a 3-layer type linear electric machinery structure, an EME coupling aspect of the inner layer linear electric machinery structure 61 in a direction facing the mid layer linear electric machinery structure 62 and an EME coupling aspect of the mid layer linear electric machinery structure 62 in a direction facing the outer layer linear electric machinery structure 63 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a 3-layer type linear electric machinery provided with two PM magnetic poles 103 with accumulative excitement being wrapped by the conduction winding excited magnetic pole 101 and the magnetic circuit 102.

Figure 38:
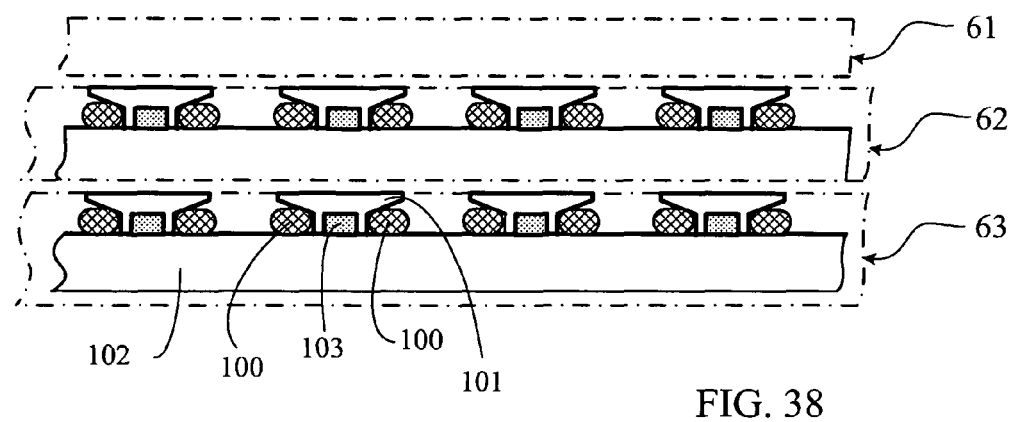
FIG. 38 is a schematic view showing a structure of the present invention applied in a 3-layer type linear electric machinery structure, wherein two PM magnetic poles indicating accumulative excitement each wrapped between a conduction winding excited individual magnetic pole and a magnetic circuit are respectively disposed on an EME coupling aspect of the outer layer linear electric machinery structure in a direction facing the mid layer linear electric machinery structure and on an EME coupling aspect of the mid layer linear electric machinery structure in a direction facing the inner layer linear electric machinery structure.

FIG. 38 is a schematic view showing a structure of the present invention applied in a 3-layer type linear electric machinery structure, wherein two PM magnetic poles indicating accumulative excitement each wrapped between a conduction winding excited individual magnetic pole and a magnetic circuit are respectively disposed on an EME coupling aspect of the outer layer linear electric machinery structure in a direction facing the mid layer linear electric machinery structure and on an EME coupling aspect of the mid layer linear electric machinery structure in a direction facing the inner layer linear electric machinery structure.

As illustrated in FIG. 38 showing a 3-layer type linear electric machinery structure, an EME coupling aspect of the outer layer linear electric machinery structure 63 in a direction facing the mid layer linear electric machinery structure 62 and an EME coupling aspect of the mid layer linear electric machinery structure 62 in a direction facing the inner layer linear electric machinery structure 61 are each disposed with a PM magnetic pole 103 indicating accumulative excitement wrapped either in the mid section of the magnetic circuit of the conduction winding excited individual magnetic pole 101 or between the individual magnetic pole 101 and the magnetic circuit 102 thus to constitute a 3-layer type linear electric machinery provided with two PM magnetic poles 103 with accumulative excitement being wrapped by the conduction winding excited magnetic pole 101 and the magnetic circuit 102.

Figure 39:
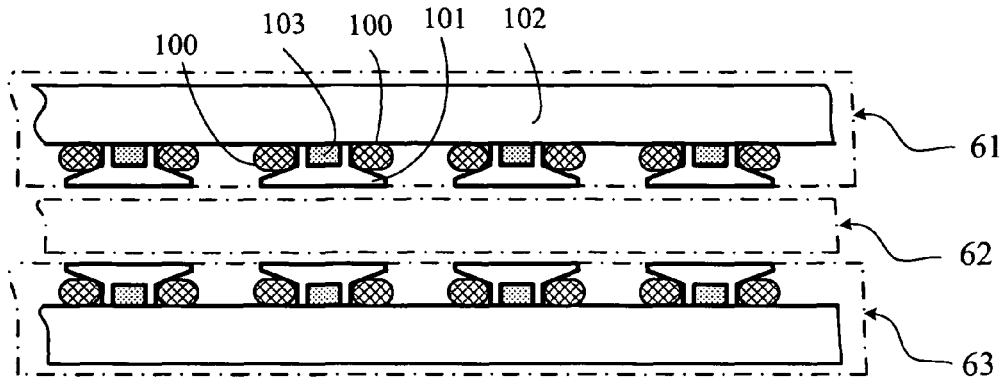
FIG. 39 is a schematic view showing a structure of the present invention applied in a 3-layer type linear electric machinery structure, wherein an EME coupling aspect of the outer layer linear electric machinery structure and an EME coupling aspect of the inner layer linear electric machinery structure to respectively execute EME coupling with the mid layer linear electric machinery structure are each disposed with a PM magnetic pole indicating accumulative excitement wrapped between a conduction winding excited individual magnetic pole and a magnetic circuit.

FIG. 39 is a schematic view showing a structure of the present invention applied in a 3-layer type linear electric machinery structure, wherein an EME coupling aspect of the outer layer linear electric machinery structure and an EME coupling aspect of the inner layer linear electric machinery structure to respectively execute EME coupling with the mid layer linear electric machinery structure are each disposed with a PM magnetic pole indicating accumulative excitement wrapped between a conduction winding excited individual magnetic pole and a magnetic circuit.

As illustrated in FIG. 39 showing a 3-layer type linear electric machinery structure, wherein an EME coupling aspect of the outer layer linear electric machinery structure 63 and an EME coupling aspect of the inner layer linear electric machinery structure 61 to respectively execute EME coupling with the mid layer linear electric machinery structure 62 are each disposed with a PM magnetic pole 103 indicating accumulative excitement wrapped either by the mid section of the magnetic circuit of a conduction winding excited individual magnetic pole 101 or by an individual magnetic pole 101 and a magnetic circuit 102 to execute EME interaction with the mid layer linear electric machinery structure 62, thus to constitute a 3-layer type linear electric machinery provided with two PM magnetic poles 103 each indicating accumulative excitement and being wrapped by the conduction winding excited magnetic pole 101 and the magnetic circuit 102.

Figure 40:
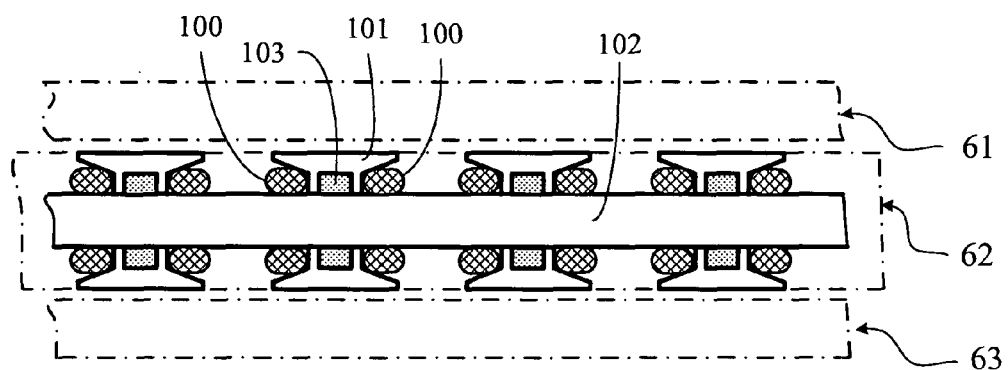
FIG. 40 is a schematic view showing a structure of the present invention applied in a 3-layer type linear electric machinery structure, wherein two PM magnetic poles indicating accumulative excitement wrapped between a conduction winding excited individual magnetic pole and a magnetic circuit are respectively disposed on two EME coupling aspects on both sides of the mid layer linear electric machinery structure for executing EME coupling with both the outer layer linear electric machinery structure and the inner layer linear electric machinery structure.

FIG. 40 is a schematic view showing a structure of the present invention applied in a 3-layer type linear electric machinery structure, wherein two PM magnetic poles indicating accumulative excitement wrapped by a conduction winding excited individual magnetic pole and a magnetic circuit are respectively disposed on two EME coupling aspects on both sides of the mid layer linear electric machinery structure for executing EME coupling with both the outer layer linear electric machinery structure and the inner layer linear electric machinery structure.

As illustrated in FIG. 40 showing a 3-layer type linear electric machinery structure, two PM magnetic poles 103 indicating accumulative excitement wrapped either in the mid section of the magnetic circuit of the conduction winding excited individual magnetic pole 101 or between the individual magnetic pole 101 and the magnetic circuit 102 are respectively disposed on two EME coupling aspects of the mid layer linear electric machinery structure 62 in a direction facing the inner layer linear electric machinery structure 61 and in another direction facing the outer layer linear electric machinery structure 63 to execute EME coupling with both the outer and the inner layer linear electric machinery structures 63 and 61 thus to constitute a 3-layer type linear electric machinery provided with the PM magnetic pole 103 with accumulative excitement being wrapped by the conduction winding excited magnetic pole 101 and the magnetic circuit 102.

Figure 41:
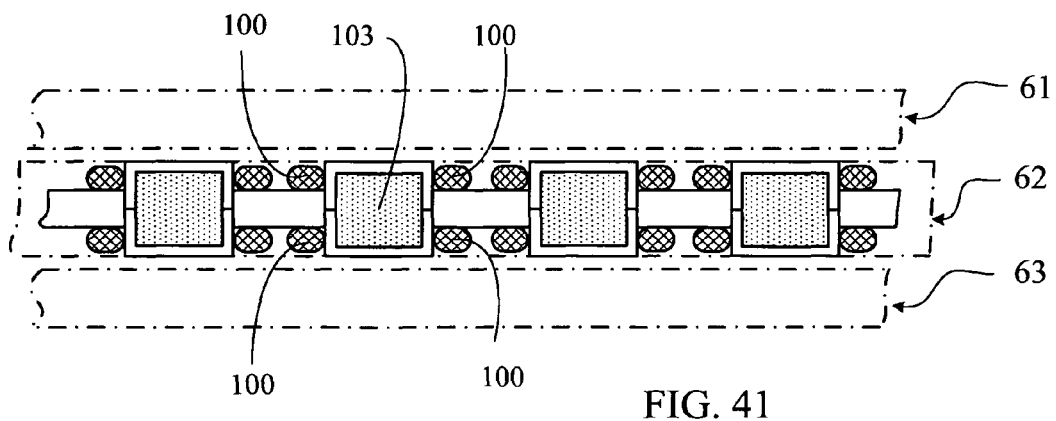
FIG. 41 is a schematic view showing a structure of the present invention applied in a 3-layer type linear electric machinery structure, wherein a PM magnetic pole for executing bilateral coupling with the inner and the outer layer linear electric machinery structures is wrapped by a permeable body to constitute a magnetic pole on the mid layer linear electric machinery structure that executes EME coupling with the inner and the outer ring electric machinery structures, and a conduction excitement winding indicating accumulative excitement is further wound to the PM magnetic pole.

FIG. 41 is a schematic view showing a structure of the present invention applied in a 3-layer type linear electric machinery structure, wherein a PM magnetic pole for executing bilateral coupling with the inner and the outer layer linear electric machinery structures is wrapped by a permeable body to constitute a magnetic pole on the mid layer linear electric machinery structure that executes EME coupling with the inner and the outer layer linear electric machinery structures, and a conduction excitement winding indicating accumulative excitement is further wound to the PM magnetic pole.

As illustrated in FIG. 41 showing a 3-layer type linear electric machinery structure, wherein a PM magnetic pole 103 is wrapped by a permeable body on the mid layer linear electric machinery structure 62 that executes EME coupling with both the inner layer linear electric machinery structure 61 and the outer layer linear electric machinery structure 63 to constitute a magnetic pole, and the magnetic poles on both ends of the PM magnetic pole 103 execute bilateral coupling with the inner layer linear electric machinery structure 61 and the outer layer linear electric machinery structure 63 respectively to achieve EME interaction, and a conduction excitement winding 100 is wound to the PM magnetic pole 103 thus further constituting a coaxial 3-layer type linear electric machinery provided with an accumulative excitement winding being wound to the PM magnetic pole 103.

In any of those preferred embodiments of the PM magnetic pole 103 and conduction excitement winding as illustrated in FIGS. 11~41, the disposed locations of said PM magnetic pole 103 and the conduction excitement winding 100 include disposed at the mid electric machinery structure of the coaxial 3-ring type electric machinery structure, the coaxial 3-layer type plate electric machinery structure, the 3-layer type linear electric machinery structure or other 3-piece electric machinery structure for executing EME interaction, wherein:

the mid electric machinery structure for disposing the PM magnetic pole 103 and the conduction excitement winding 100 either serves as the static portion of the electric machinery or is disposed with an optional conduction brush, conduction ring or conduction foil for serving as the mobile portion of the electric machinery.

Quantity of the magnetic pole disposed on the EME coupling aspect of each electric machinery structure for all those preferred embodiments described in FIGS. 11 through 41 may be the same or different as applicable.

The PM magnetic pole 103 wrapped between the conduction winding excited individual magnetic pole 101 and the magnetic circuit 102 as illustrated in FIGS. 11~41 may be wrapped in a mid section of the magnetic circuit 102 between conduction winding excited individual magnetic poles 101 with different polarities as applicable.

Figure 42:
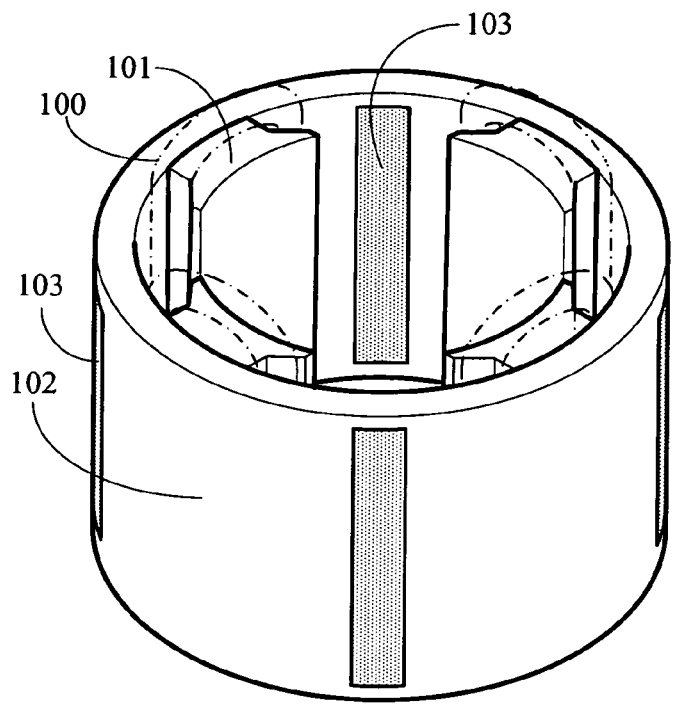
FIG. 42 is a schematic view showing an embodiment of the present invention applied in the outer layer electric machinery structure of a cylinder electric machinery structure, wherein the magnetic circuit between the magnetic poles of different polarities with a conduction winding is disposed a PM magnetic pole wrapped by permeable magnetic circuit on at least one side.

The electric machinery provided with a PM magnetic pole wrapped by a conduction winding excited magnetic pole of the present invention, in the double layer type cylinder electric machinery structure or coaxial 3-ring type electric machinery structure, or in the double layer type plate electric machinery structure or coaxial 3-layer type plate electric machinery structure, or in the double layer type linear electric machinery structure or 3-layer type linear electric machinery structure, wherein the magnetic pole 101 disposed with a conduction winding 100 and the magnetic circuit 102 between magnetic poles wrap the PM magnetic pole and form a magnetic circuit made of permeable material on one or above one sides of the magnetic poles of different polarities of the PM magnetic poles to constitute a permeable magnetic circuit wrapped at least on one side or overall covering between two magnetic poles of different polarities of the PM magnetic pole 103 for passing through partial magnetic line of force while the PM magnetic pole remains to form partial strength of the magnetic field on the pole-face of the magnetic pole 101 disposed with a conduction winding 100 coupled with the magnetic circuit 102 so that when the PM magnetic pole 103 being inversely excited in the course of the operation, two magnetic poles of different polarities on the PM magnetic pole 103 keeps closed magnetic circuit to maintain its magnetic line of force so as to enhance the property to against inverse excitation; detailed description is as follows:

FIG. 42 is a schematic view showing an embodiment of the present invention applied in the outer layer electric machinery structure of a cylinder electric machinery structure, wherein the magnetic circuit between the magnetic poles of different polarities with a conduction winding is disposed a PM magnetic pole wrapped by permeable magnetic circuit on at least one side.

As illustrated in FIG. 42 is the present invention to be applied in the outer layer electric machinery structure of the cylinder electric machinery structure, wherein a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement, whereof the outer layer electric machinery structure of the cylinder electric machinery structure can serve as the outer ring electric machinery structure of the coaxial 3-ring type electric machinery structure.

Figure 43:
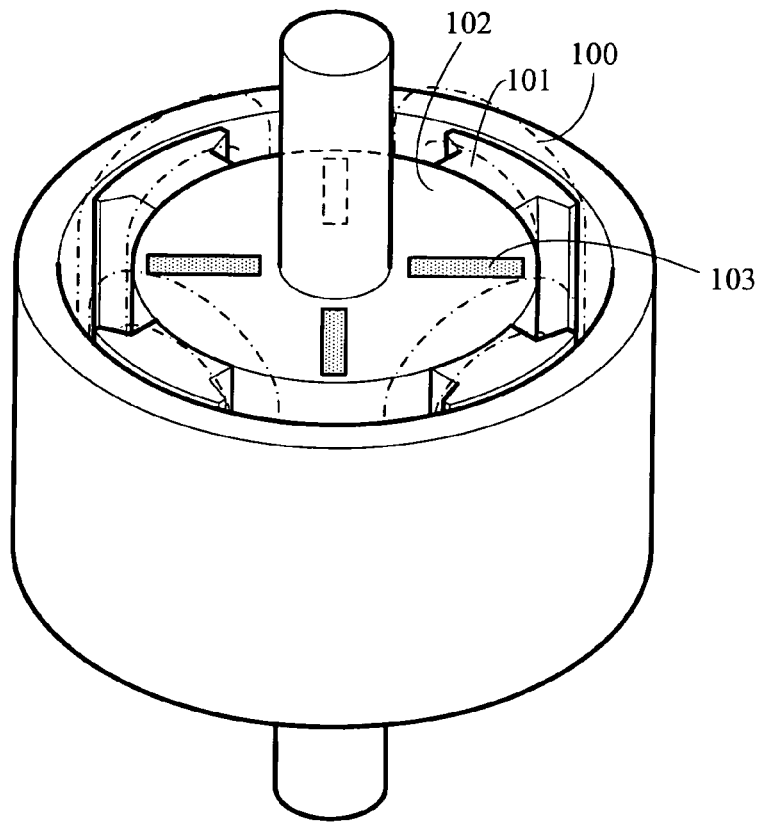
FIG. 43 is a schematic view showing an embodiment of the present invention applied in the inner layer electric machinery structure of a cylinder electric machinery structure, wherein the magnetic circuit between the magnetic poles of different polarities with a conduction winding is disposed a PM magnetic pole wrapped by permeable magnetic circuit on at least one side.

FIG. 43 is a schematic view showing an embodiment of the present invention applied in the inner layer electric machinery structure of a cylinder electric machinery structure, wherein the magnetic circuit between the magnetic poles of different polarities with a conduction winding is disposed a PM magnetic pole wrapped by permeable magnetic circuit on at least one side.

As illustrated in FIG. 43 is the present invention to be applied in the inner layer electric machinery structure of the cylinder electric machinery structure, wherein a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement, whereof the inner layer electric machinery structure of the cylinder electric machinery structure can serve as the inner ring electric machinery structure of the coaxial 3-ring type electric machinery structure.

Figure 44:
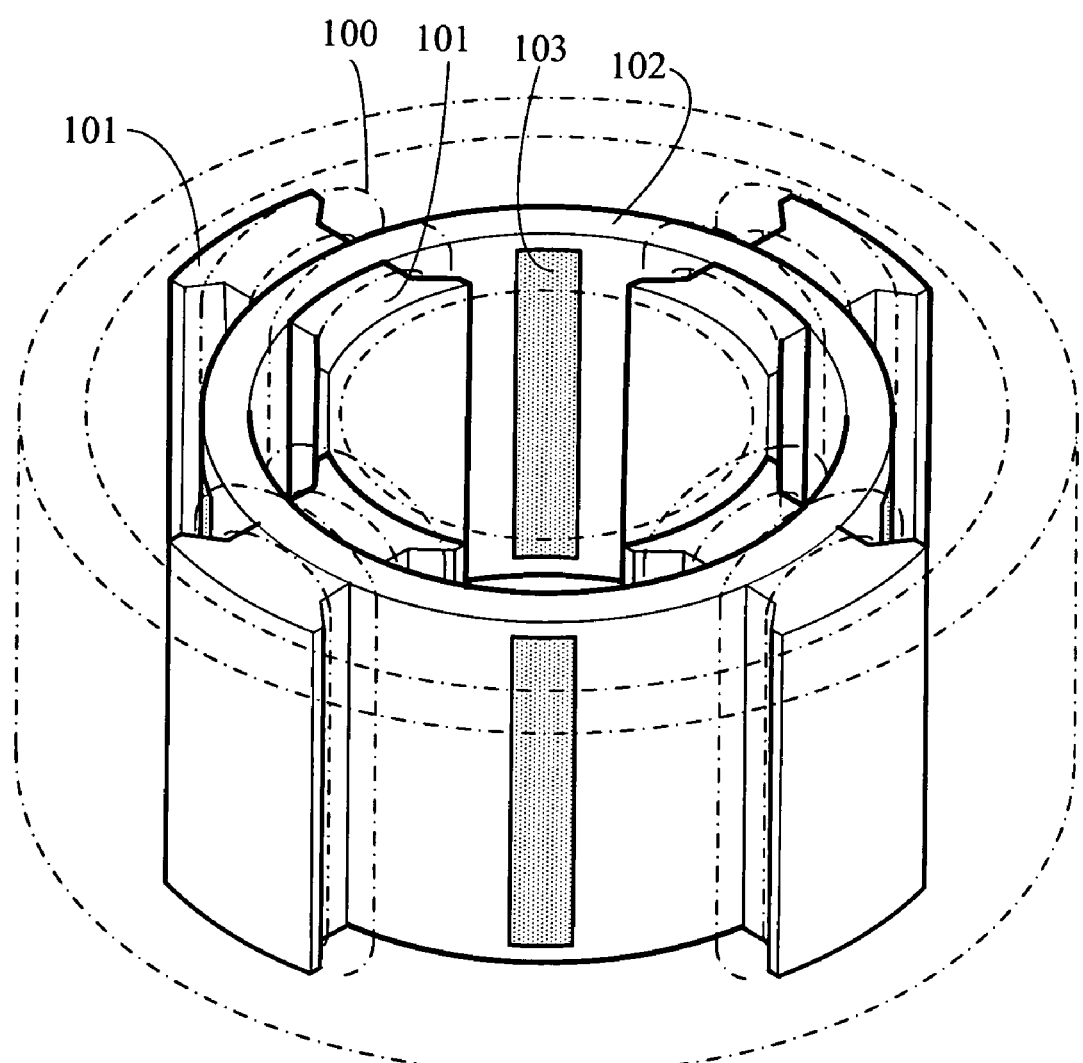
FIG. 44 is a schematic view showing an embodiment of the present invention applied in a coaxial 3-ring type electric machinery structure, wherein the magnetic circuit between the magnetic poles of different polarities with a conduction winding on the mid ring electric machinery structure of which magnetic poles on inner and outer side are disposed with the conduction winding is disposed a PM magnetic pole wrapped by permeable magnetic circuit on at least one side.

FIG. 44 is a schematic view showing an embodiment of the present invention applied in a coaxial 3-ring type electric machinery structure, wherein the magnetic circuit between the magnetic poles of different polarities with a conduction winding on the mid ring electric machinery structure of which magnetic poles on inner and outer side are disposed with the conduction winding is disposed a PM magnetic pole wrapped by permeable magnetic circuit on at least one side.

As illustrated in FIG. 44 is the present invention to be applied in the coaxial 3-ring type electric machinery structure, at the mid ring electric machinery structure of which the magnetic poles 101 on both inner and outer side are disposed with the conduction winding 100 a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement.

Figure 45:
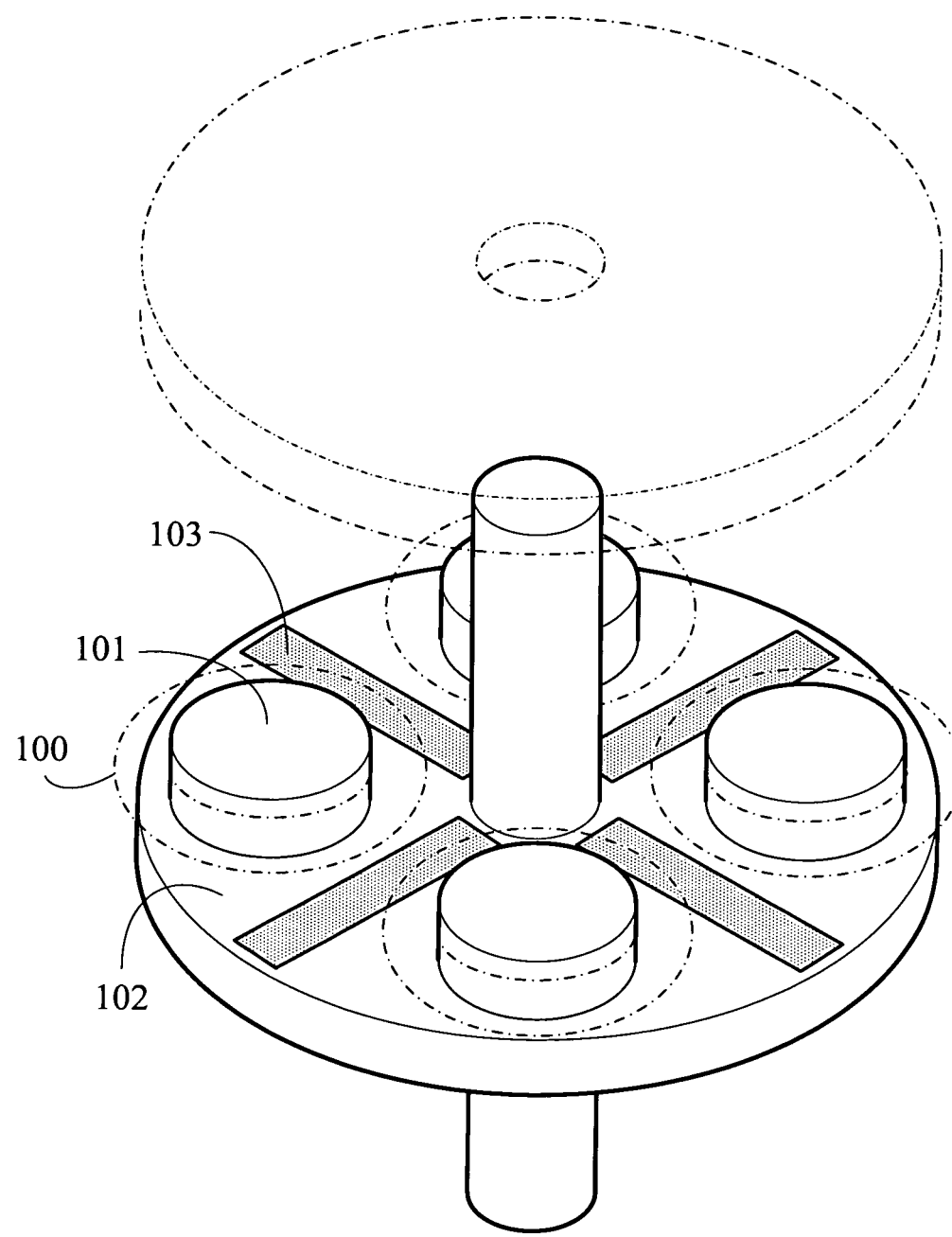
FIG. 45 is a schematic view showing an embodiment of the present invention applied in the plate electric machinery structure, wherein the magnetic circuit between the magnetic poles of different polarities with a conduction winding is disposed a PM magnetic pole wrapped by permeable magnetic circuit on at least one side.

FIG. 45 is a schematic view showing an embodiment of the present invention applied in the plate electric machinery structure, wherein the magnetic circuit between the magnetic poles of different polarities with a conduction winding is disposed a PM magnetic pole wrapped by permeable magnetic circuit on at least one side.

As illustrated in FIG. 45 is the present invention to be applied in the plate electric machinery structure, wherein a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement, whereof the plate electric machinery structure can serve as the inner or outer ring electric machinery structure of the double layer type electric machinery structure as well as the inner or outer ring electric machinery structure of the coaxial 3-layer type electric machinery structure.

Figure 46:
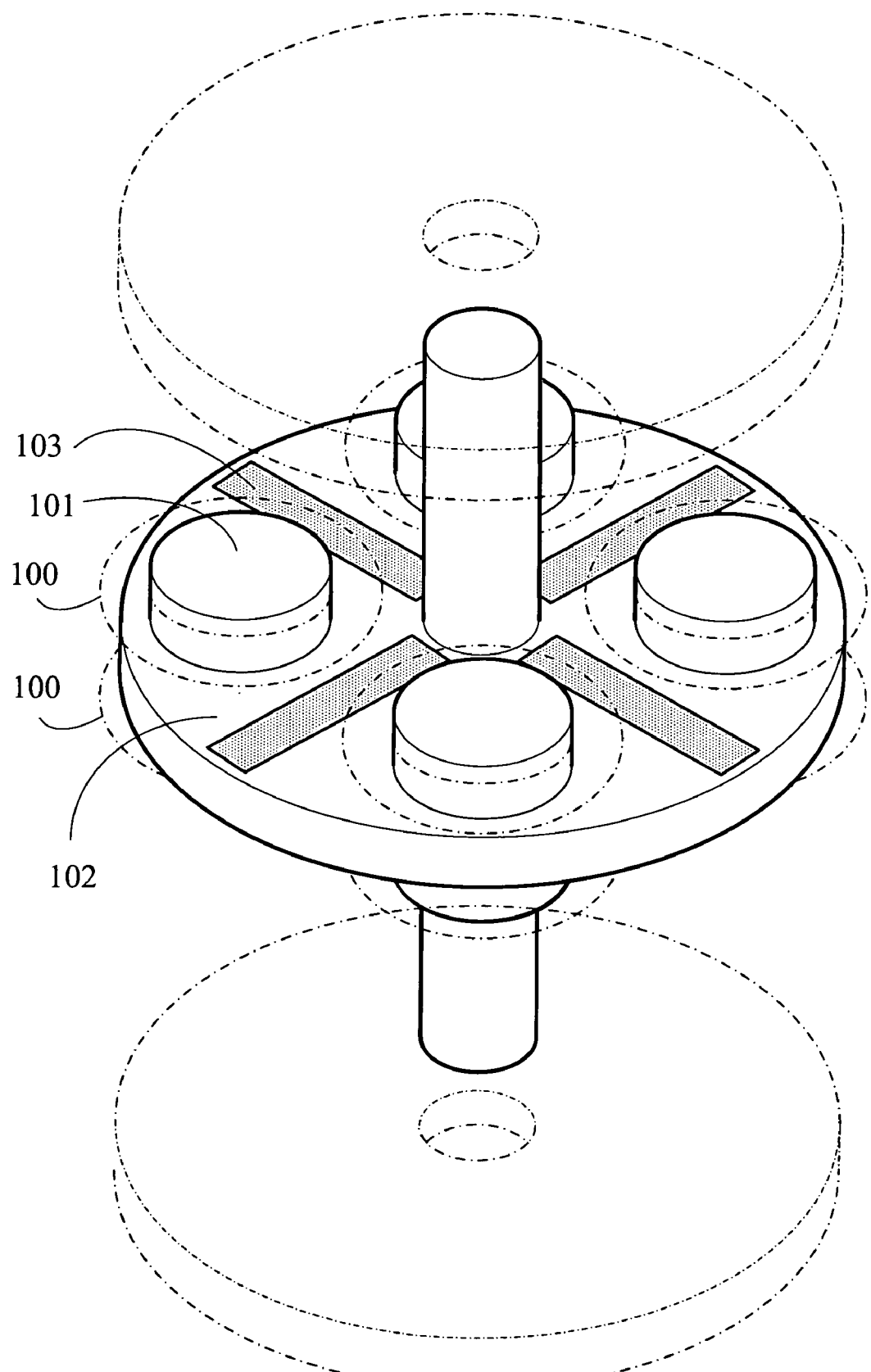
FIG. 46 is a schematic view showing an embodiment of the present invention applied in the coaxial 3-layer type plate electric machinery structure, wherein the magnetic circuit between the magnetic poles of different polarities with a conduction winding on the mid ring electric machinery structure of which magnetic poles on inner and outer side are disposed with the conduction winding is disposed a PM magnetic pole wrapped by permeable magnetic circuit on at least one side.

FIG. 46 is a schematic view showing an embodiment of the present invention applied in the coaxial 3-layer type plate electric machinery structure, wherein the magnetic circuit between the magnetic poles of different polarities with a conduction winding on the mid ring electric machinery structure of which magnetic poles on inner and outer side are disposed with the conduction winding is disposed a PM magnetic pole wrapped by permeable magnetic circuit on at least one side.

As illustrated in FIG. 46 is the present invention to be applied in the coaxial 3-layer type plate electric machinery structure, at the mid ring electric machinery structure of which the magnetic poles 101 on both inner and outer side are disposed with the conduction winding 100 a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement.

Figure 47:
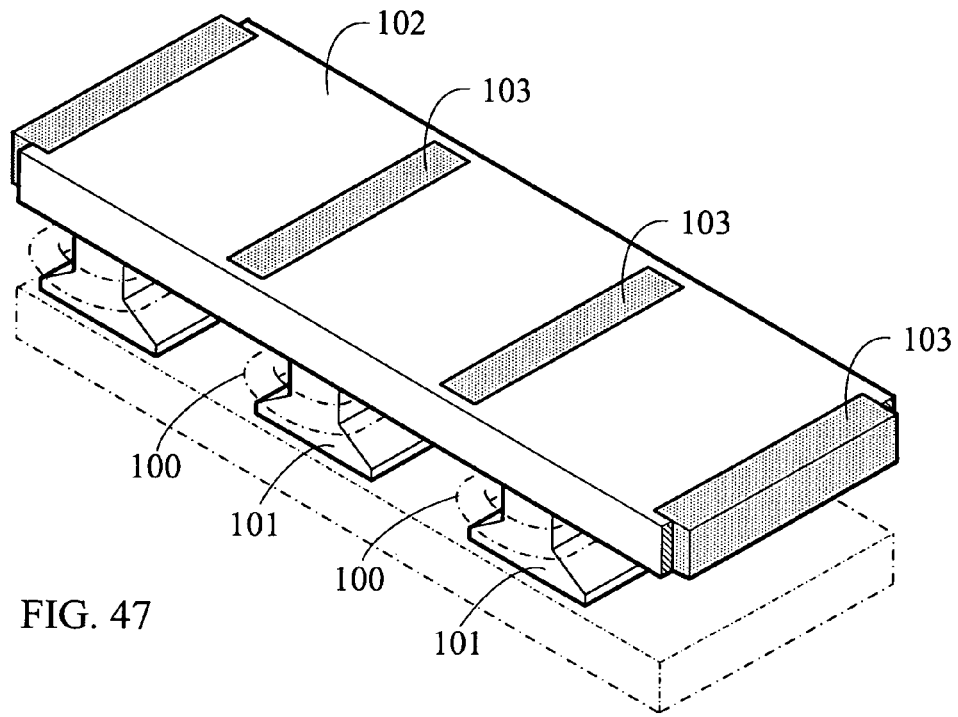
FIG. 47 is a schematic view showing an embodiment of the present invention applied in the linear electric machinery structure, wherein the magnetic circuit between the magnetic poles of different polarities with a conduction winding is disposed a PM magnetic pole wrapped by permeable magnetic circuit on at least one side.

FIG. 47 is a schematic view showing an embodiment of the present invention applied in the linear electric machinery structure, wherein the magnetic circuit between the magnetic poles of different polarities with a conduction winding is disposed a PM magnetic pole wrapped by permeable magnetic circuit on at least one side.

As illustrated in FIG. 47 is the present invention to be applied in the linear electric machinery structure, wherein a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement, whereof the outer layer electric machinery structure of the cylinder electric machinery structure can serve as the outer ring electric machinery structure of the coaxial 3-ring type electric machinery structure.

Figure 48:
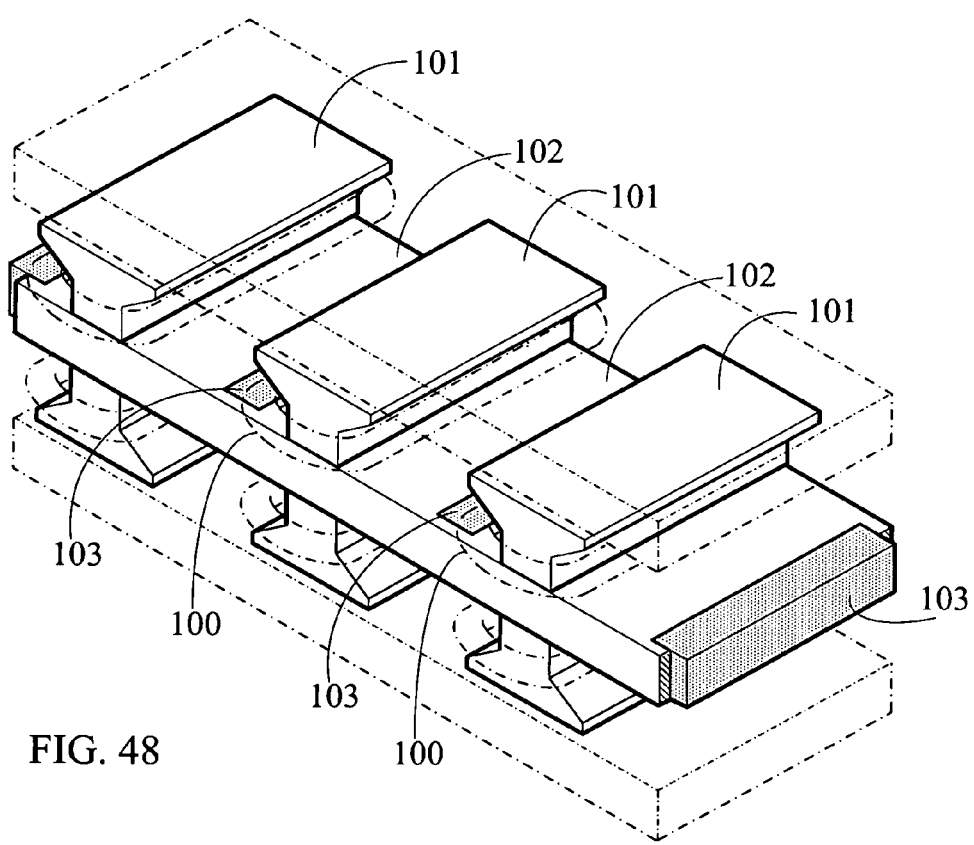
FIG. 48 is a schematic view showing an embodiment of the present invention applied in a 3-layer type linear electric machinery structure, wherein the magnetic circuit between the magnetic poles of different polarities with a conduction winding on the mid layer linear electric machinery structure of which magnetic poles on inner and outer side are disposed with the conduction winding is disposed a PM magnetic pole wrapped by permeable magnetic circuit on at least one side.

FIG. 48 is a schematic view showing an embodiment of the present invention applied in a 3-layer type linear electric machinery structure, wherein the magnetic circuit between the magnetic poles of different polarities with a conduction winding on the mid layer linear electric machinery structure of which magnetic poles on inner and outer side are disposed with the conduction winding is disposed a PM magnetic pole wrapped by permeable magnetic circuit on at least one side.

As illustrated in FIG. 48 is the present invention to be applied in the 3-layer type linear electric machinery structure, at the mid layer linear electric machinery structure of which the magnetic poles 101 on both inner and outer side are disposed with the conduction winding 100 a PM magnetic pole 103 wrapped by permeable magnetic circuit on at least one side is disposed to the magnetic circuit 102 between magnetic poles 101 of different polarities with a conduction winding 100 whereof the polarities of the PM magnetic pole and the conduction winding 100 excited magnetic pole 101 indicates an electric machinery effect of accumulative excitement or differential excitement.

In any of those preferred embodiments of the present invention as illustrated in FIGS. 11~48, methods to input excitement electric energy of the conduction winding 100 disposed to the individual magnetic pole 101 include:

1. The excitement electric energy is inputted through a conduction ring and conduction brush when the structural component of the electric machinery containing the conduction winding excited individual magnetic pole is related to a mobile portion; or 2. The excitement electric energy is directly inputted when the structural component of the electric machinery containing the conduction winding excited individual magnetic pole is related to a static portion.

The applied structures of the electric machinery provided with a PM magnetic pole wrapped between a conduction winding excited individual magnetic pole and a magnetic circuit of the present invention include the cylinder electric machinery comprised of two structural components of electric machinery operating by EME interaction or the double layer type plate electric machinery, or the double layer type linear electric machinery for producing function of a generator, a motor, both a generator and a motor, an EME vortex coupling transmission, or EME vortex braking function; and its operating styles include:

1. Either electric machinery structural component serves as a static portion of the electric machinery while another electric machinery structural component serves as a mobile portion of the electric machinery; or 2. Both electric machinery structural components function as the mobile portions of the electric machinery.

The applied structures of the electric machinery provided with a PM magnetic pole wrapped between the conduction winding excited magnetic pole and the magnetic circuit of the present invention include the coaxial 3-ring type electric machinery, the coaxial 3-layer type plate electric machinery or the 3-layer type linear electric machinery that comprised of three structural components of electric machinery operating by EME interaction, or other electric machinery structure comprised of three-piece electric machinery structural components to execute EME interaction in producing function of a generator, a motor, both a generator and a motor, an EME vortex coupling transmission, or EME vortex braking function; and its operating styles include:

1. One EM structural component serves as a static portion of the electric machinery while the other two EM structural components function as two mobile portions of the electric machinery; or 2. Two EM structural components serve as two static portions of the electric machinery while the third EM structural component serves as a mobile portion of the electric machinery; or 3. All three EM structural components each serves as mobile portions of the electric machinery.

Selection and layout of the electric machinery structure and winding for the electric machinery with a PM magnetic pole wrapped by the conduction winding excited magnetic poles of any of those preferred embodiment illustrated in FIGS. 2~48 is disposed with electric machinery structural components including the conduction winding excited individual magnetic pole for wrapping the PM magnetic pole and other structural components of the electric machinery to execute EME interaction are made according to the properties of the entire assembly of the electric machinery, nature of inputted electric energy, control function, control mode, and output performance requirements.

According to the selection of EME operational properties and the quantity of disposed magnetic poles, the assembly of the electric machinery having a PM magnetic pole wrapped in the conduction winding excited magnetic pole of the present invention include those available for operating in DC or AC revolution or linear electric machinery are comprised of commutator brush, brushless, ring-brush, synchronous, asynchronous, internal revolving, external revolving, revolving at the middle of the electric machinery, double-acting, triple-acting, multi-layer type, multi-ring type, linear, DC brushless, or inverter electric machinery, or an electric machinery functioning as a generator or as a motor or as both a generator and a motor, coupling transmission device, as an EME vortex coupling transmission device, or an EME vortex braking device.

For example, ways of wrapping the PM magnetic pole 103 in the electric machinery provided with a PM magnetic pole wrapped by conduction winding excited magnetic poles of the present invention include using a mechanical locking member to clamp or secure, a screw and a nut structure to lock up, a rivet to secure, a pin and a pinhole structure to fix, or a packing means in proper size and selected geometric form to insert, a magnetic circuit structure to clamp, a casing to clamp, a dedicated structural member to clamp, an adhesion to bind, fuse, or weld the PM magnetic pole 103, or using any other means of the prior art to secure the PM magnetic pole 103.

The methods for the electric machinery provided with a PM magnetic pole wrapped by conduction winding excited magnetic poles to wrap the PM magnetic pole 103 is after the combination of the magnetic pole 101 of the conduction winding 100 and the magnetic circuit 102, to provide with at least one or more than one sides of the magnetic circuit made of permeable material collocated at one or a plurality of sides of two magnetic poles of different polarities from the PM magnetic pole 103 or wrapped overall between two magnetic poles of different polarities of the PM magnetic pole 103 disposed on the magnetic pole 101 or the magnetic circuit 102 for passing through partial magnetic line of force while the PM magnetic pole 103 remains having partial strength of the magnetic field of the original PM magnetic pole 103 on the pole-face of the magnetic pole 101.

The purpose of the electric machinery provided with a PM magnetic pole wrapped by conduction winding excited magnetic poles to collocate or wrap the magnetic circuit made of permeable material between the magnetic poles of different polarities on the PM magnetic pole 103 for passing through partial magnetic line of force is that when the PM magnetic pole 103 being inversely excited in the course of the operation, two magnetic poles of different polarities on the PM magnetic pole 103 keeps closed magnetic circuit to maintain its magnetic line of force so as to enhance the ability to against inverse excitation.

Figure 49:
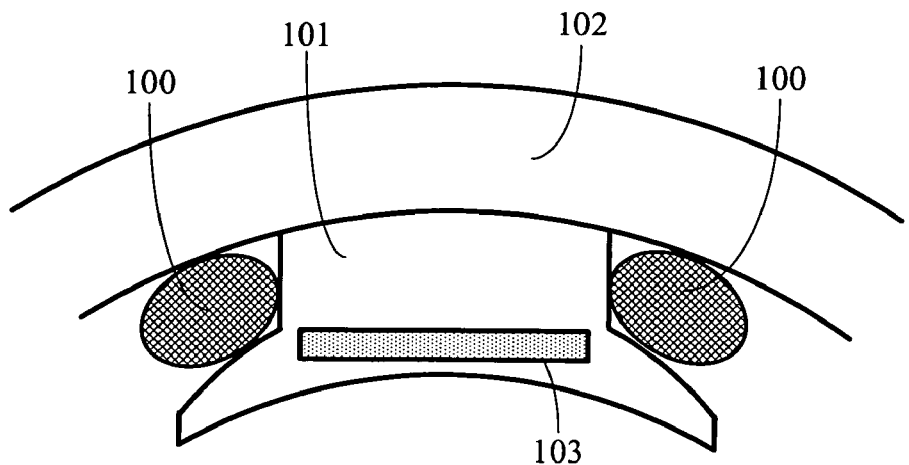
FIG. 49 is a schematic view showing an embodiment of the present invention applied in the outer layer electric machinery structure of a cylinder electric machinery structure, wherein a transverse rabbet is disposed to the magnetic pole at where near the pole-face for installing the PM magnetic pole.

Various embodiments of the electric machinery provided with a PM magnetic pole wrapped by conduction winding excited magnetic poles of the present invention are illustrated as follows:

FIG. 49 is a schematic view showing an embodiment of the present invention applied in the outer layer electric machinery structure of a cylinder electric machinery structure, wherein a transverse rabbet is disposed to the magnetic pole at where near the pole-face for installing the PM magnetic pole.

As illustrated in FIG. 49 is the present invention to be applied in the outer layer electric machinery structure of the cylinder electric machinery structure, wherein the magnetic pole 101 provided with a conduction winding 100 at where near the edge of the EME coupling aspect is disposed with a transverse rabbet, which indicates a linear or arcuate or any required geometric shape, or in a form of parallel along the EME coupling aspect, for installing the PM magnetic pole 103 with corresponding shape so as to indicate the electrical machinery effect of accumulative excitement or differential excitement with the polarity of the conduction winding 100 excited magnetic pole.

Figure 50:
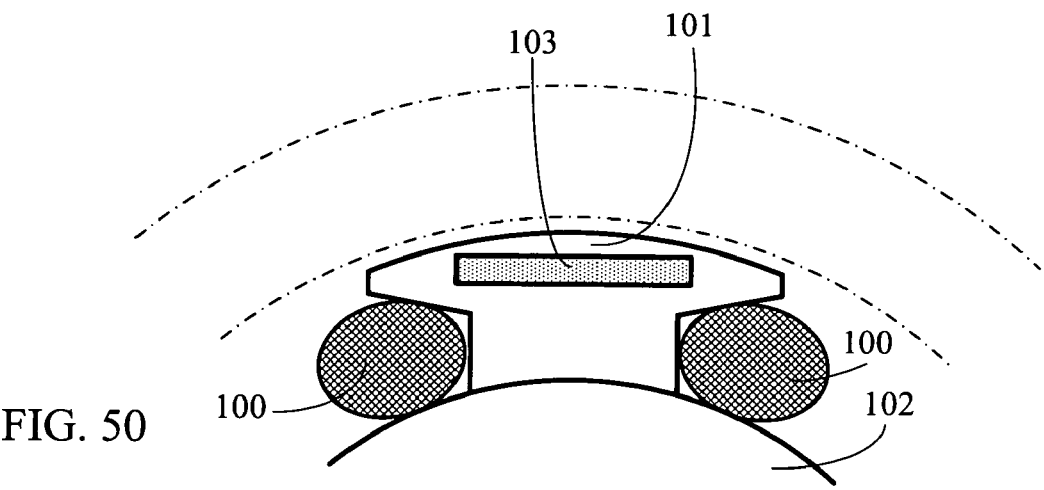
FIG. 50 is a schematic view showing an embodiment of the present invention applied in the inner layer electric machinery structure of a cylinder electric machinery structure, wherein a transverse rabbet is disposed to the magnetic pole at where near the pole-face for installing the PM magnetic pole.

FIG. 50 is a schematic view showing an embodiment of the present invention applied in the inner layer electric machinery structure of a cylinder electric machinery structure, wherein a transverse rabbet is disposed to the magnetic pole at where near the pole-face for installing the PM magnetic pole.

As illustrated in FIG. 50 is the present invention to be applied in the inner layer electric machinery structure of the cylinder electric machinery structure, wherein the magnetic pole 101 provided with a conduction winding 100 at where near the edge of the EME coupling aspect is disposed with a transverse rabbet, which indicates a linear, arcuate or any required geometric shape, or in a form of parallel along the EME coupling aspect, for installing the PM magnetic pole 103 with corresponding shape so as to indicate the electrical machinery effect of accumulative excitement or differential excitement with the polarity of the conduction winding 100 excited magnetic pole.

The embodied examples as shown in FIG. 49 and FIG. 50, whereof the magnetic pole 101 provided with a transverse rabbet for installing the PM magnetic pole 103 wound with a conduction winding 100 may be selected to add a protective cap made of either permeable material or non-permeable material on one or both sides of the magnetic pole 101 as needed; ways to dispose the protective cap include:

(1) the protective cap is not provided; or
(2) the protective cap is added on one or both sides of the PM magnetic pole 103, whereof the length of the protective cap is the same as the combined length of the magnetic pole 101 and the PM magnetic pole 103; or
(3) the protective cap is added on one or both sides of the magnetic pole 101 constituted by blocks or permeable laminated sheets for clamping the magnetic pole 101 constituted by permeable laminated sheets, whereof the protective cap extends at the direction facing the magnetic circuit 102 to connect with the magnetic circuit 102; or
(4) a PM magnetic pole 103 which is thinner than the thickness of the magnetic pole 101 is disposed into the transverse rabbet, whereof a protective cap is stuffed into or a filler is added into one or both ends of the transverse rabbet.

Figure 51:
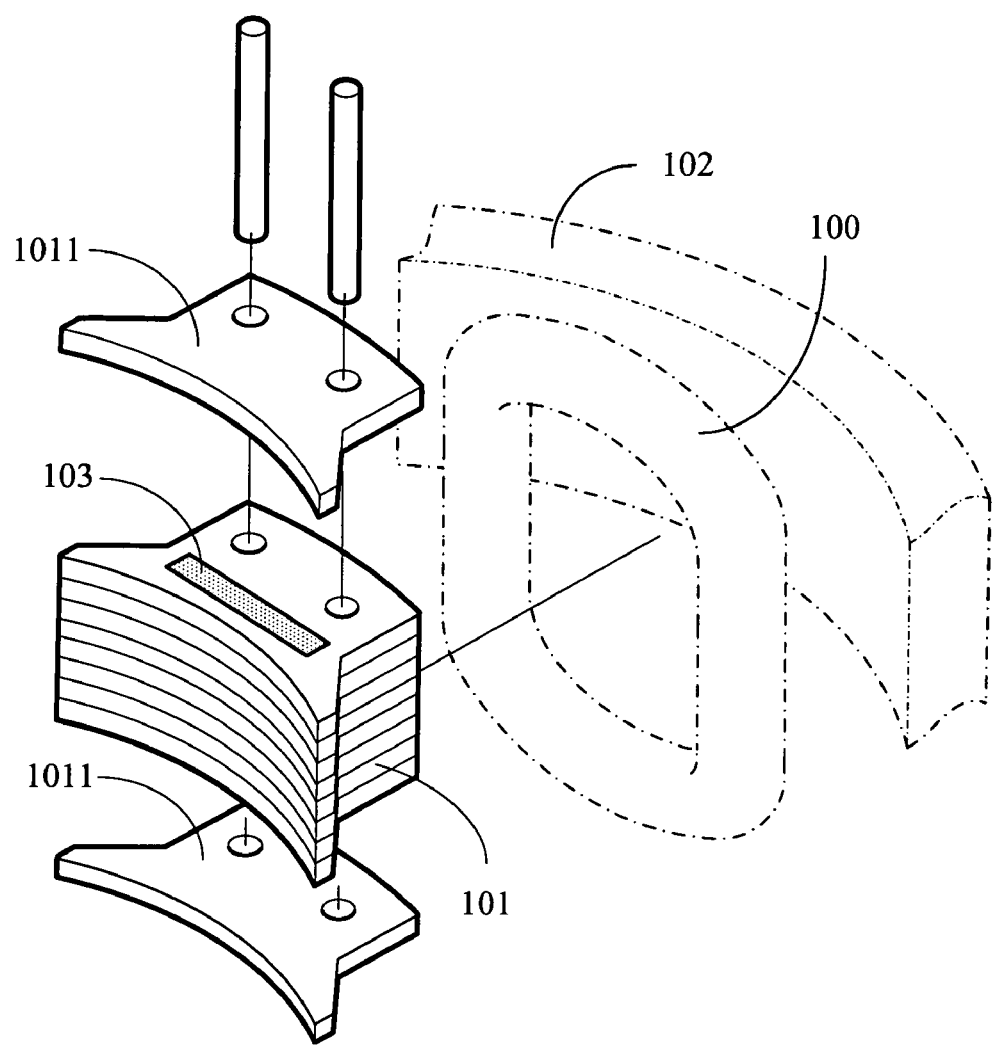
FIG. 51 is a schematic view showing an embodiment of the present invention applied in the outer layer electric machinery structure of a cylinder electric machinery structure, wherein a transverse rabbet is disposed at where near the pole-face on the magnetic pole provided with a conduction winding 100 for installing the PM magnetic pole, and a protective cap with the same length as the magnetic pole is disposed to one or both sides of the magnetic pole for clamping the magnetic pole and wrapping the PM magnetic pole.

FIG. 51 is a schematic view showing an embodiment of the present invention applied in the outer layer electric machinery structure of a cylinder electric machinery structure, wherein a transverse rabbet is disposed at where near the pole-face on the magnetic pole provided with a conduction winding 100 for installing the PM magnetic pole, and a protective cap with the same length as the magnetic pole is disposed to one or both sides of the magnetic pole for clamping the magnetic pole and wrapping the PM magnetic pole.

As illustrated in FIG. 51 is the present invention to be applied in the outer layer electric machinery structure of the cylinder electric machinery structure, wherein the magnetic pole 101 provided with a conduction winding 100 at where near the edge of EME coupling aspect is disposed with a transverse rabbet, which indicates a linear, arcuate or any required geometric shape, or in a form of parallel along the EME coupling aspect, for installing the PM magnetic pole 103 with corresponding shape so as to indicate the electrical machinery effect of accumulative excitement or differential excitement with the polarity of the conduction winding 100 excited magnetic pole, and an optional protective cap 1011 with the same length as the magnetic pole, made of either permeable material or non-permeable material, is further disposed to one or both sides of the magnetic pole 101 as applicable for clamping the magnetic pole 101 constituted by permeable laminated sheets and wrapping the PM magnetic pole 103.

Figure 52:
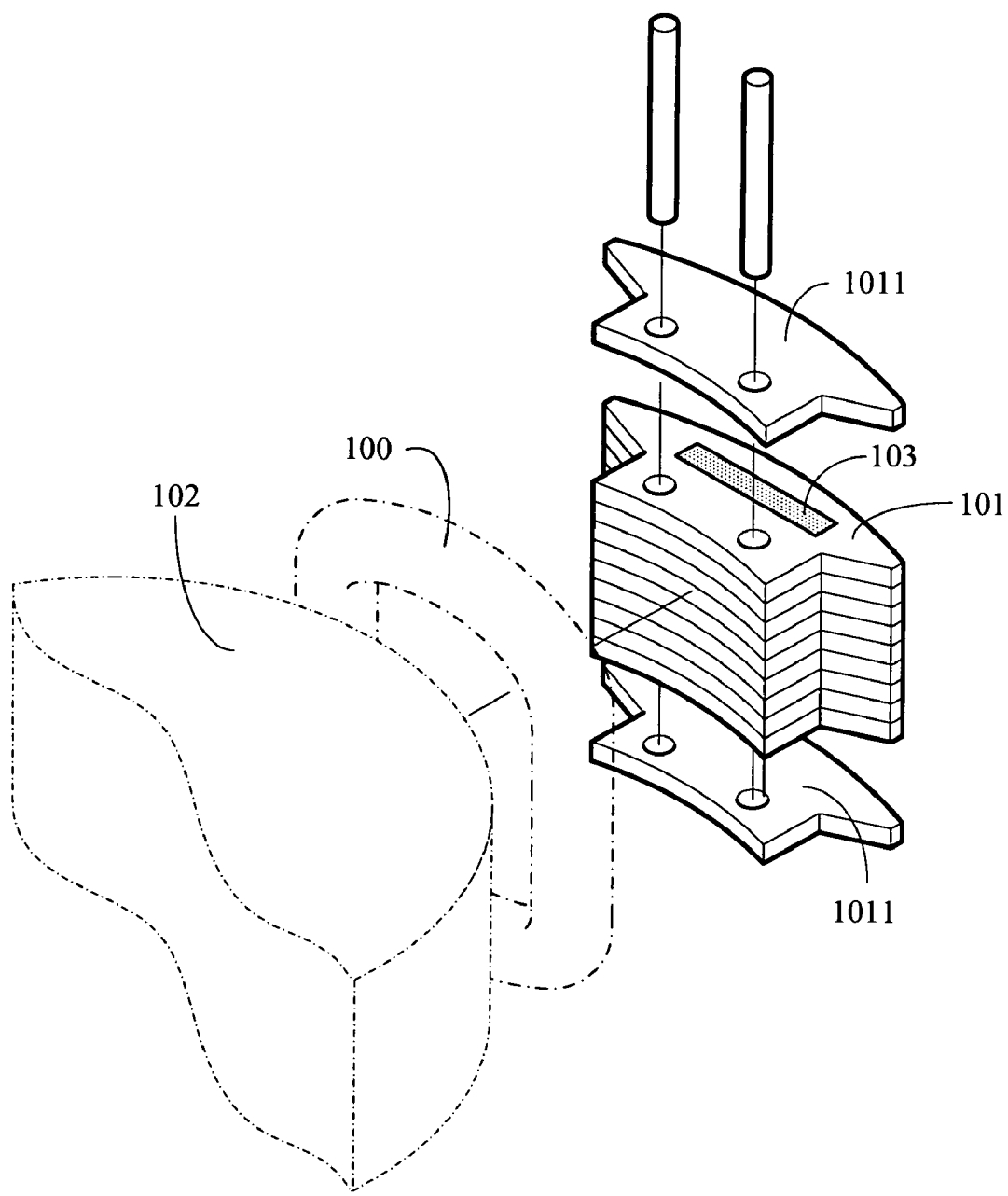
FIG. 52 is a schematic view showing an embodiment of the present invention applied in the inner layer electric machinery structure of a cylinder electric machinery structure, wherein a transverse rabbet is disposed at where near the pole-face on the magnetic pole provided with a conduction winding 100 for installing the PM magnetic pole, and a protective cap with the same length as the magnetic pole is disposed to one or both sides of the magnetic pole for clamping the magnetic pole and wrapping the PM magnetic pole.

FIG. 52 is a schematic view showing an embodiment of the present invention applied in the inner layer electric machinery structure of a cylinder electric machinery structure, wherein a transverse rabbet is disposed at where near the pole-face on the magnetic pole provided with a conduction winding 100 for installing the PM magnetic pole, and a protective cap with the same length as the magnetic pole is disposed to one or both sides of the magnetic pole for clamping the magnetic pole and wrapping the PM magnetic pole.

As illustrated in FIG. 52 is the present invention to be applied in the inner layer electric machinery structure of the cylinder electric machinery structure, wherein the magnetic pole 101 provided with a conduction winding 100 at where near the edge of the EME coupling aspect is disposed with a transverse rabbet, which indicates a linear, arcuate or any required geometric shape, or in a form of parallel along the EME coupling aspect, for installing the PM magnetic pole 103 with corresponding shape so as to indicate the electrical machinery effect of accumulative excitement or differential excitement with the polarity of the conduction winding 100 excited magnetic pole, and an optional protective cap 1011 with the same length as the magnetic pole, made of either permeable material or non-permeable material, is further disposed to one or both sides of the magnetic pole 101 as applicable for clamping the magnetic pole 101 constituted by permeable laminated sheets and wrapping the PM magnetic pole 103.

Figure 53:
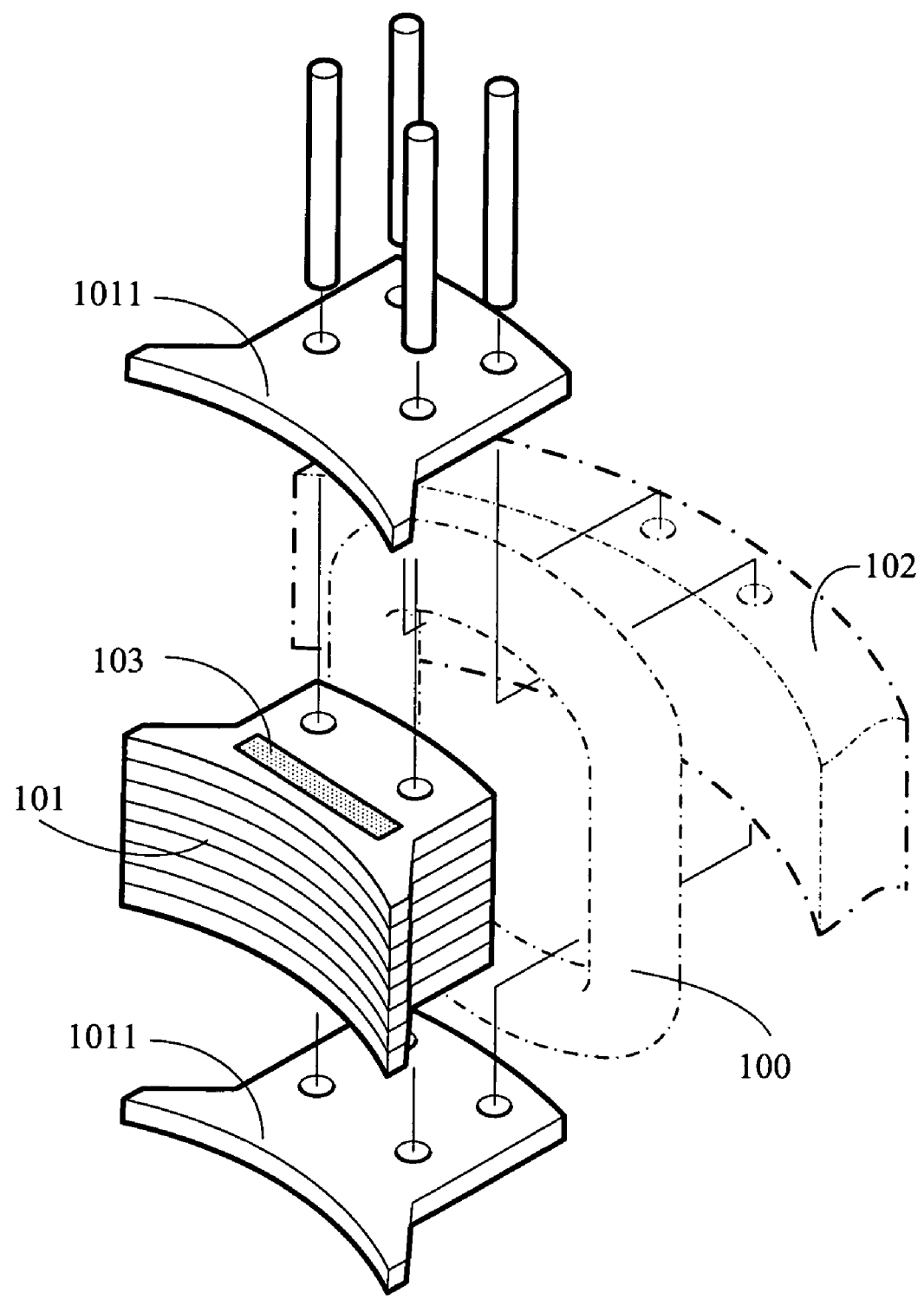
FIG. 53 is a schematic view showing an embodiment of FIG. 51 applied in the outer layer electric machinery structure of a cylinder electric machinery structure, wherein a protective cap is provided to one or both sides of the magnetic pole provided with a conduction winding for clamping the magnetic pole constituted by the permeable laminated sheets and wrapping the PM magnetic pole whereof the protective cap extends at the direction facing the magnetic circuit to connect with the magnetic circuit.

FIG. 53 is a schematic view showing an embodiment of FIG. 51 applied in the outer layer electric machinery structure of a cylinder electric machinery structure, wherein a protective cap is provided to one or both sides of the magnetic pole provided with a conduction winding for clamping the magnetic pole constituted by the permeable laminated sheets and wrapping the PM magnetic pole whereof the protective cap extends at the direction facing the magnetic circuit to connect with the magnetic circuit.

As illustrated in FIG. 53 is FIG. 51 to be applied in the outer layer electric machinery structure of the cylinder electric machinery structure, wherein the magnetic pole 101 constituted by the permeable laminated sheets at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape; an optional protective cap 1011, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and wrapping the PM magnetic pole 103.

Figure 54:
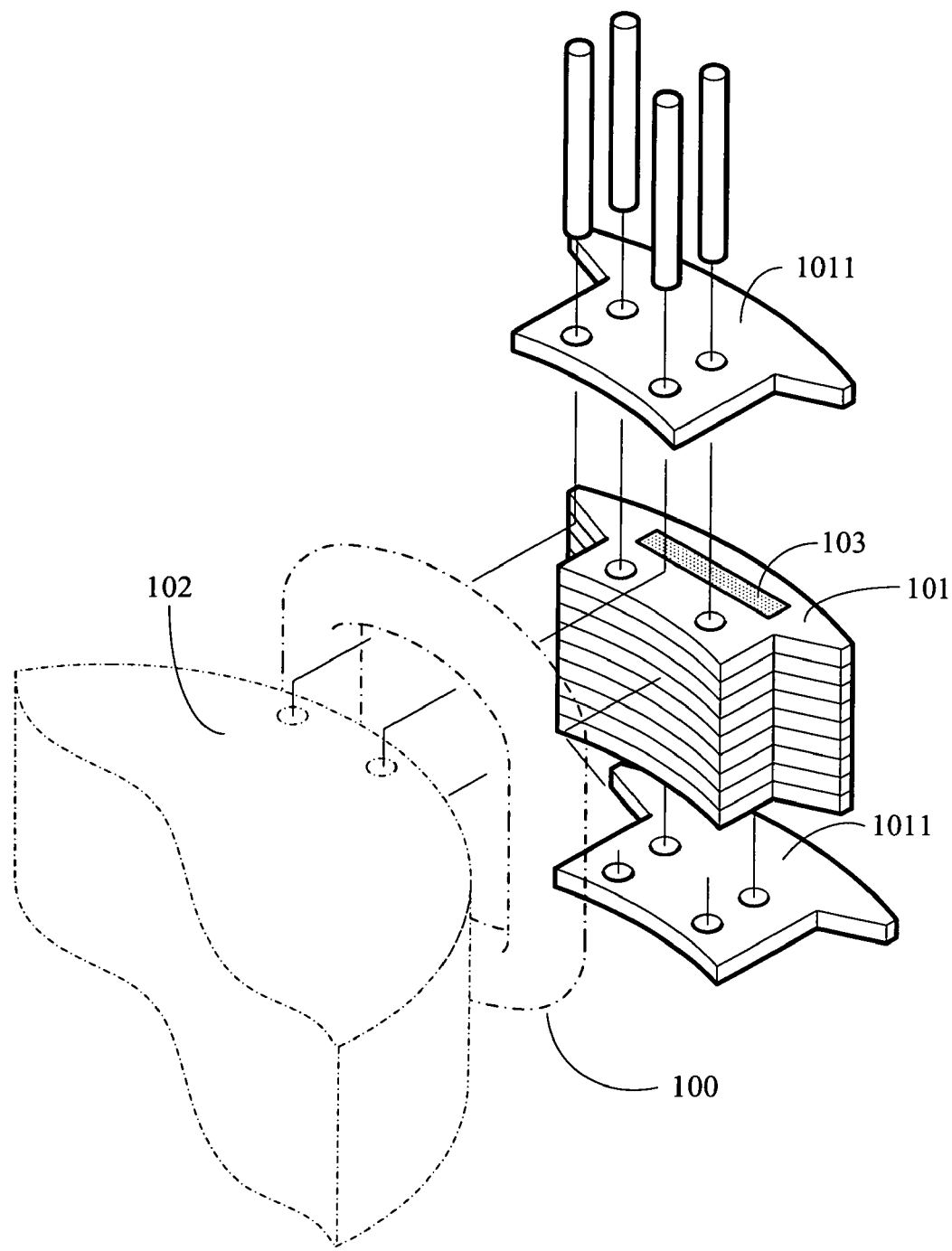
FIG. 54 is a schematic view showing an embodiment of FIG. 52 applied in the inner layer electric machinery structure of a cylinder electric machinery structure, wherein a protective cap is provided to one or both sides of the magnetic pole provided with a conduction winding for clamping the magnetic pole constituted by the permeable laminated sheets and wrapping the PM magnetic pole whereof the protective cap extends at the direction facing the magnetic circuit to connect with the magnetic circuit.

FIG. 54 is a schematic view showing an embodiment of FIG. 52 applied in the inner layer electric machinery structure of a cylinder electric machinery structure, wherein a protective cap is provided to one or both sides of the magnetic pole provided with a conduction winding for clamping the magnetic pole constituted by the permeable laminated sheets and wrapping the PM magnetic pole whereof the protective cap extends at the direction facing the magnetic circuit to connect with the magnetic circuit.

As illustrated in FIG. 54 is FIG. 52 to be applied in the inner layer electric machinery structure of the cylinder electric machinery structure, wherein the magnetic pole 101 constituted by the permeable laminated sheets at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape; an optional protective cap 1011, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and wrapping the PM magnetic pole 103.

Figure 55:
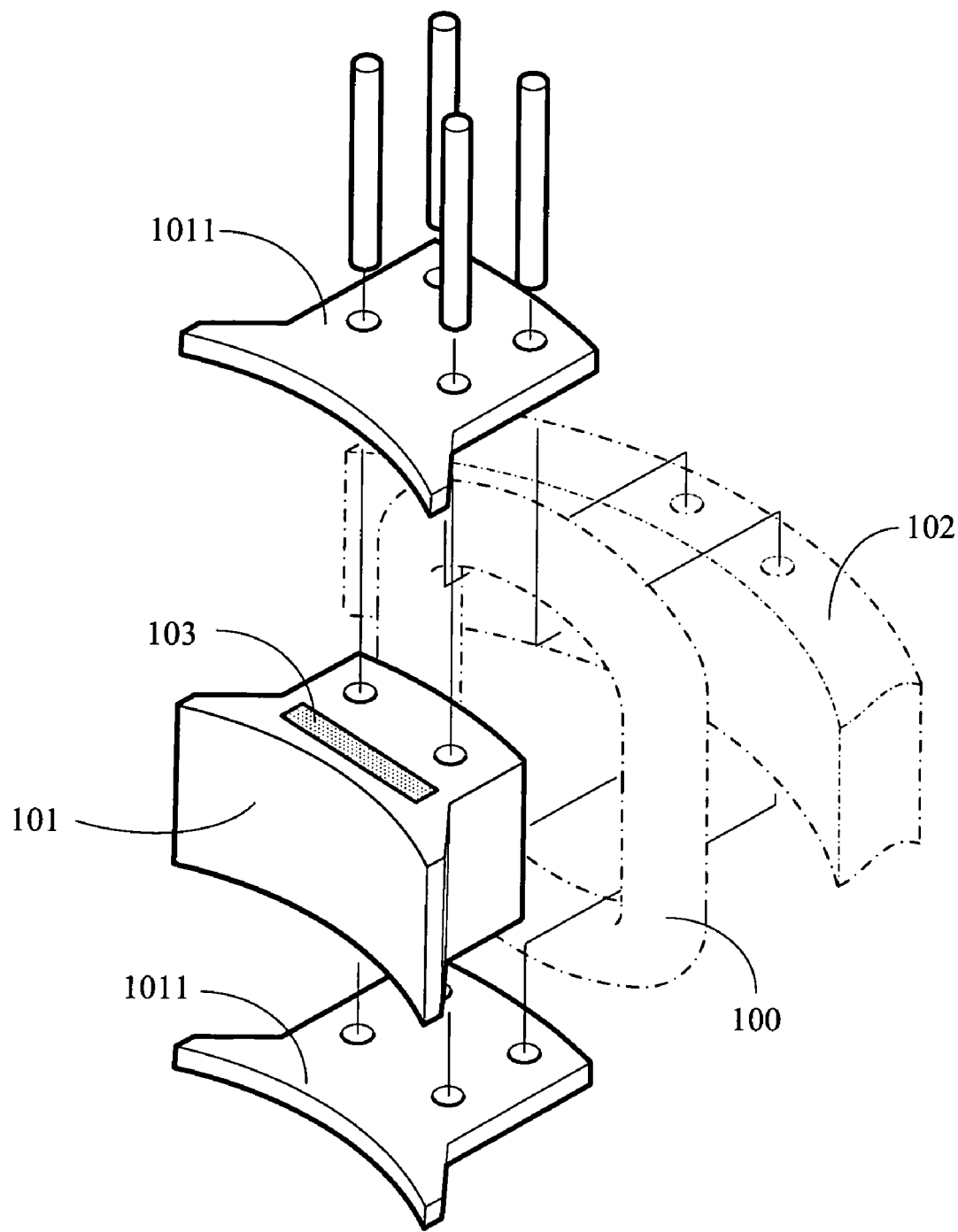
FIG. 55 is a schematic view showing an embodiment of FIG. 51 applied in the outer layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

FIG. 55 is a schematic view showing an embodiment of FIG. 51 applied in the outer layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

As illustrated in FIG. 55 is FIG. 51 to be applied in the outer layer electric machinery structure of the cylinder electric machinery structure, wherein the magnetic pole 101 of a block structure at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape, and an optional protective cap 1011, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and wrapping the PM magnetic pole 103.

Figure 56:
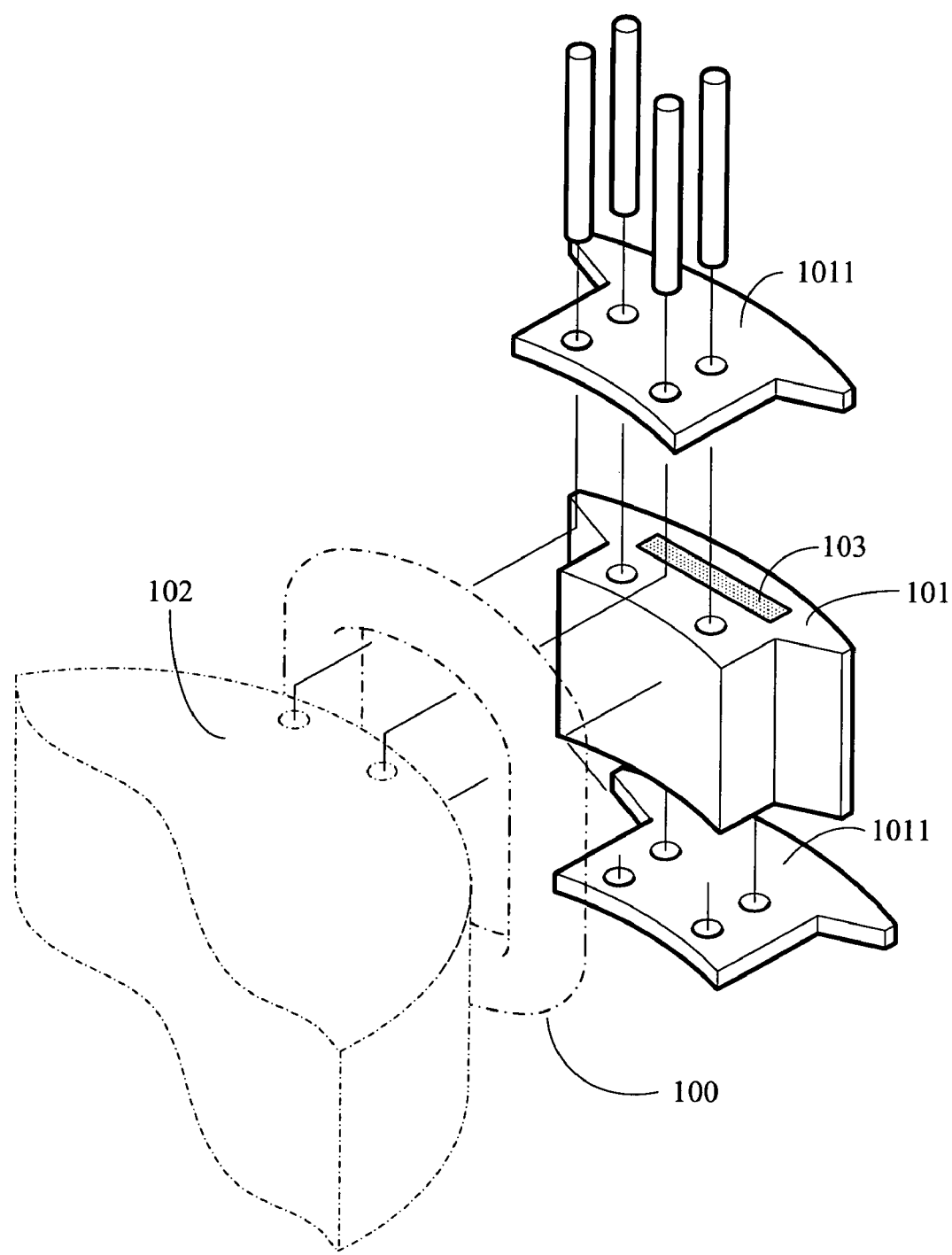
FIG. 56 is a schematic view showing an embodiment of FIG. 52 applied in the inner layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

FIG. 56 is a schematic view showing an embodiment of FIG. 52 applied in the inner layer electric machinery structure of a cylinder electric machinery structure, wherein a transverse rabbet is disposed at where near the pole-face on the magnetic pole of a block structure for installing the PM magnetic pole whereof a protective cap, extending at the direction facing the magnetic circuit to connect with the magnetic circuit, is disposed to one or both sides of the magnetic pole for clamping the block-shaped magnetic pole and wrapping the PM magnetic pole.

As illustrated in FIG. 56 is FIG. 52 to be applied in the inner layer electric machinery structure of the cylinder electric machinery structure, wherein the magnetic pole 101 of a block structure at where near the edge of the EME coupling aspect is disposed with a transverse rabbet, which indicates a linear or arcuate or any required geometric shape, or is in a form of parallel along the EME coupling aspect, for installing the PM magnetic pole 103 with corresponding shape, and an optional protective cap 1011, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and wrapping the PM magnetic pole 103.

Figure 57:
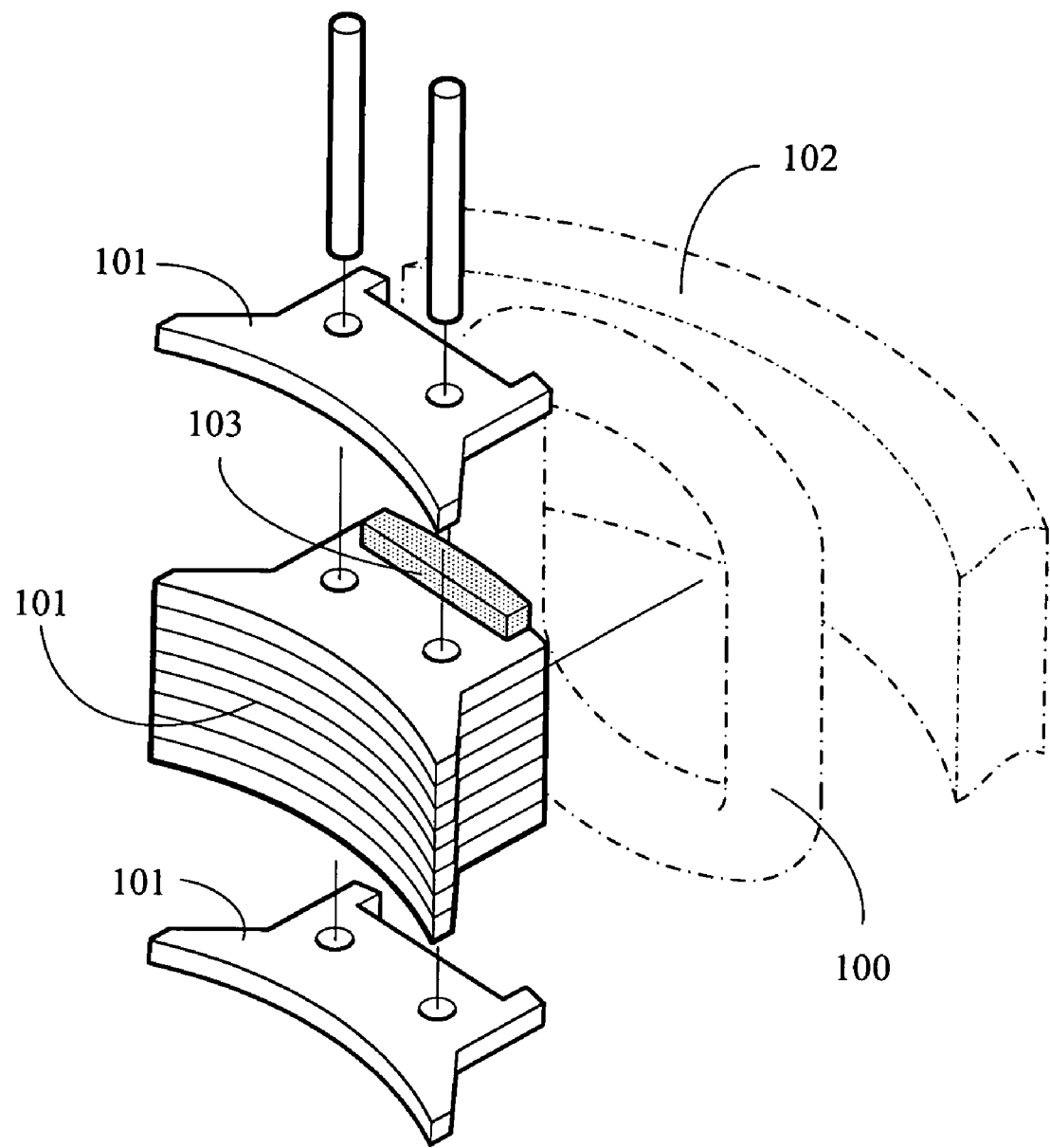
FIG. 57 is a schematic view showing an embodiment of the present invention applied in the outer layer electric machinery structure of a cylinder electric machinery structure, wherein an axial notch is disposed at where near the edge of the magnetic circuit on the magnetic pole provided with a conduction winding 100 for installing the PM magnetic pole.

FIG. 57 is a schematic view showing an embodiment of the present invention applied in the outer layer electric machinery structure of a cylinder electric machinery structure, wherein an axial notch is disposed at where near the edge of the magnetic circuit on the magnetic pole provided with a conduction winding 100 for installing the PM magnetic pole.

As illustrated in FIG. 57 is the present invention to be applied in the outer layer electric machinery structure of the cylinder electric machinery structure, wherein the magnetic pole 101 provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape so as to indicate the electrical machinery effect of accumulative excitement or differential excitement with the polarity of the conduction winding 100 excited magnetic pole.

Figure 58:
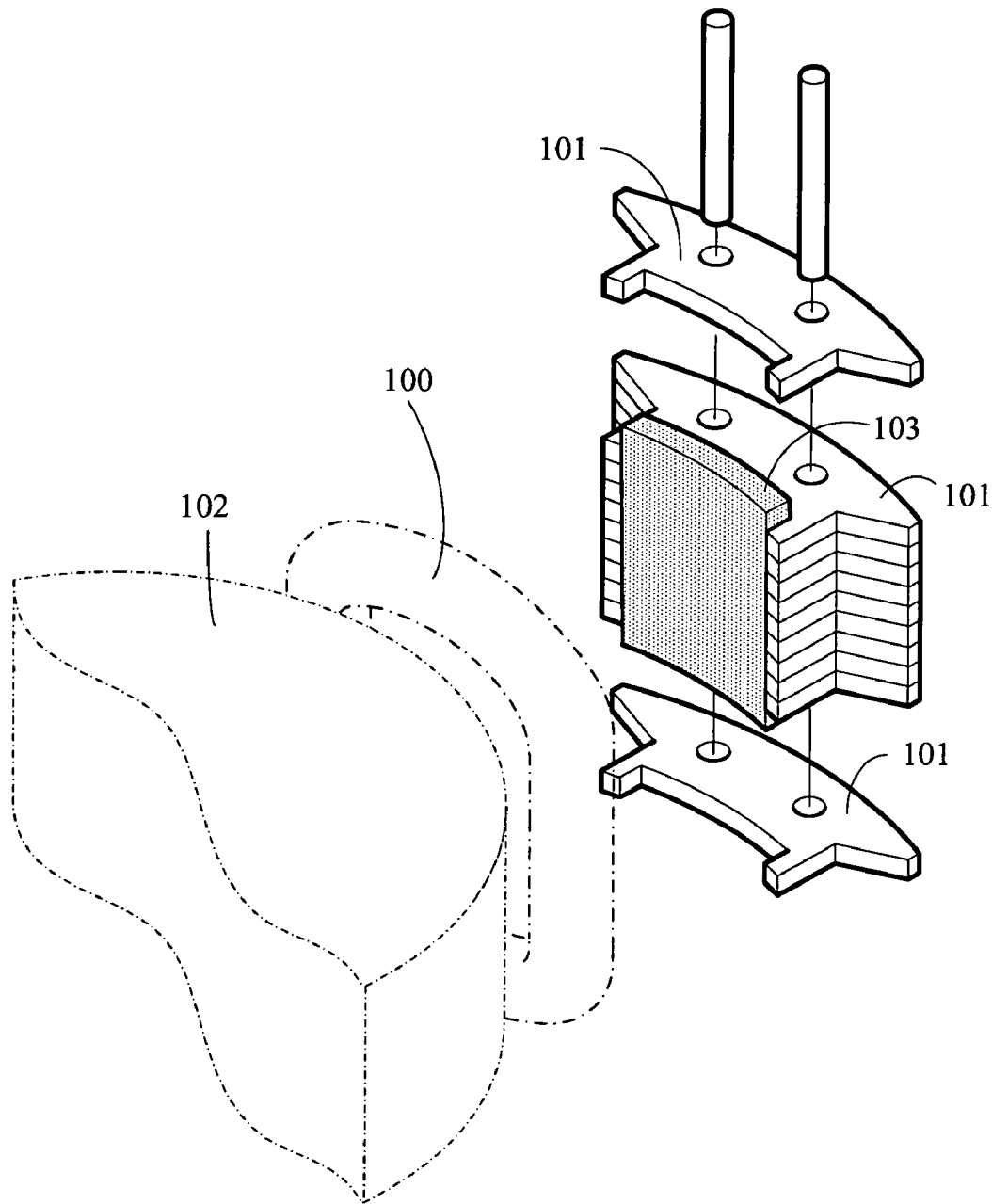
FIG. 58 is a schematic view showing an embodiment of the present invention applied in the inner layer electric machinery structure of a cylinder electric machinery structure, wherein an axial notch is disposed at where near the edge of the magnetic circuit on the magnetic pole constituted by permeable laminated sheets that provided with a conduction winding 100 for installing the PM magnetic pole.

FIG. 58 is a schematic view showing an embodiment of the present invention applied in the inner layer electric machinery structure of a cylinder electric machinery structure, wherein an axial notch is disposed at where near the edge of the magnetic circuit on the magnetic pole constituted by permeable laminated sheets that provided with a conduction winding 100 for installing the PM magnetic pole.

As illustrated in FIG. 58 is the present invention to be applied in the inner layer electric machinery structure of the cylinder electric machinery structure, wherein the magnetic pole 101 provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape so as to indicate the electrical machinery effect of accumulative excitement or differential excitement with the polarity of the conduction winding 100 excited magnetic pole.

Figure 59:
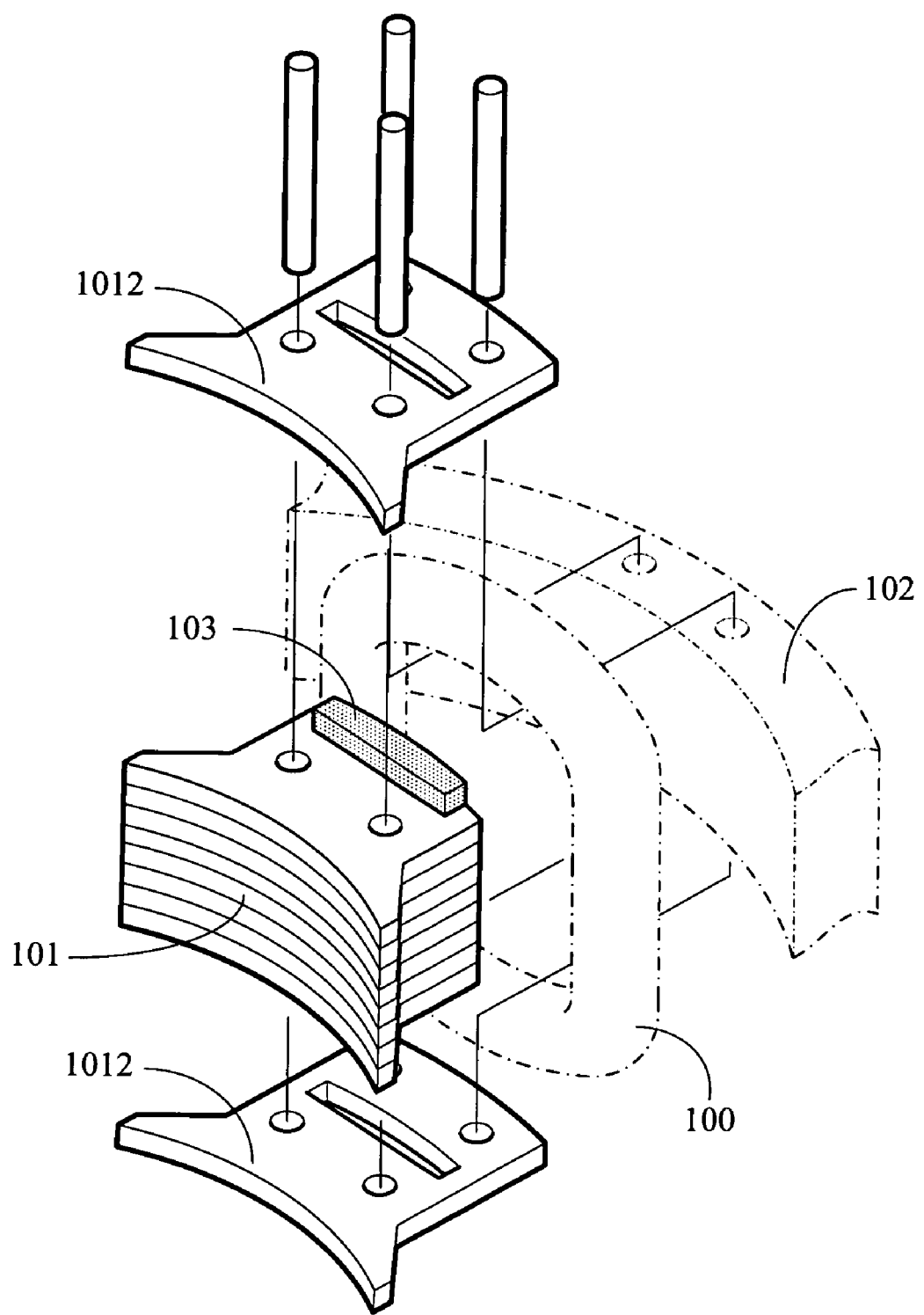
FIG. 59 is a schematic view showing an embodiment of FIG. 57 applied in the outer layer electric machinery structure of a cylinder electric machinery structure, wherein an axial notch is disposed at where near the edge of the magnetic circuit on the magnetic pole constituted by permeable laminated sheets that provided with a conduction winding for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

FIG. 59 is a schematic view showing an embodiment of FIG. 57 applied in the outer layer electric machinery structure of a cylinder electric machinery structure, wherein an axial notch is disposed at where near the edge of the magnetic circuit on the magnetic pole constituted by permeable laminated sheets that provided with a conduction winding for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

As illustrated in FIG. 59 is FIG. 57 to be applied in the outer layer electric machinery structure of the cylinder electric machinery structure, wherein the magnetic pole 101 constituted by the permeable laminated sheets that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the magnetic pole 101 as needed for clamping the magnetic pole 101 constituted by permeable laminated sheets.

Figure 60:
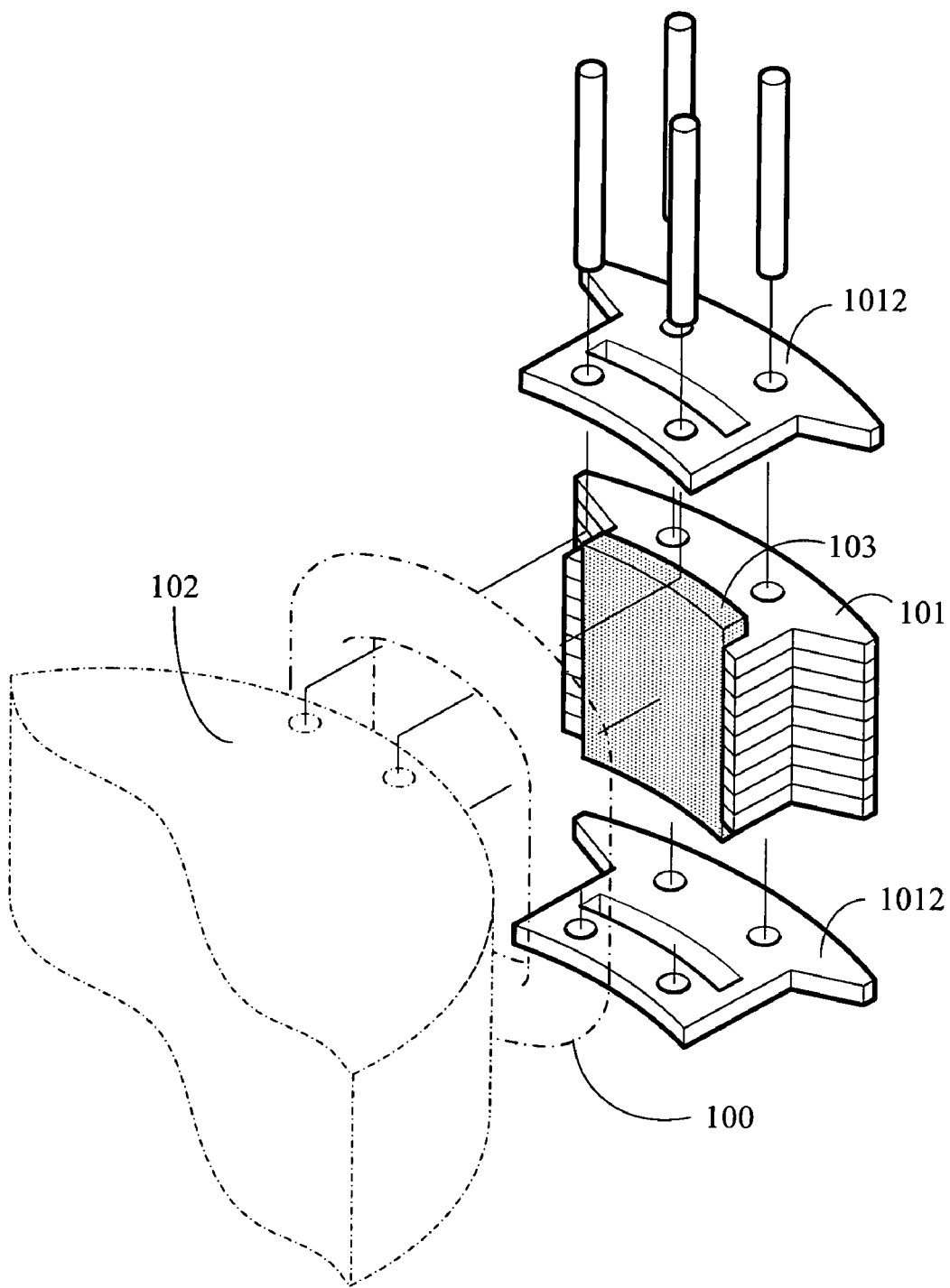
FIG. 60 is a schematic view showing an embodiment of FIG. 58 applied in the inner layer electric machinery structure of a cylinder electric machinery structure, wherein an axial notch is disposed at where near the edge of the magnetic circuit on the magnetic pole constituted by permeable laminated sheets that provided with a conduction winding for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

FIG. 60 is a schematic view showing an embodiment of FIG. 58 applied in the inner layer electric machinery structure of a cylinder electric machinery structure, wherein an axial notch is disposed at where near the edge of the magnetic circuit on the magnetic pole constituted by permeable laminated sheets that provided with a conduction winding for installing the PM magnetic pole, and a protective cap, extending at the direction facing the magnetic circuit to connect with the magnetic circuit, is provided to one or both sides of the magnetic pole for clamping the magnetic pole constituted by the permeable laminated sheets.

As illustrated in FIG. 60 is FIG. 58 to be applied in the inner layer electric machinery structure of the cylinder electric machinery structure, wherein the magnetic pole 101 constituted by the permeable laminated sheets that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the magnetic pole 101 as needed for clamping the magnetic pole 101 constituted by permeable laminated sheets.

Figure 61:
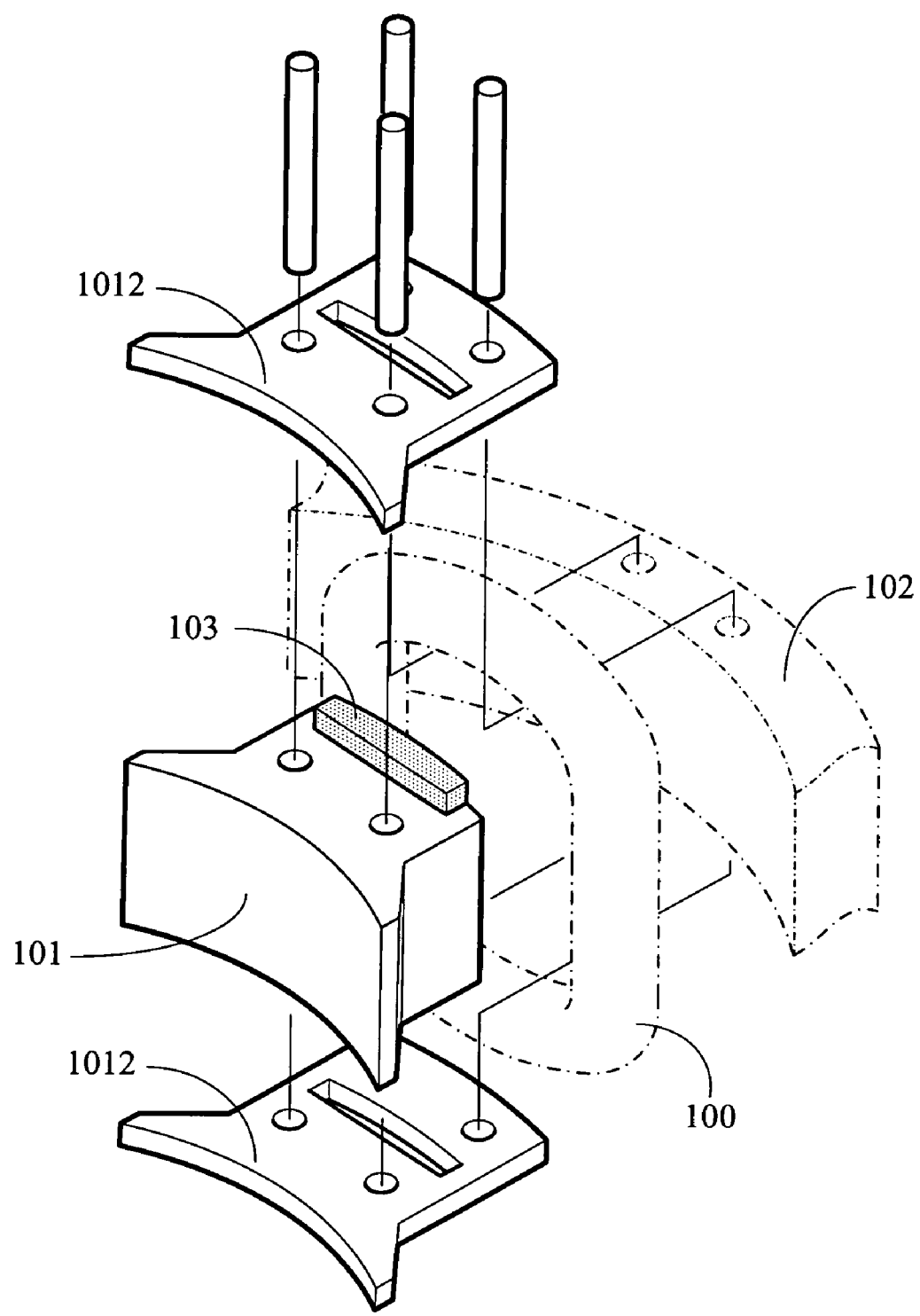
FIG. 61 is a schematic view showing an embodiment of FIG. 57 applied in the outer layer electric machinery structure of a cylinder electric machinery structure, wherein an axial notch is disposed at where near the edge of the magnetic circuit on the magnetic pole constituted by blocks that provided with a conduction winding for installing the PM magnetic pole, and a protective cap, extending at the direction facing the magnetic circuit to connect with the magnetic circuit, is provided to one or both sides of the block-shaped magnetic pole for clamping the block-shaped magnetic pole.

FIG. 61 is a schematic view showing an embodiment of FIG. 57 applied in the outer layer electric machinery structure of a cylinder electric machinery structure, wherein an axial notch is disposed at where near the edge of the magnetic circuit on the magnetic pole constituted by blocks that provided with a conduction winding for installing the PM magnetic pole, and a protective cap, extending at the direction facing the magnetic circuit to connect with the magnetic circuit, is provided to one or both sides of the block-shaped magnetic pole for clamping the block-shaped magnetic pole.

As illustrated in FIG. 61 is FIG. 57 to be applied in the outer layer electric machinery structure of the cylinder electric machinery structure, wherein the magnetic pole 101 constituted by blocks that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the block-shaped magnetic pole 101 as needed for clamping the block-shaped magnetic pole 101.

Figure 62:
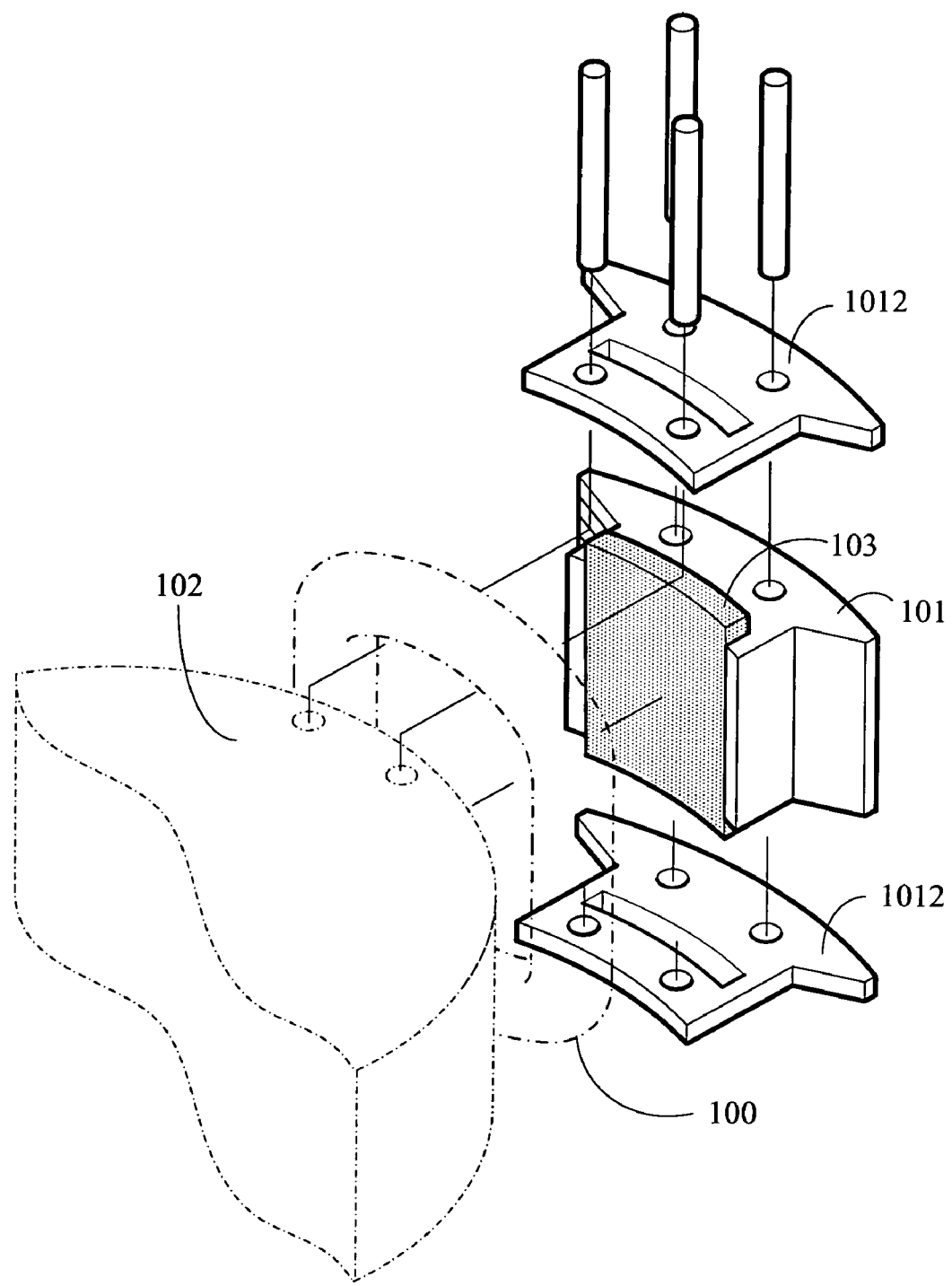
FIG. 62 is a schematic view showing an embodiment of FIG. 58 applied in the inner layer electric machinery structure of a cylinder electric machinery structure, wherein an axial notch is disposed at where near the edge of the magnetic circuit on the magnetic pole constituted by blocks that provided with a conduction winding for installing the PM magnetic pole, and a protective cap, extending at the direction facing the magnetic circuit to connect with the magnetic circuit, is provided to one or both sides of the block-shaped magnetic pole for clamping the block-shaped magnetic pole.

FIG. 62 is a schematic view showing an embodiment of FIG. 58 applied in the inner layer electric machinery structure of a cylinder electric machinery structure, wherein an axial notch is disposed at where near the edge of the magnetic circuit on the magnetic pole constituted by blocks that provided with a conduction winding for installing the PM magnetic pole, and a protective cap, extending at the direction facing the magnetic circuit to connect with the magnetic circuit, is provided to one or both sides of the block-shaped magnetic pole for clamping the block-shaped magnetic pole.

As illustrated in FIG. 62 is FIG. 58 to be applied in the inner layer electric machinery structure of the cylinder electric machinery structure, wherein the magnetic pole 101 constituted by blocks that provided with a conduction winding 100 at where near the edge of the magnetic circuit 102 is disposed with an axial notch structure, whereof the concave bottom of the axial notch is a flat or curved surface or any required geometric shape, or in a form of parallel along the EME coupling aspect for installing the PM magnetic pole 103 with corresponding shape; an optional protective cap 1012, extending at the direction facing the magnetic circuit 102 to connect with the magnetic circuit 102, is further provided to one or both sides of the block-shaped magnetic pole 101 for clamping the block-shaped magnetic pole 101 as applicable.

Figure 63:
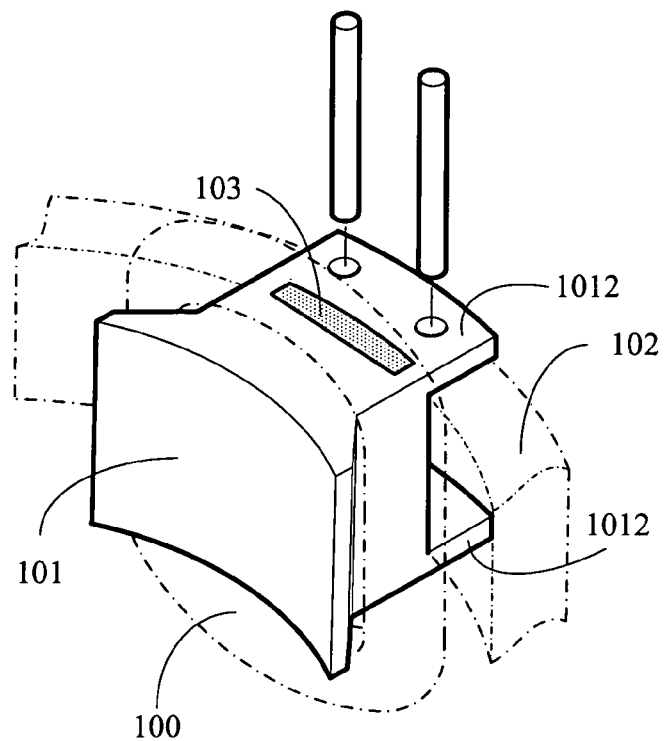
FIG. 63 is a schematic view showing an embodiment of FIG. 57 applied in the outer layer electric machinery structure of a cylinder electric machinery structure, wherein an axial notch is disposed to the magnetic pole constituted by a block integrally that provided with a conduction winding at where near the edge of the magnetic circuit for installing the PM magnetic pole whereof one or both sides of the integrally block-shaped magnetic pole extends at the direction facing the magnetic circuit for serving as a permeable protective cap.

FIG. 63 is a schematic view showing an embodiment of FIG. 57 applied in the outer layer electric machinery structure of a cylinder electric machinery structure, wherein an axial notch is disposed to the magnetic pole constituted by a block integrally that provided with a conduction winding at where near the edge of the magnetic circuit for installing the PM magnetic pole whereof one or both sides of the integrally block-shaped magnetic pole extends at the direction facing the magnetic circuit for serving as a permeable protective cap.

As illustrated in FIG. 63 is FIG. 57 to be applied in the outer layer electric machinery structure of the cylinder electric machinery structure, wherein the magnetic pole 101 constituted by a block integrally that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; one or both sides of the integrally block-shaped magnetic pole 101 extends at the direction facing the magnetic circuit 102 to connect with the magnetic circuit 102 thereby to form an protective cap 1012 on one or both sides of the PM magnetic pole 103.

Figure 64:
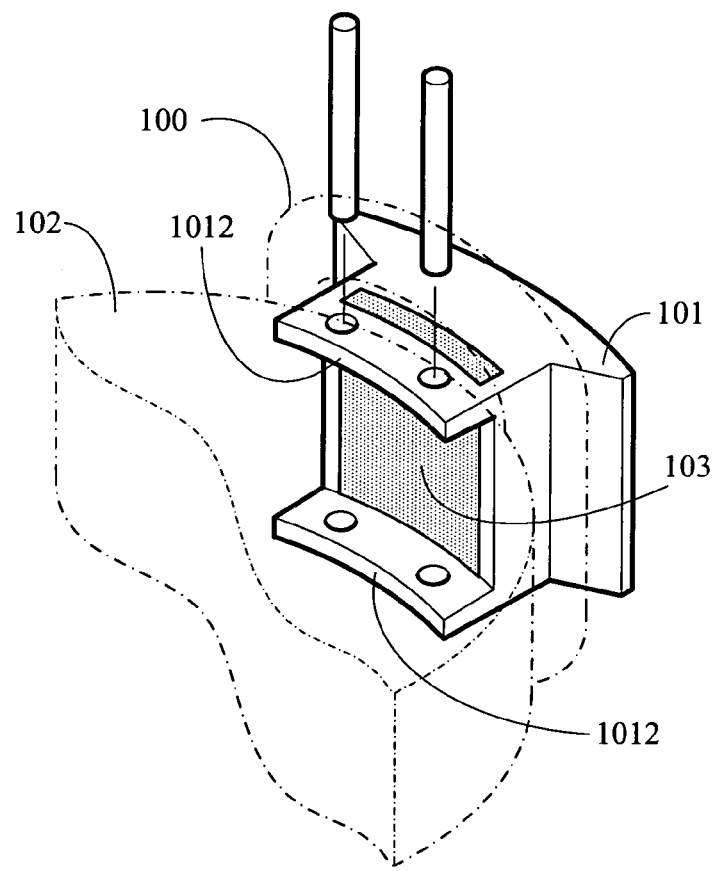
FIG. 64 is a schematic view showing an embodiment of FIG. 58 applied in the inner layer electric machinery structure of a cylinder electric machinery structure, wherein an axial notch is disposed to the magnetic pole constituted by a block integrally that provided with a conduction winding at where near the edge of the magnetic circuit for installing the PM magnetic pole whereof one or both sides of the integrally block-shaped magnetic pole extends at the direction facing the magnetic circuit for serving as a permeable protective cap.

FIG. 64 is a schematic view showing an embodiment of FIG. 58 applied in the inner layer electric machinery structure of a cylinder electric machinery structure, wherein an axial notch is disposed to the magnetic pole constituted by a block integrally that provided with a conduction winding at where near the edge of the magnetic circuit for installing the PM magnetic pole whereof one or both sides of the integrally block-shaped magnetic pole extends at the direction facing the magnetic circuit for serving as a permeable protective cap.

As illustrated in FIG. 64 is FIG. 58 to be applied in the inner layer electric machinery structure of the cylinder electric machinery structure, wherein the magnetic pole 101 constituted by a block integrally that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; one or both sides of the integrally block-shaped magnetic pole 101 extends at the direction facing the magnetic circuit 102 to connect with the magnetic circuit 102 thereby to form an protective cap 1012 on one or both sides of the PM magnetic pole 103

Figure 65:
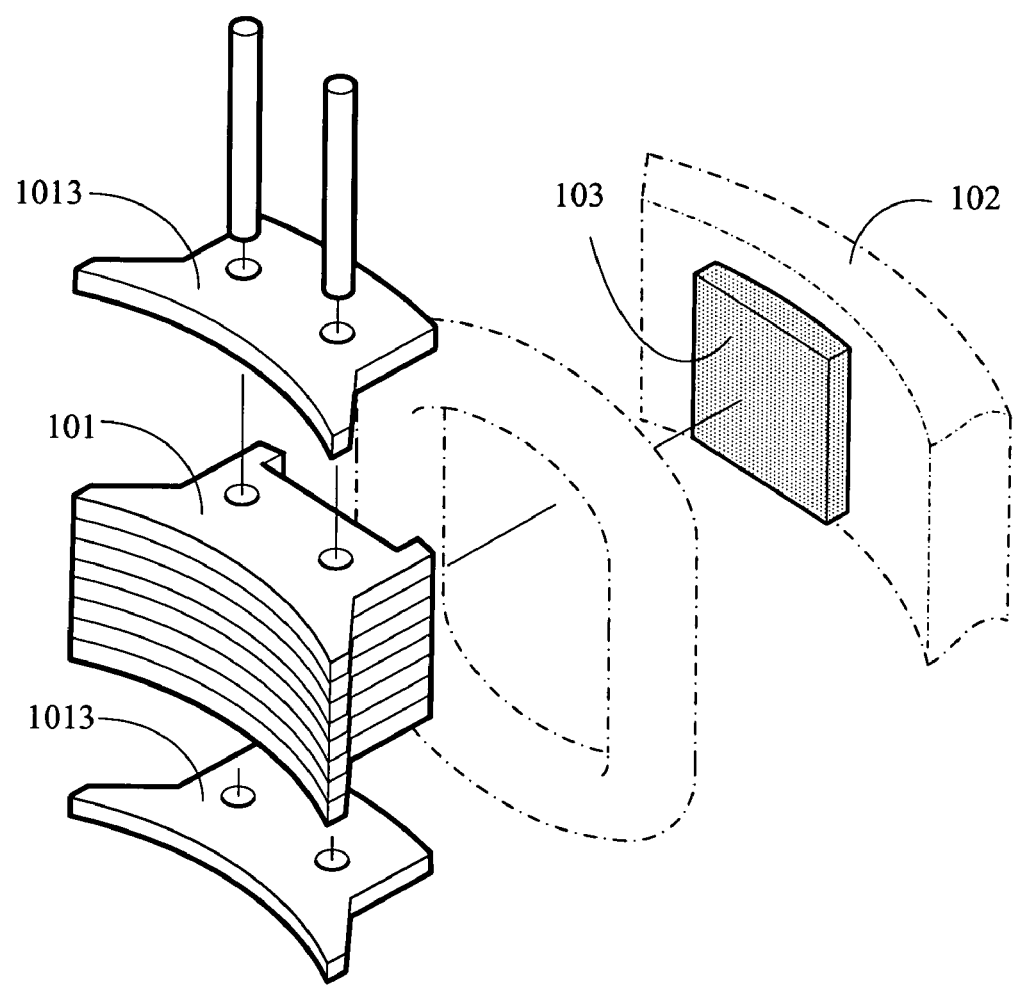
FIG. 65 is a schematic view showing an embodiment of the present invention applied in the outer layer electric machinery structure of a cylinder electric machinery structure, wherein an axial notch is disposed at where near the edge of the magnetic circuit on the magnetic pole constituted by permeable laminated sheets that provided with a conduction winding 100 for installing the PM magnetic pole, and a protective cap is disposed to one or both sides of the magnetic pole for clamping the magnetic pole constituted by permeable laminated sheets and wrapping the PM magnetic pole.

FIG. 65 is a schematic view showing an embodiment of the present invention applied in the outer layer electric machinery structure of a cylinder electric machinery structure, wherein an axial notch is disposed at where near the edge of the magnetic circuit on the magnetic pole constituted by permeable laminated sheets that provided with a conduction winding 100 for installing the PM magnetic pole, and a protective cap is disposed to one or both sides of the magnetic pole for clamping the magnetic pole constituted by permeable laminated sheets and wrapping the PM magnetic pole.

As illustrated in FIG. 65 is the present invention to be applied in the outer layer electric machinery structure of the cylinder electric machinery structure, wherein the magnetic pole 101 constituted by permeable laminated sheets that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape so as to indicate the electrical machinery effect of accumulative excitement or differential excitement with the polarity of the conduction winding 100 excited magnetic pole, and an optional protective cap 1012, made of either permeable material or non-permeable material, is further disposed to one or both sides of the magnetic pole 101 as applicable for clamping the magnetic pole 101 constituted by permeable laminated sheets and sandwiching the PM magnetic pole 103.

Figure 66:
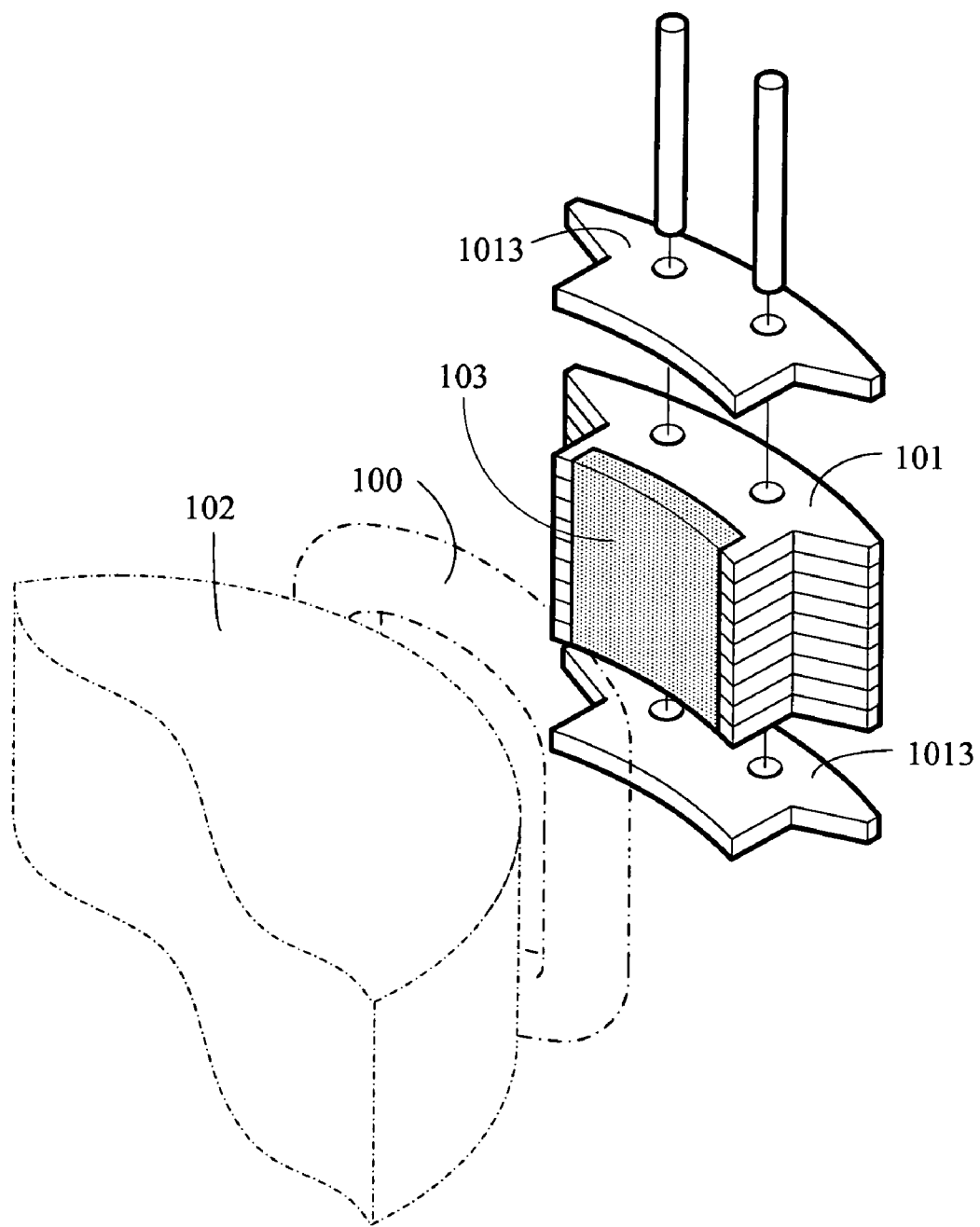
FIG. 66 is a schematic view showing an embodiment of the present invention applied in the inner layer electric machinery structure of a cylinder electric machinery structure, wherein an axial notch is disposed at where near the edge of the magnetic circuit on the magnetic pole constituted by permeable laminated sheets that provided with a conduction winding 100 for installing the PM magnetic pole, and a protective cap is disposed to one or both sides of the magnetic pole for clamping the magnetic pole constituted by permeable laminated sheets and sandwiching the PM magnetic pole.

FIG. 66 is a schematic view showing an embodiment of the present invention applied in the inner layer electric machinery structure of a cylinder electric machinery structure, wherein an axial notch is disposed at where near the edge of the magnetic circuit on the magnetic pole constituted by permeable laminated sheets that provided with a conduction winding 100 for installing the PM magnetic pole, and a protective cap is disposed to one or both sides of the magnetic pole for clamping the magnetic pole constituted by permeable laminated sheets and sandwiching the PM magnetic pole.

As illustrated in FIG. 66 is the present invention to be applied in the inner layer electric machinery structure of the cylinder electric machinery structure, wherein the magnetic pole 101 constituted by permeable laminated sheets that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with a corresponding shape so as to indicate the electrical machinery effect of accumulative excitement or differential excitement with the polarity of the conduction winding 100 excited magnetic pole, and an optional protective cap 1012, made of either permeable material or non-permeable material, is further disposed to one or both sides of the magnetic pole 101 as applicable for clamping the magnetic pole 101 constituted by permeable laminated sheets and sandwiching the PM magnetic pole 103.

Figure 67:
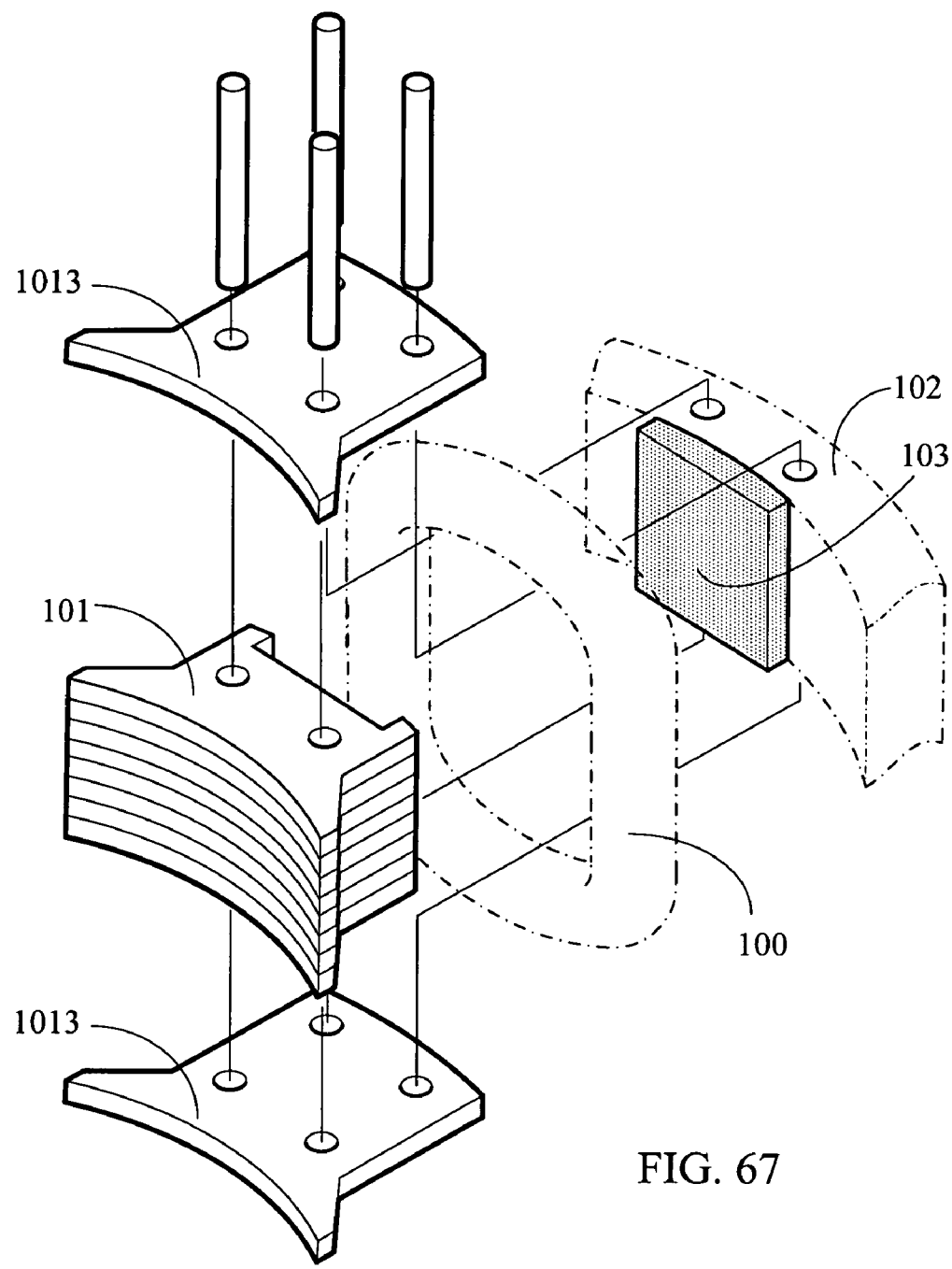
FIG. 67 is a schematic view showing an embodiment of FIG. 65 applied in the outer layer electric machinery structure of a cylinder electric machinery structure, wherein a protective cap is provided to one or both sides of the magnetic pole provided with a conduction winding for clamping the magnetic pole constituted by the permeable laminated sheets and for sandwiching the PM magnetic pole whereof the protective cap extends at the direction facing the magnetic circuit to connect with the magnetic circuit.

FIG. 67 is a schematic view showing an embodiment of FIG. 65 applied in the outer layer electric machinery structure of a cylinder electric machinery structure, wherein a protective cap is provided to one or both sides of the magnetic pole provided with a conduction winding for clamping the magnetic pole constituted by the permeable laminated sheets and for sandwiching the PM magnetic pole whereof the protective cap extends at the direction facing the magnetic circuit to connect with the magnetic circuit.

As illustrated in FIG. 67 is FIG. 65 to be applied in the outer layer electric machinery structure of the cylinder electric machinery structure, wherein the magnetic pole 101 constituted by the permeable laminated sheets that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1013, made of either permeable material or non-permeable material, extending at the direction facing the magnetic circuit 102 to connect with the magnetic circuit 102, is further provided to one or both sides of the magnetic pole

101 as needed for clamping the magnetic pole 101 constituted by permeable laminated sheets and for sandwiching the PM magnetic pole 103.

Figure 68:
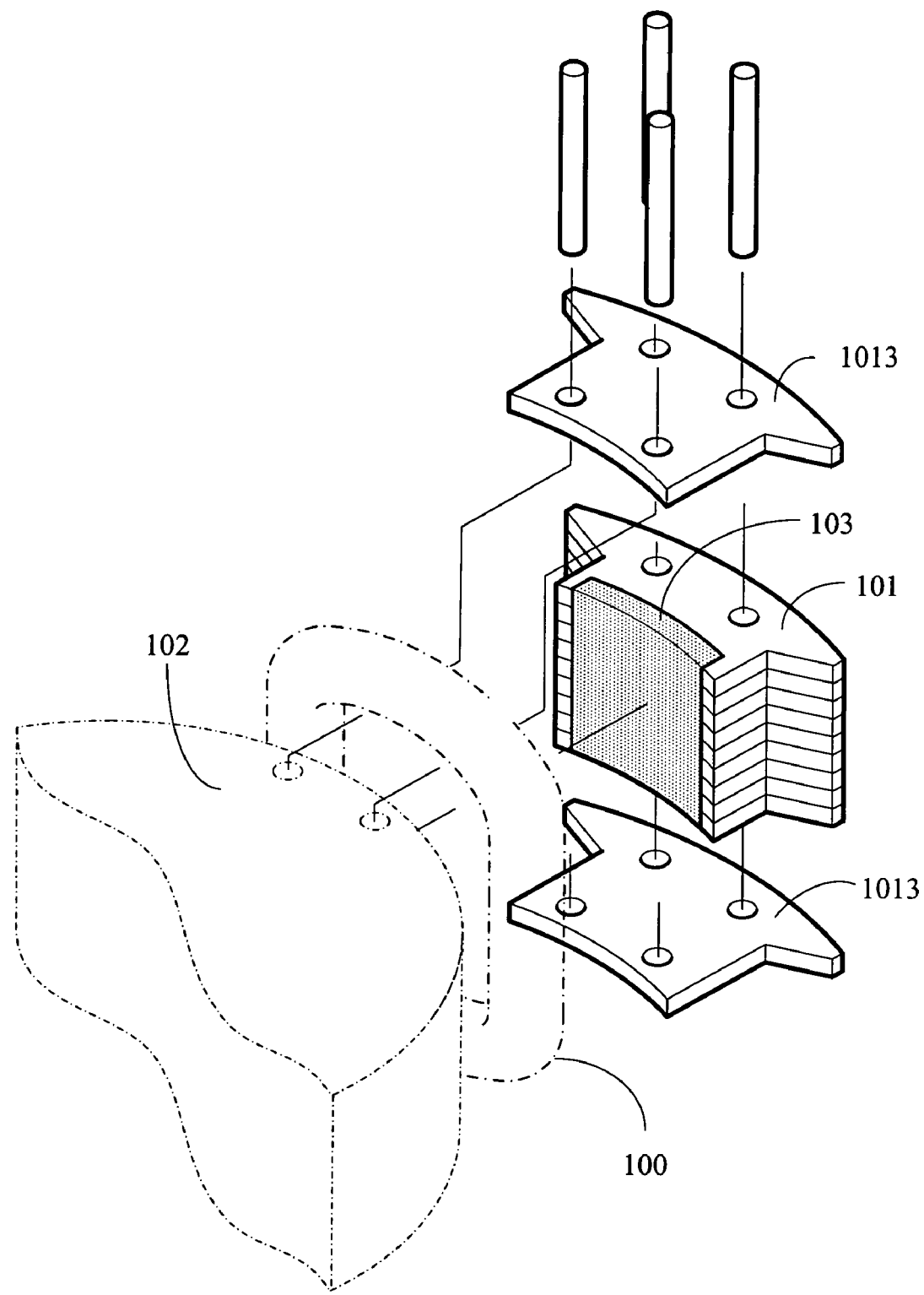
FIG. 68 is a schematic view showing an embodiment of FIG. 66 applied in the inner layer electric machinery structure of a cylinder electric machinery structure, wherein a protective cap is provided to one or both sides of the magnetic pole provided with a conduction winding for clamping the magnetic pole constituted by the permeable laminated sheets and for sandwiching the PM magnetic pole whereof the protective cap extends at the direction facing the magnetic circuit to connect with the magnetic circuit.

FIG. 68 is a schematic view showing an embodiment of FIG. 66 applied in the inner layer electric machinery structure of a cylinder electric machinery structure, wherein a protective cap is provided to one or both sides of the magnetic pole provided with a conduction winding for clamping the magnetic pole constituted by the permeable laminated sheets and for sandwiching the PM magnetic pole whereof the protective cap extends at the direction facing the magnetic circuit to connect with the magnetic circuit.

As illustrated in FIG. 68 is FIG. 66 to be applied in the inner layer electric machinery structure of the cylinder electric machinery structure, wherein the magnetic pole 101 constituted by the permeable laminated sheets that provided with a conduction winding 100 at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape; an optional protective cap 1013, made of either permeable material or non-permeable material, extending at the direction facing the magnetic circuit 102 to connect with the magnetic circuit 102, is further provided to one or both sides of the magnetic pole 101 as needed for clamping the magnetic pole 101 constituted by permeable laminated sheets and for sandwiching the PM magnetic pole 103.

Figure 69:
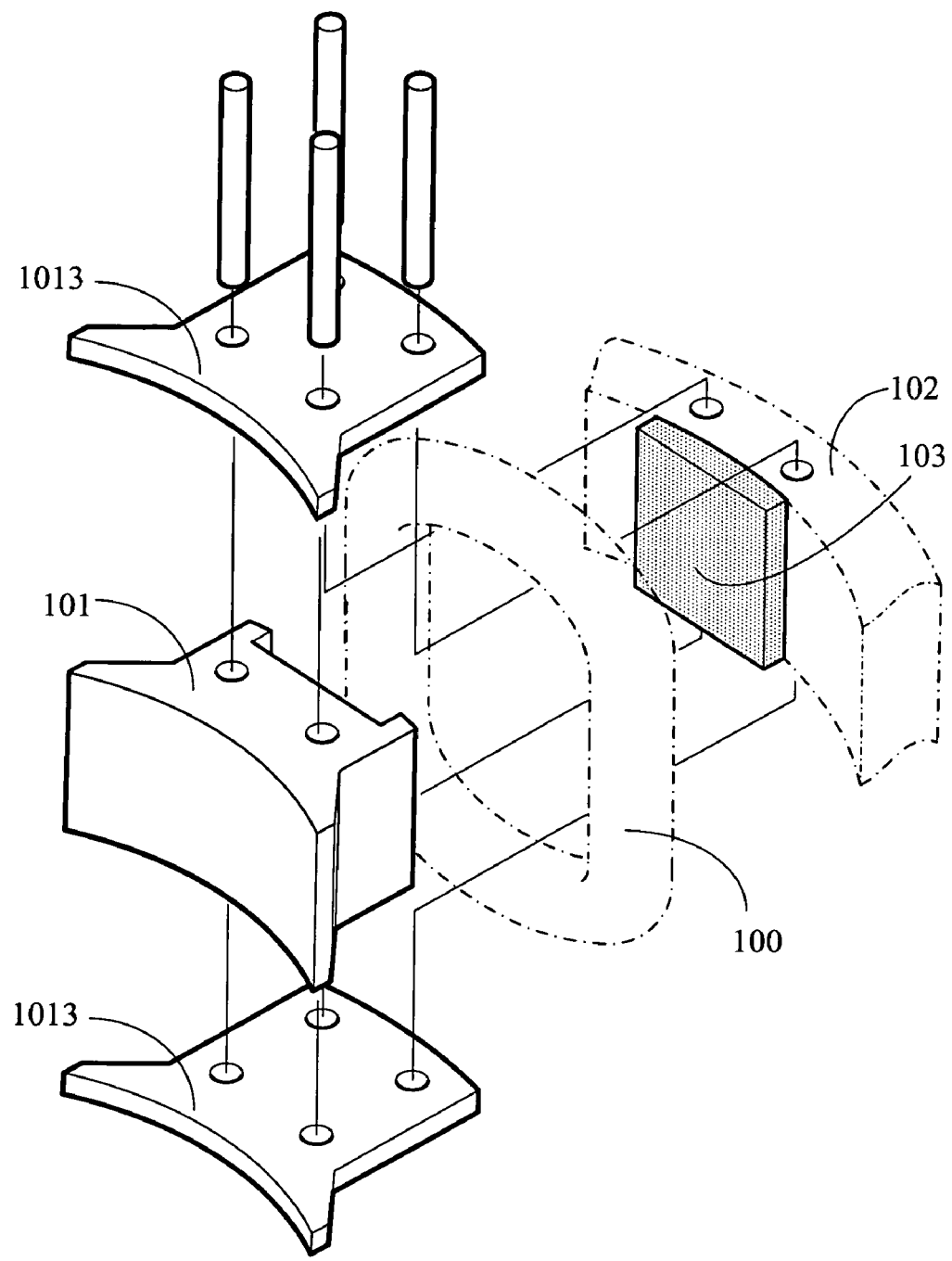
FIG. 69 is a schematic view showing an embodiment of FIG. 65 applied in the outer layer electric machinery structure of a cylinder electric machinery structure, wherein an axial notch is disposed to the magnetic pole of a block structure that provided with a conduction winding at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

FIG. 69 is a schematic view showing an embodiment of FIG. 65 applied in the outer layer electric machinery structure of a cylinder electric machinery structure, wherein an axial notch is disposed to the magnetic pole of a block structure that provided with a conduction winding at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

As illustrated in FIG. 69 is FIG. 65 to be applied in the outer layer electric machinery structure of the cylinder electric machinery structure, wherein the magnetic pole 101 of a block structure that provided with a conduction winding at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape, and an optional protective cap 1013, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and sandwiching the PM magnetic pole 103.

Figure 70:
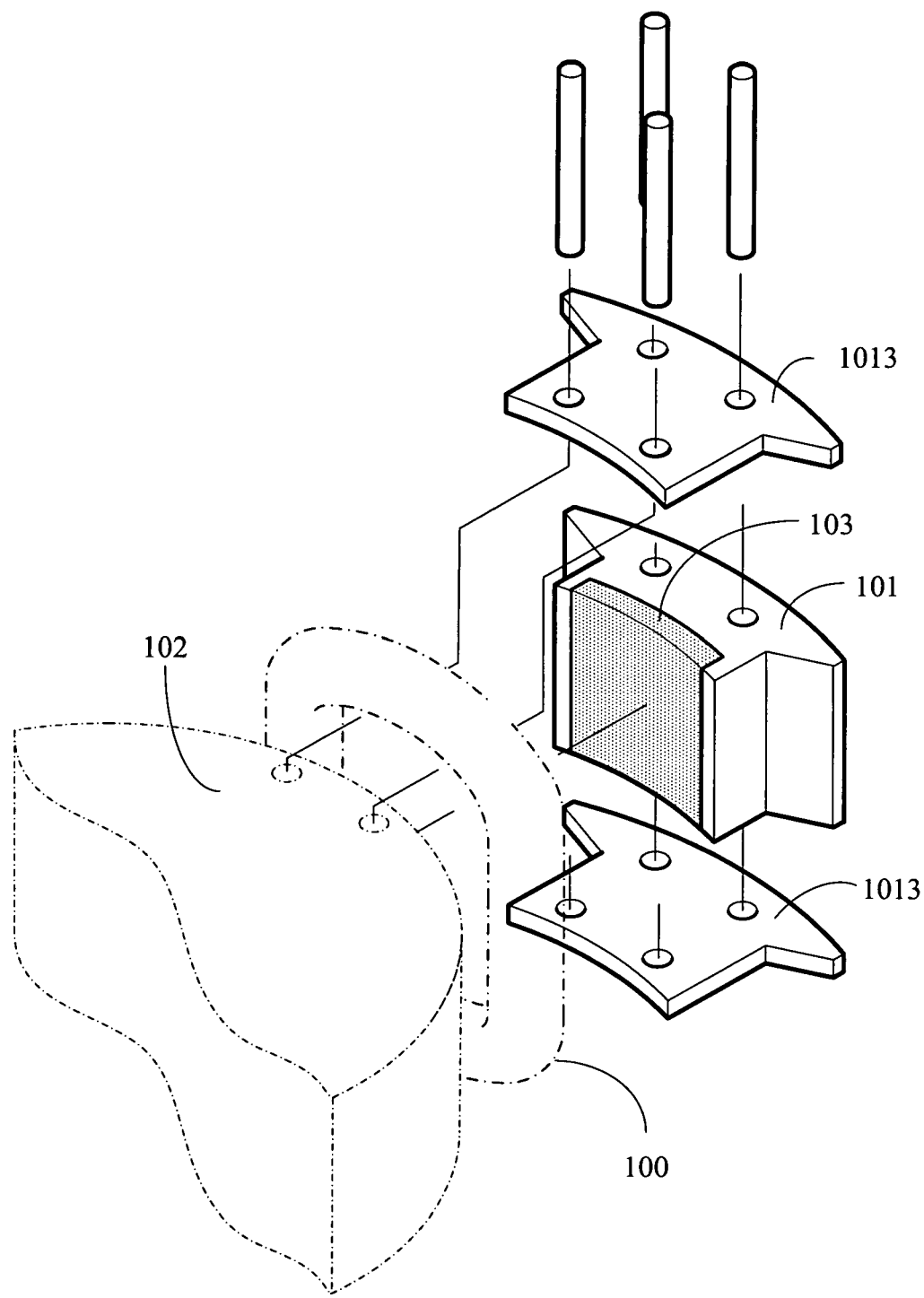
FIG. 70 is a schematic view showing an embodiment of FIG. 66 applied in the inner layer electric machinery structure of a cylinder electric machinery structure, wherein an axial notch is disposed to the magnetic pole of a block structure that provided with a conduction winding at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

FIG. 70 is a schematic view showing an embodiment of FIG. 66 applied in the inner layer electric machinery structure of a cylinder electric machinery structure, wherein an axial notch is disposed to the magnetic pole of a block structure that provided with a conduction winding at where near the edge of the magnetic circuit for installing the PM magnetic pole whereof a protective cap, extending at the direction facing the magnetic circuit to connect with the magnetic circuit, is disposed to one or both sides of the magnetic pole for clamping the block-shaped magnetic pole and sandwiching the PM magnetic pole.

As illustrated in FIG. 70 is FIG. 66 to be applied in the inner layer electric machinery structure of the cylinder electric machinery structure, wherein the magnetic pole 101 of a block structure that provided with a conduction winding at where near the edge of the magnetic circuit 102 is disposed with an axial notch structure whereof the concave bottom of the axial notch is a flat or curved surface or any required geometric shape, or in a form of parallel along the EME coupling aspect for installing the PM magnetic pole 103 with corresponding shape, and an optional protective cap 1013, made of either permeable material or non-permeable material, extending at the direction facing the magnetic circuit 102 to connect with the magnetic circuit 102, is further disposed to one or both sides of the magnetic pole 101 as needed for clamping the block-shaped magnetic pole 101 and sandwiching the PM magnetic pole 103.

Figure 71:
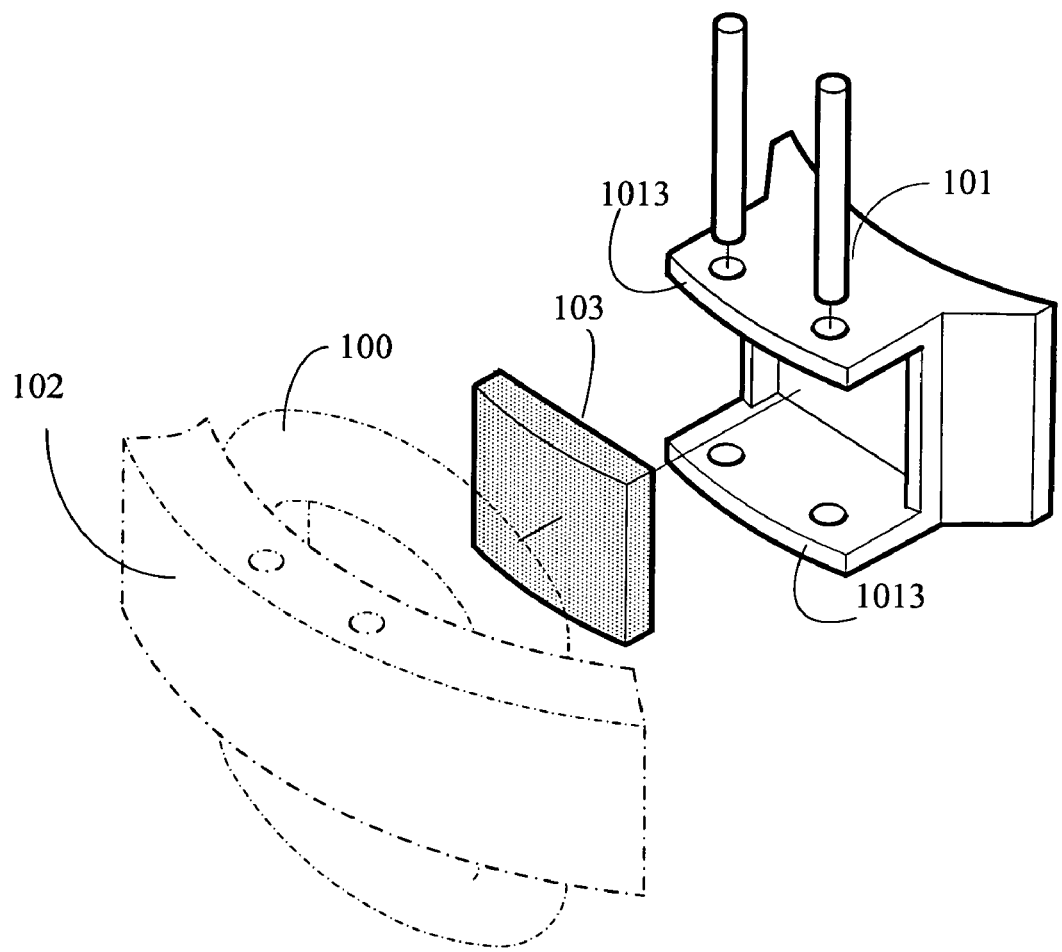
FIG. 71 is a schematic view showing an embodiment of FIG. 65 applied in the outer layer electric machinery structure of a cylinder electric machinery structure, wherein a concave socket is disposed to the magnetic pole constituted by a block integrally that provided with a conduction winding at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

FIG. 71 is a schematic view showing an embodiment of FIG. 65 applied in the outer layer electric machinery structure of a cylinder electric machinery structure, wherein a concave socket is disposed to the magnetic pole constituted by a block integrally that provided with a conduction winding at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

As illustrated in FIG. 71 is FIG. 65 to be applied in the outer layer electric machinery structure of the cylinder electric machinery structure, wherein the magnetic pole 101 constituted by a block integrally that provided with a conduction winding at where near one surface of the magnetic circuit 102 is disposed with a concave socket for installing the PM magnetic pole 103 with chosen geometric shape as needed; the protective cap 1013 disposed to one or both sides of the integrally block-shaped magnetic pole 101 extends at the direction facing the magnetic circuit 102 to connect with the magnetic circuit 102.

Figure 72:
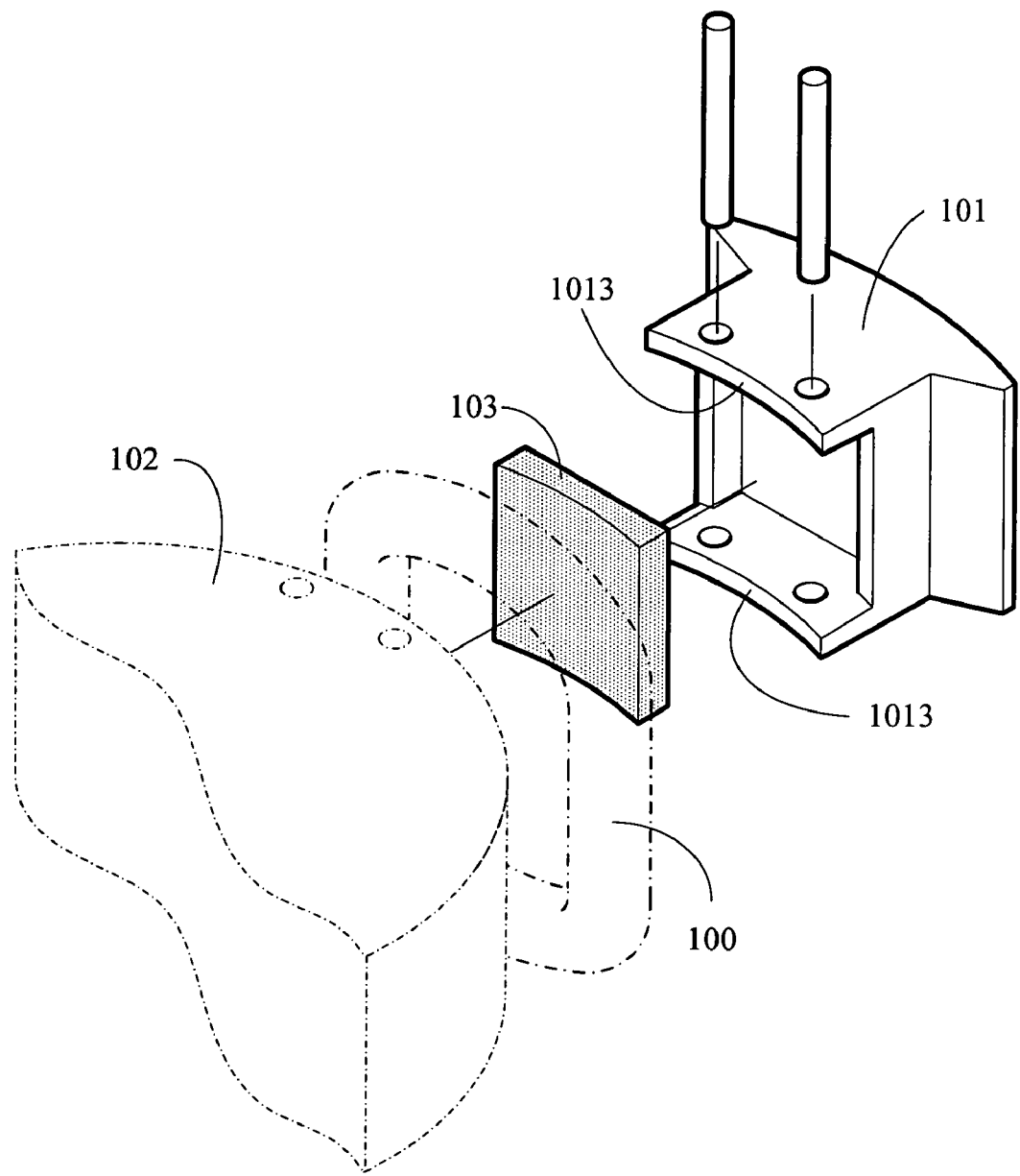
FIG. 72 is a schematic view showing an embodiment of FIG. 66 applied in the inner layer electric machinery structure of a cylinder electric machinery structure, wherein a concave socket is disposed to the magnetic pole constituted by a block integrally that provided with a conduction winding at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

FIG. 72 is a schematic view showing an embodiment of FIG. 66 applied in the inner layer electric machinery structure of a cylinder electric machinery structure, wherein a concave socket is disposed to the magnetic pole constituted by a block integrally that provided with a conduction winding at where near one surface of the magnetic circuit for installing the PM magnetic pole whereof a protective cap disposed to one or both sides of the integrally block-shaped magnetic pole extends at the direction facing the magnetic circuit to connect with the magnetic circuit.

As illustrated in FIG. 72 is FIG. 66 to be applied in the inner layer electric machinery structure of the cylinder electric machinery structure, wherein the magnetic pole 101 constituted by a block integrally that provided with a conduction winding at where near one surface of the magnetic circuit 102 is disposed with a concave socket for installing the PM magnetic pole 103 with chosen geometric shape as needed; the protective cap 1013 disposed to one or both sides of the integrally block-shaped magnetic pole 101 extends at the direction facing the magnetic circuit 102 to connect with the magnetic circuit 102

Figure 73:
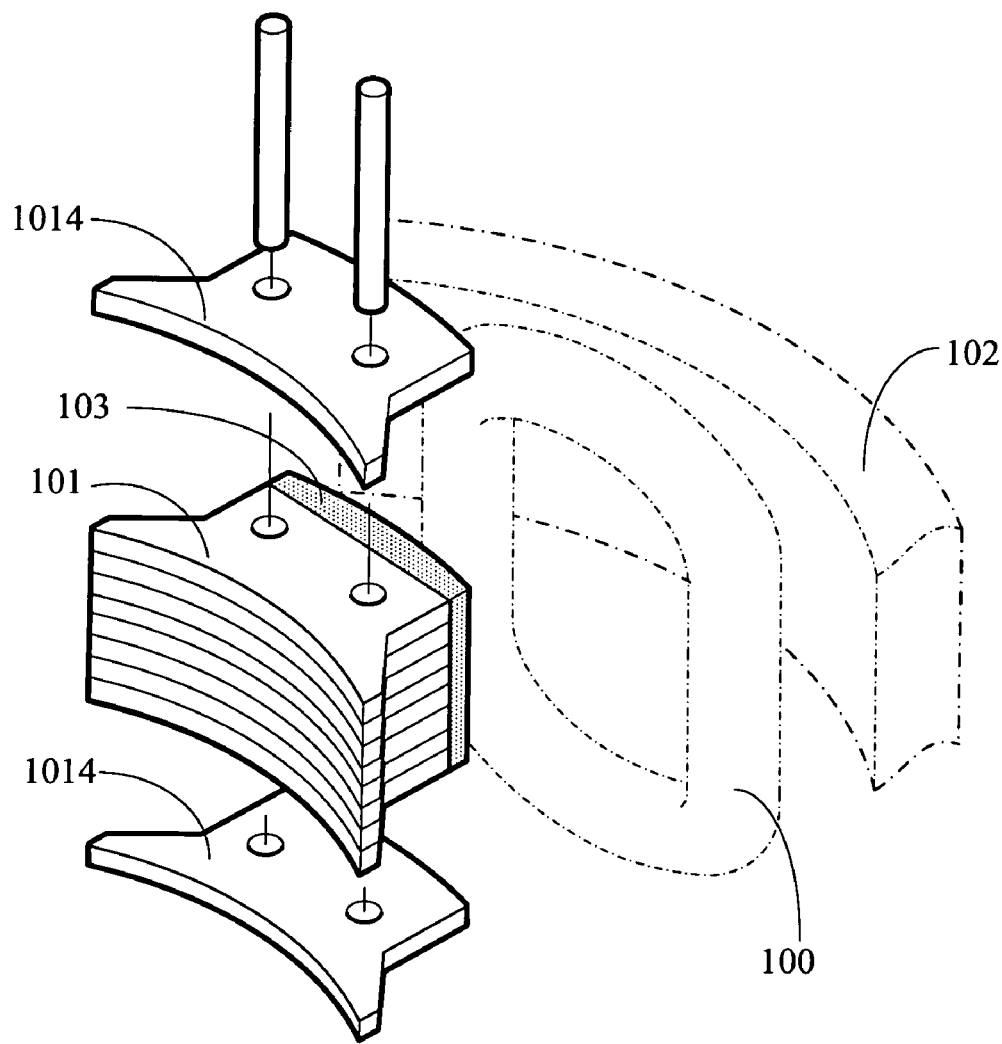
FIG. 73 is a schematic view showing an embodiment of the present invention applied in the outer layer electric machinery structure of a cylinder electric machinery structure, wherein a PM magnetic pole is sandwiched between a magnetic circuit and a magnetic pole constituted by permeable laminated sheets that provided with a conduction winding whereof a permeable protective cap is disposed to one or both sides of the PM magnetic pole.

FIG. 73 is a schematic view showing an embodiment of the present invention applied in the outer layer electric machinery structure of a cylinder electric machinery structure, wherein a PM magnetic pole is sandwiched between a magnetic circuit and a magnetic pole constituted by permeable laminated sheets that provided with a conduction winding whereof a permeable protective cap is disposed to one or both sides of the PM magnetic pole.

As illustrated in FIG. 73 is the present invention to be applied in the outer layer electric machinery structure of the cylinder electric machinery structure, wherein at where between the magnetic circuit 102 and the magnetic pole 101 constituted by permeable laminated sheets that provided with a conduction winding 100 is disposed with a PM magnetic pole 103 in given geometric shape as applicable so as to indicate the electrical machinery effect of accumulative excitement or differential excitement with the polarity of the conduction winding 100 excited magnetic pole, and one or both sides of the magnetic pole 101 is further provided a protective cap 1014 made of permeable material whereof the length of the protective cap 1014 is selectable from at least covering across two magnetic poles of different polarities of the PM magnetic pole 103 to being the same length as the combined length of the magnetic pole 101 and the PM magnetic pole 103.

Figure 74:
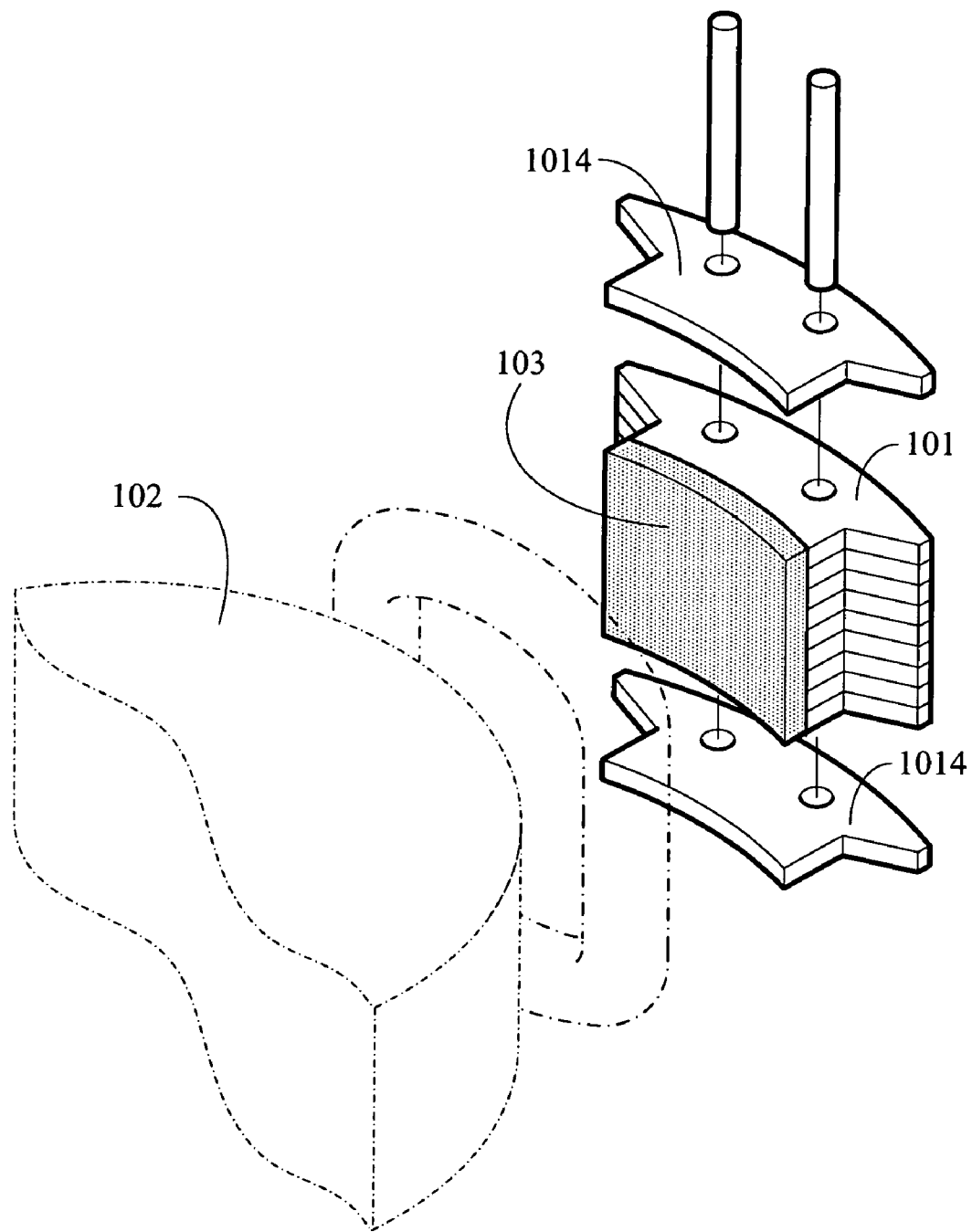
FIG. 74 is a schematic view showing an embodiment of the present invention applied in the inner layer electric machinery structure of a cylinder electric machinery structure, wherein a PM magnetic pole is sandwiched between a magnetic circuit and a magnetic pole constituted by permeable laminated sheets that provided with a conduction winding whereof a permeable protective cap is disposed to one or both sides of the PM magnetic pole.

FIG. 74 is a schematic view showing an embodiment of the present invention applied in the inner layer electric machinery structure of a cylinder electric machinery structure, wherein a PM magnetic pole is sandwiched between a magnetic circuit and a magnetic pole constituted by permeable laminated sheets that provided with a conduction winding whereof a permeable protective cap is disposed to one or both sides of the PM magnetic pole.

As illustrated in FIG. 74 is the present invention to be applied in the inner layer electric machinery structure of the cylinder electric machinery structure, wherein at where between the magnetic circuit 102 and the magnetic pole 101 constituted by permeable laminated sheets that provided with a conduction winding 100 is disposed with a PM magnetic pole 103 in given geometric shape as applicable so as to indicate the electrical machinery effect of accumulative excitement or differential excitement with the polarity of the conduction winding 100 excited magnetic pole, and one or both sides of the magnetic pole 101 is further provided a protective cap 1014 made of permeable material whereof the length of the protective cap 1014 is selectable from at least covering across two magnetic poles of different polarities of the PM magnetic pole 103 to being the same length as the combined length of the magnetic pole 101 and the PM magnetic pole 103.

Figure 75:
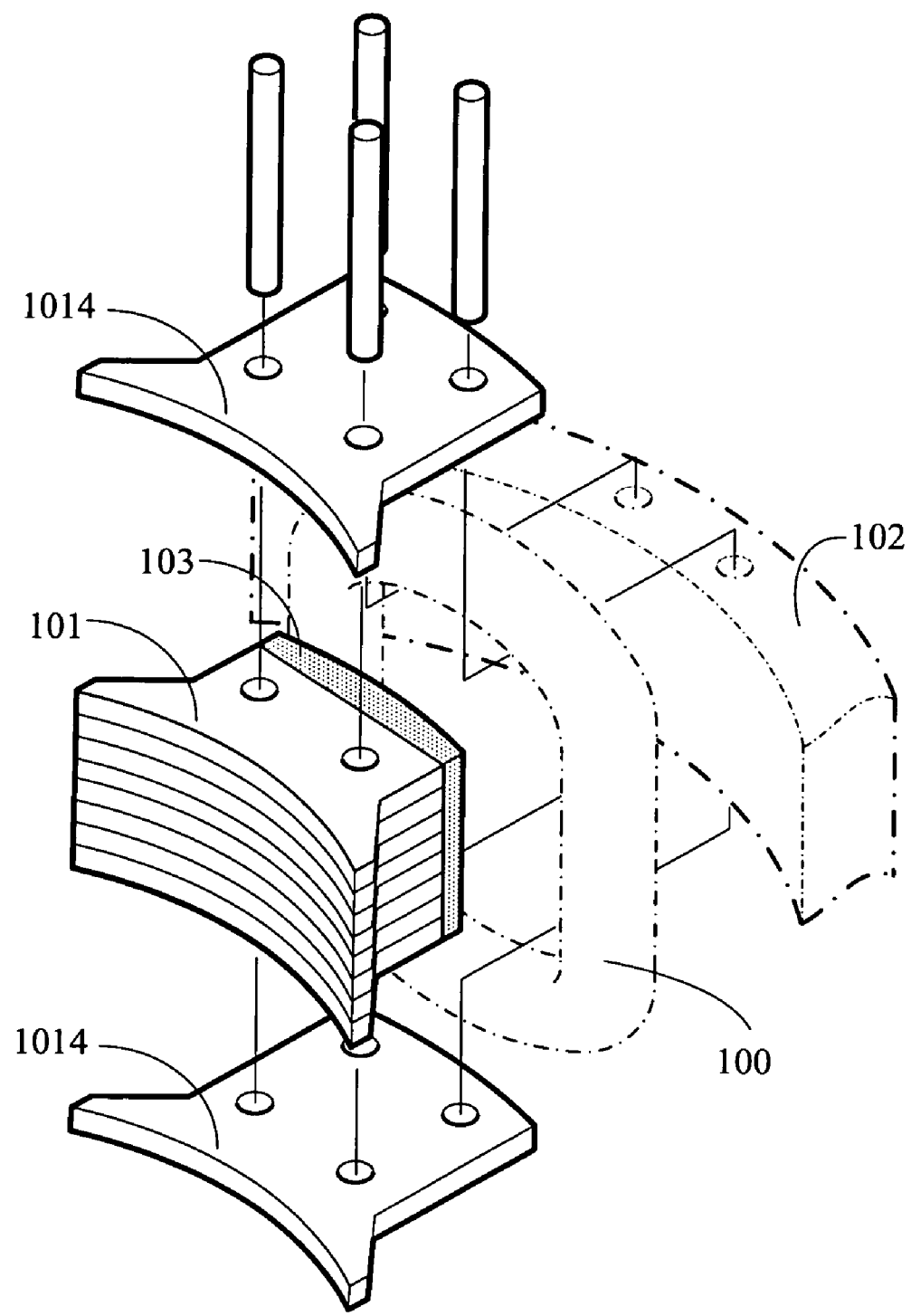
FIG. 75 is a schematic view showing an embodiment of FIG. 73 applied in the outer layer electric machinery structure of a cylinder electric machinery structure, wherein a PM magnetic pole is sandwiched between the magnetic circuit and the magnetic pole constituted by permeable laminated sheets that provided with a conduction winding, and a protective cap, extending at the direction facing the magnetic circuit to connect with the magnetic circuit, is provided to one or both sides of the PM magnetic pole for clamping the magnetic pole constituted by the permeable laminated sheets.

FIG. 75 is a schematic view showing an embodiment of FIG. 73 applied in the outer layer electric machinery structure of a cylinder electric machinery structure, wherein a PM magnetic pole is sandwiched between the magnetic circuit and the magnetic pole constituted by permeable laminated sheets that provided with a conduction winding, and a protective cap, extending at the direction facing the magnetic circuit to connect with the magnetic circuit, is provided to one or both sides of the PM magnetic pole for clamping the magnetic pole constituted by the permeable laminated sheets.

As illustrated in FIG. 75 is FIG. 73 to be applied in the outer layer electric machinery structure of the cylinder electric machinery structure, wherein at where between the magnetic circuit 102 and the magnetic pole 101 constituted by the permeable laminated sheets that provided with a conduction winding 100 is disposed with a PM magnetic pole 103 with chosen geometric shape as needed; one or both sides of the PM magnetic pole 103 is further provided with a protective cap 1014 made of permeable material for clamping the magnetic pole 101 constituted by permeable laminated sheets whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 76:
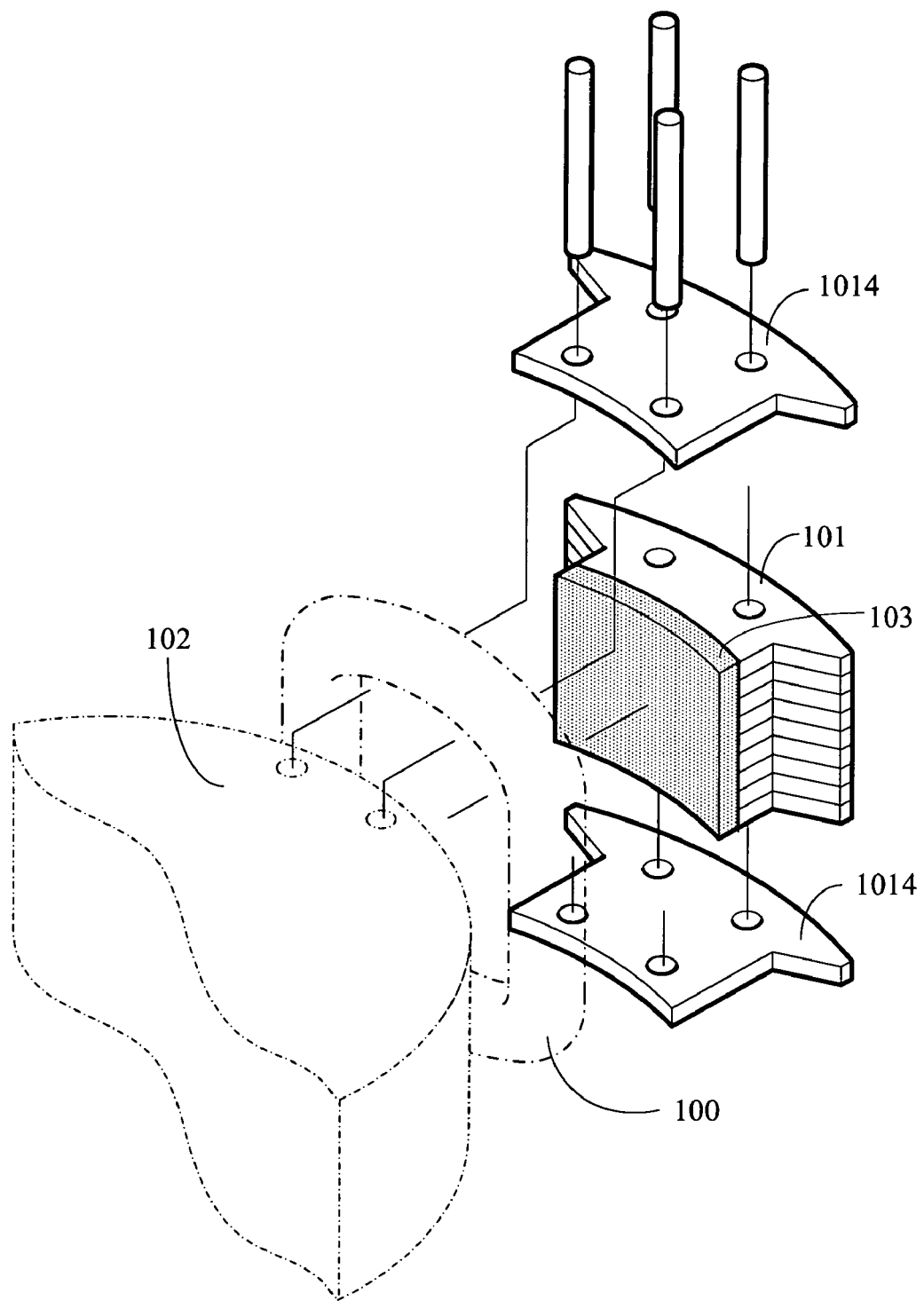
FIG. 76 is a schematic view showing an embodiment of FIG. 74 applied in the inner layer electric machinery structure of a cylinder electric machinery structure, wherein a PM magnetic pole is sandwiched between the magnetic circuit and the magnetic pole constituted by permeable laminated sheets that provided with a conduction winding, and a protective cap, extending at the direction facing the magnetic circuit to connect with the magnetic circuit, is provided to one or both sides of the PM magnetic pole for clamping the magnetic pole constituted by the permeable laminated sheets.

FIG. 76 is a schematic view showing an embodiment of FIG. 74 applied in the inner layer electric machinery structure of a cylinder electric machinery structure, wherein a PM magnetic pole is sandwiched between the magnetic circuit and the magnetic pole constituted by permeable laminated sheets that provided with a conduction winding, and a protective cap, extending at the direction facing the magnetic circuit to connect with the magnetic circuit, is provided to one or both sides of the PM magnetic pole for clamping the magnetic pole constituted by the permeable laminated sheets.

As illustrated in FIG. 76 is FIG. 74 to be applied in the inner layer electric machinery structure of the cylinder electric machinery structure, wherein at where between the magnetic circuit 102 and the magnetic pole 101 constituted by the permeable laminated sheets that provided with a conduction winding 100 is disposed with a PM magnetic pole 103 with chosen geometric shape as needed; one or both sides of the PM magnetic pole 103 is further provided with a protective cap 1014 made of permeable material for clamping the magnetic pole 101 constituted by permeable laminated sheets whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 77:
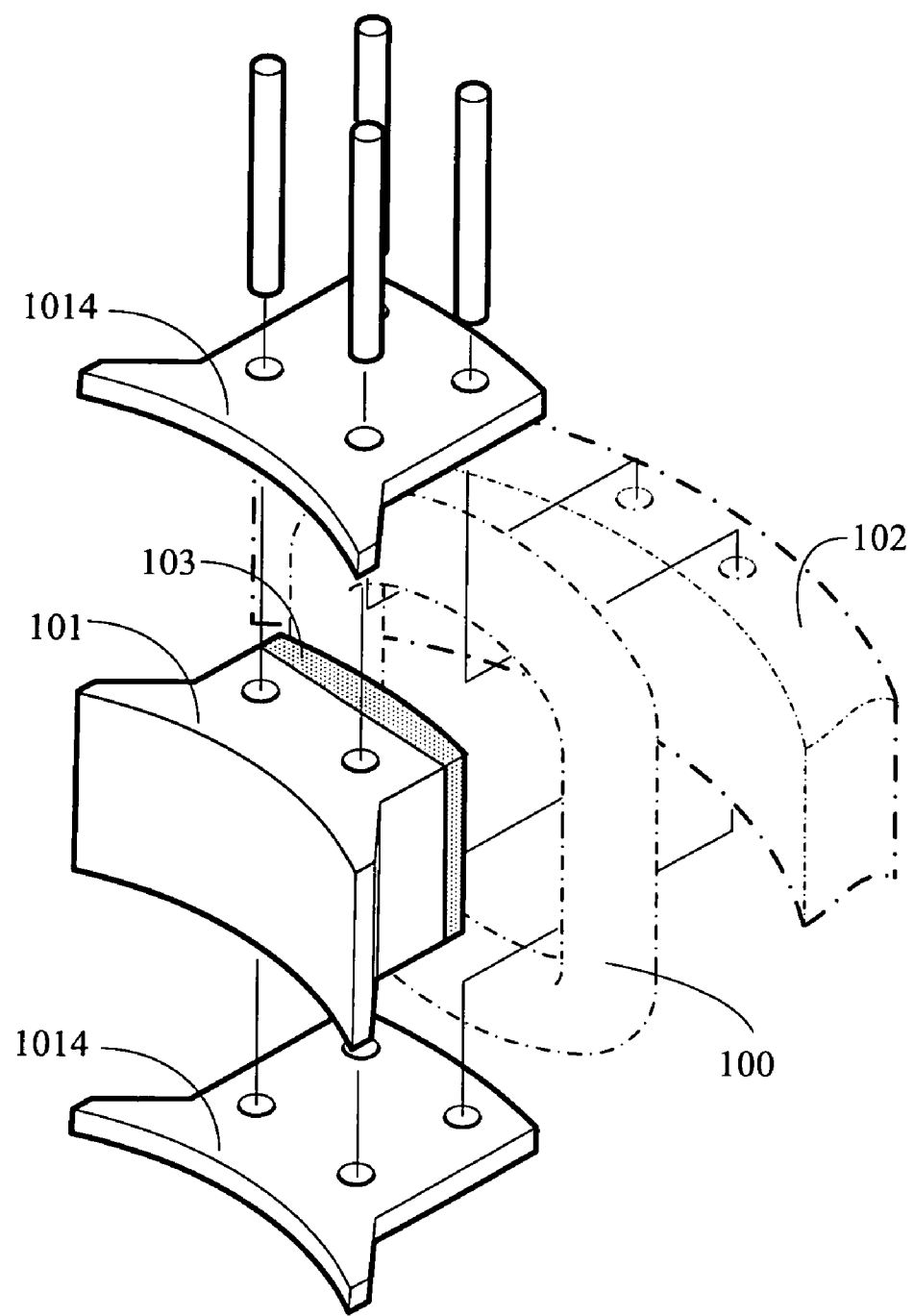
FIG. 77 is a schematic view showing an embodiment of FIG. 73 applied in the outer layer electric machinery structure of a cylinder electric machinery structure, wherein a PM magnetic pole is sandwiched between the magnetic circuit and the magnetic pole constituted by blocks that provided with a conduction winding, and a protective cap, extending at the direction facing the magnetic circuit to connect with the magnetic circuit, is provided to one or both sides of the PM magnetic pole for clamping the block-shaped magnetic pole.

FIG. 77 is a schematic view showing an embodiment of FIG. 73 applied in the outer layer electric machinery structure of a cylinder electric machinery structure, wherein a PM magnetic pole is sandwiched between the magnetic circuit and the magnetic pole constituted by blocks that provided with a conduction winding, and a protective cap, extending at the direction facing the magnetic circuit to connect with the magnetic circuit, is provided to one or both sides of the PM magnetic pole for clamping the block-shaped magnetic pole.

As illustrated in FIG. 77 is FIG. 73 to be applied in the outer layer electric machinery structure of the cylinder electric machinery structure, wherein at where between the magnetic circuit 102 and the magnetic pole 101 constituted by blocks that provided with a conduction winding 100 is disposed with a PM magnetic pole 103 with chosen geometric shape as needed; one or both sides of the PM magnetic pole 103 is further provided with a protective cap 1014 made of permeable material for clamping the block-shaped magnetic pole 101 whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 78:
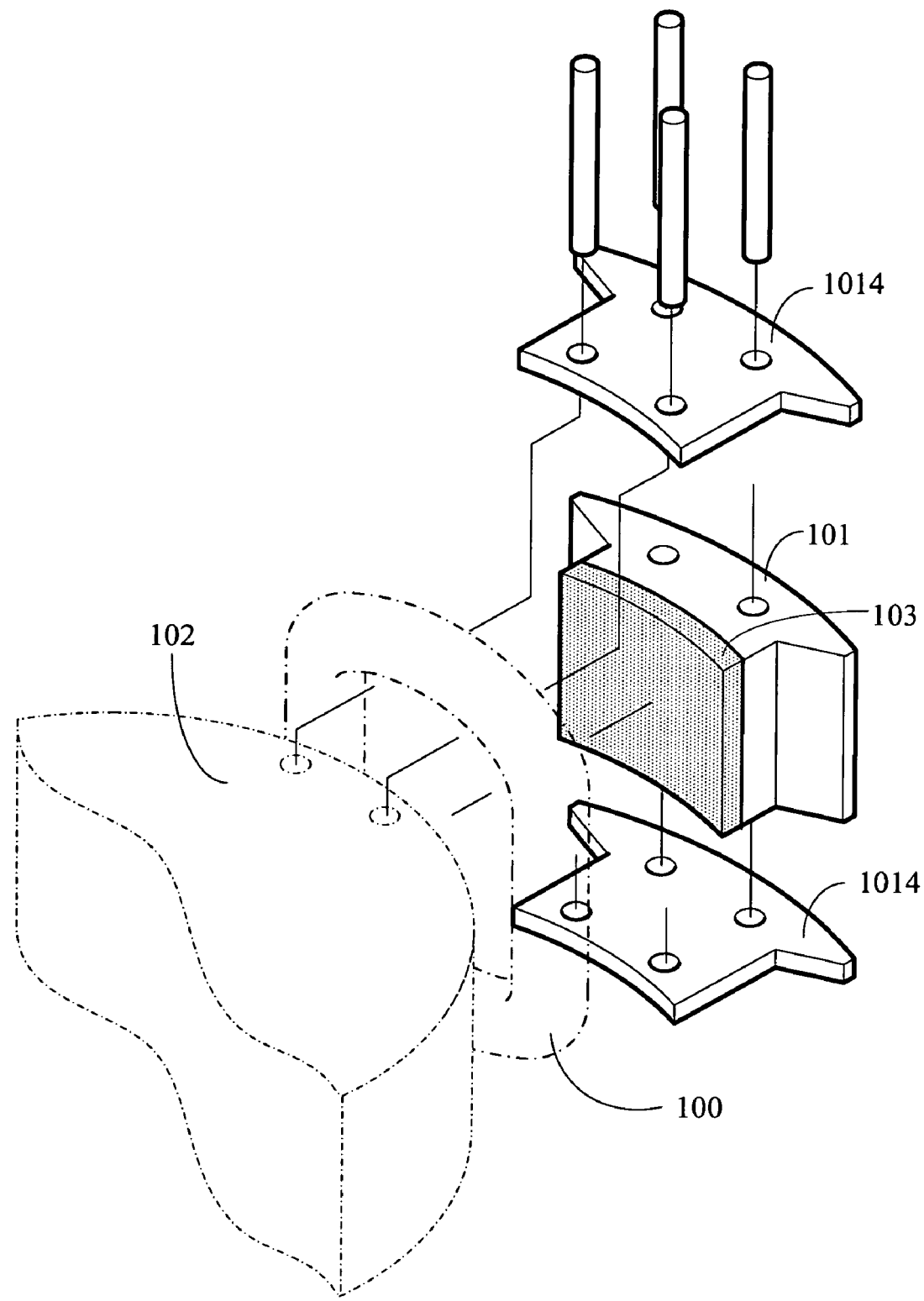
FIG. 78 is a schematic view showing an embodiment of FIG. 74 applied in the inner layer electric machinery structure of a cylinder electric machinery structure, wherein a PM magnetic pole is sandwiched between the magnetic circuit and the magnetic pole constituted by blocks that provided with a conduction winding, and a protective cap, extending at the direction facing the magnetic circuit to connect with the magnetic circuit, is provided to one or both sides of the PM magnetic pole for clamping the block-shaped magnetic pole.

FIG. 78 is a schematic view showing an embodiment of FIG. 74 applied in the inner layer electric machinery structure of a cylinder electric machinery structure, wherein a PM magnetic pole is sandwiched between the magnetic circuit and the magnetic pole constituted by blocks that provided with a conduction winding, and a protective cap, extending at the direction facing the magnetic circuit to connect with the magnetic circuit, is provided to one or both sides of the PM magnetic pole for clamping the block-shaped magnetic pole.

As illustrated in FIG. 78 is FIG. 74 to be applied in the inner layer electric machinery structure of the cylinder electric machinery structure, wherein at where between the magnetic circuit 102 and the magnetic pole 101 constituted by blocks that provided with a conduction winding 100 is disposed with a PM magnetic pole 103 with chosen geometric shape as needed; one or both sides of the PM magnetic pole 103 is further provided with a protective cap 1014 made of permeable material for clamping the block-shaped magnetic pole 101 whereof the length of the protective cap 1014 is selectable from at least covering across two magnetic poles of different polarities of the PM magnetic pole 103 to covering the combined length of the magnetic pole 101 and the PM magnetic pole 103 that extending at the direction facing the magnetic circuit 102 to connect with the magnetic circuit 102.

Figure 79:
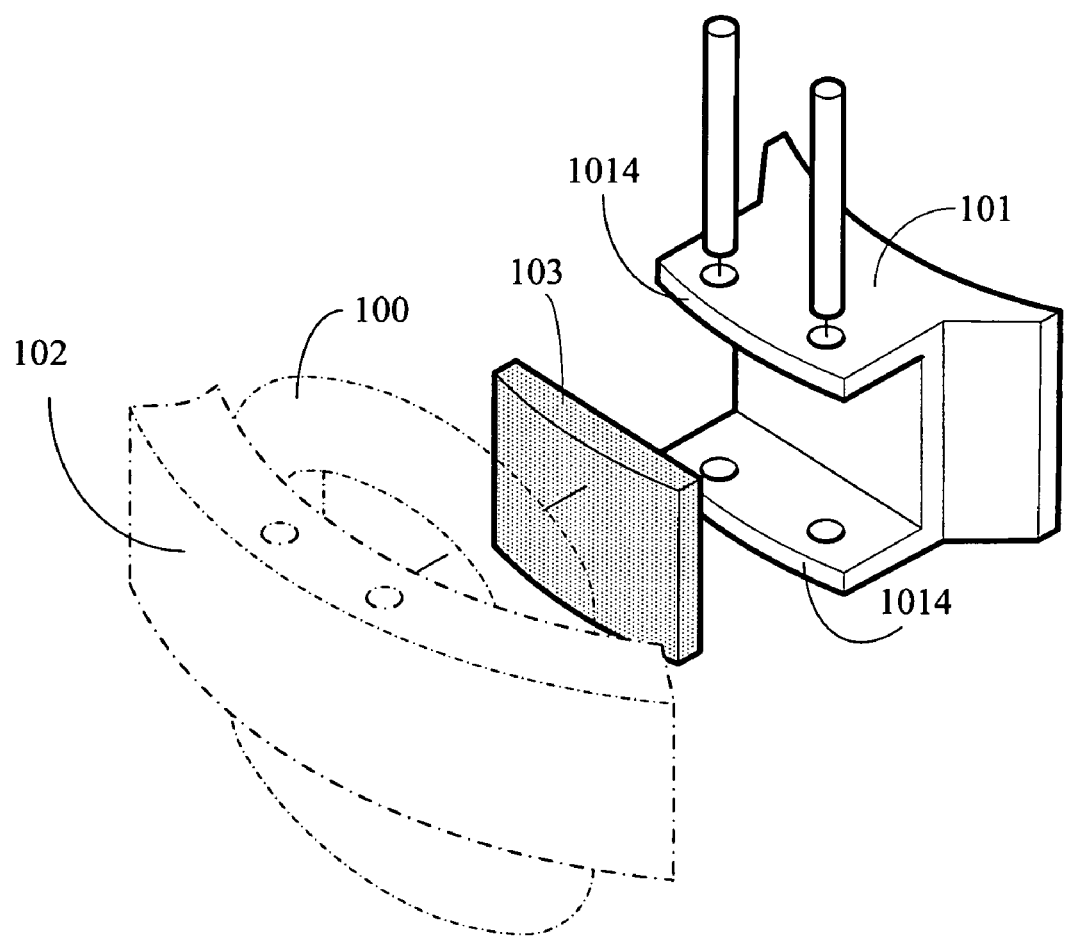
FIG. 79 is a schematic view showing an embodiment of FIG. 73 applied in the outer layer electric machinery structure of a cylinder electric machinery structure, wherein a PM magnetic pole is sandwiched between the magnetic circuit and the magnetic pole constituted by a block integrally that provided with a conduction winding whereof one or both sides of the integrally block-shaped magnetic pole by means of extending at the direction facing the magnetic circuit serves as a permeable protective cap.

FIG. 79 is a schematic view showing an embodiment of FIG. 73 applied in the outer layer electric machinery structure of a cylinder electric machinery structure, wherein a PM magnetic pole is sandwiched between the magnetic circuit and the magnetic pole constituted by a block integrally that provided with a conduction winding whereof one or both sides of the integrally block-shaped magnetic pole by means of extending at the direction facing the magnetic circuit serves as a permeable protective cap.

As illustrated in FIG. 79 is FIG. 73 to be applied in the outer layer electric machinery structure of the cylinder electric machinery structure, wherein at where between the magnetic circuit 102 and the magnetic pole 101 constituted by a block integrally that provided with a conduction winding 100 is disposed with a PM magnetic pole 103 with chosen geometric shape as needed whereof one or both sides of the integrally block-shaped magnetic pole 101 extends at the direction facing the magnetic circuit 102 for constituting a protective cap 1014 on one or both sides of the PM magnetic pole 103 whereof the protective cap 1014 is provided to connect with the magnetic circuit 102.

Figure 80:
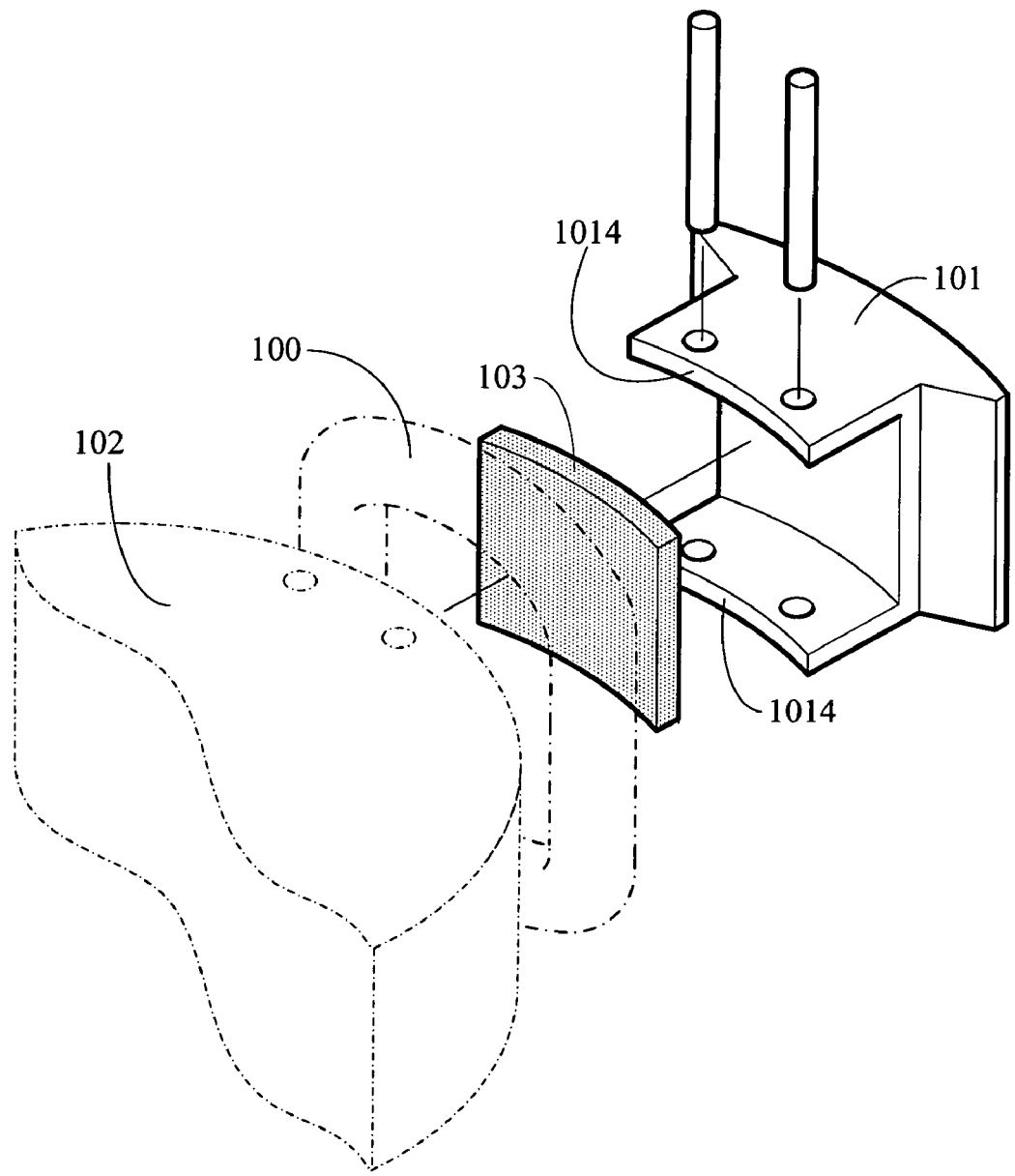
FIG. 80 is a schematic view showing an embodiment of FIG. 74 applied in the inner layer electric machinery structure of a cylinder electric machinery structure, wherein a PM magnetic pole is sandwiched between the magnetic circuit and the magnetic pole constituted by a block integrally that provided with a conduction winding whereof one or both sides of the integrally block-shaped magnetic pole by means of extending at the direction facing the magnetic circuit serves as a permeable protective cap.

FIG. 80 is a schematic view showing an embodiment of FIG. 74 applied in the inner layer electric machinery structure of a cylinder electric machinery structure, wherein a PM magnetic pole is sandwiched between the magnetic circuit and the magnetic pole constituted by a block integrally that provided with a conduction winding whereof one or both sides of the integrally block-shaped magnetic pole by means of extending at the direction facing the magnetic circuit serves as a permeable protective cap.

As illustrated in FIG. 80 is FIG. 74 to be applied in the inner layer electric machinery structure of the cylinder electric machinery structure, wherein at where between the magnetic circuit 102 and the magnetic pole 101 constituted by a block integrally that provided with a conduction winding 100 is disposed with a PM magnetic pole 103 with chosen geometric shape as needed whereof one or both sides of the integrally block-shaped magnetic pole 101 extends at the direction facing the magnetic circuit 102 for constituting a protective cap 1014 on one or both sides of the PM magnetic pole 103 whereof the protective cap 1014 is provided to connect with the magnetic circuit 102

The electric machinery provided with a PM magnetic pole wrapped by the conduction winding excited magnetic pole can be further disposed with at least one transverse rabbet on one side of the polar axis of the magnetic pole at where near the EME coupling aspect, wherein the transverse rabbet indicates a linear or arcuate or any required geometric shape, or is in a form of parallel along the EME coupling aspect for disposing the PM magnetic pole with corresponding quantity and shape whereof the PM magnetic pole wrapped by the transverse rabbet on the magnetic pole and the polar axis of the magnetic pole are having electrical phase angle difference, so as to form required electric machinery effect of accumulative excitement or different excitement with the polarity of the conduction winding 100 excited magnetic pole, as well as the distribution of the magnetic line of force of required magnetic field.

Figure 81:
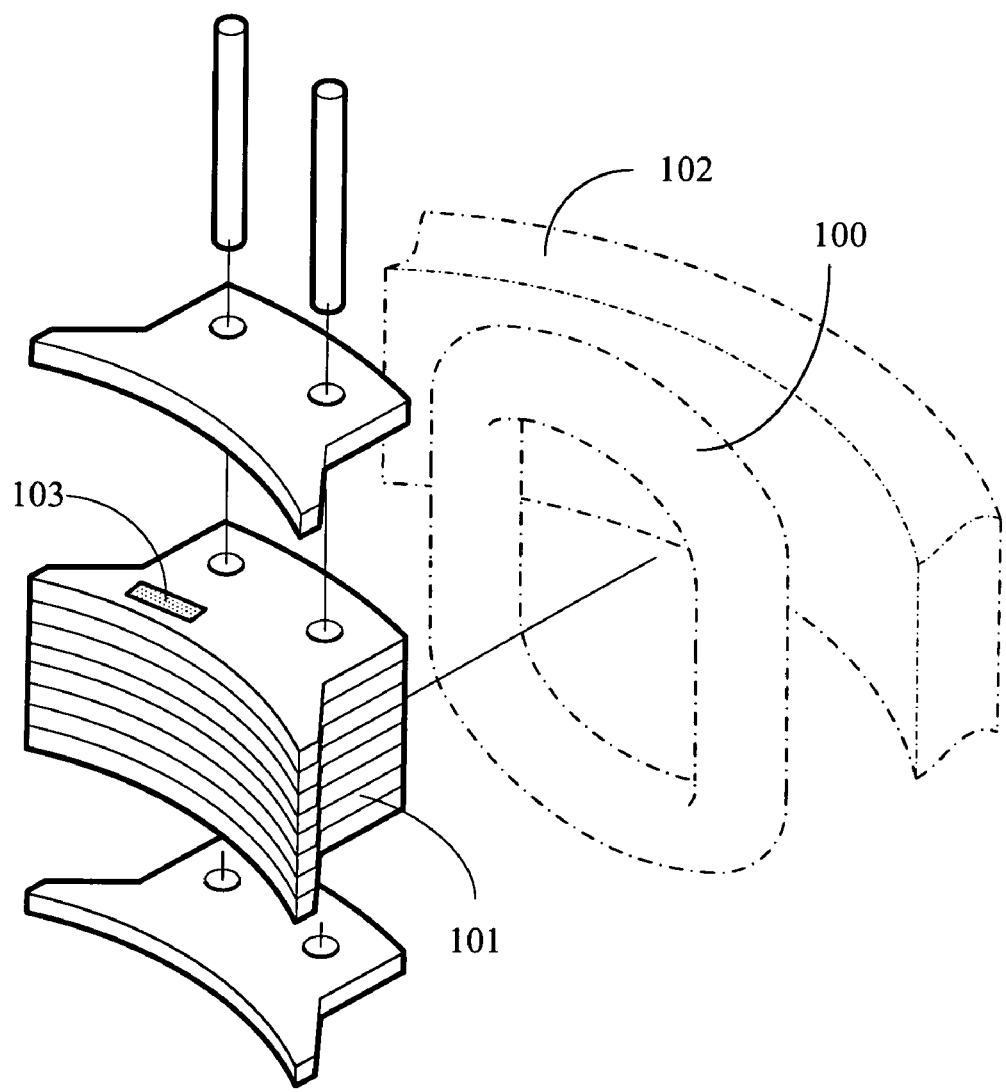
FIG. 81 is a schematic view showing an embodiment of the present invention applied in the outer layer electric machinery structure of a cylinder electric machinery structure, wherein one side of the polar axis of the magnetic pole at where near the EME coupling aspect is disposed with at least one transverse rabbet, of which the location of the transverse rabbet indicates a distribution of electrical phase angle difference with the polar axis of the magnetic pole for wrapping the PM magnetic with corresponding quantity and shape, so as to form the a distribution of magnetic line of force of required magnetic field.

FIG. 81 is a schematic view showing an embodiment of the present invention applied in the outer layer electric machinery structure of a cylinder electric machinery structure, wherein one side of the polar axis of the magnetic pole at where near the EME coupling aspect is disposed with at least one transverse rabbet, of which the location of the transverse rabbet indicates a distribution of electrical phase angle difference with the polar axis of the magnetic pole for wrapping the PM magnetic with corresponding quantity and shape, so as to form the a distribution of magnetic line of force of required magnetic field.

As illustrated in FIG. 81 is the present invention to be applied in the outer layer electric machinery structure of the cylinder electric machinery structure, wherein one side of the polar axis of the magnetic pole 101 at where near the EME coupling aspect is disposed with at least one transverse rabbet, which indicates a linear or arcuate or any required geometric shape, or is in a form of parallel along the EME coupling aspect, for placing a PM magnetic pole 103 with corresponding quantity and shape whereof the PM magnetic pole 103 wrapped by the transverse rabbet on the magnetic pole and the polar axis of the magnetic pole are having electrical phase angle difference, so as to form required electric machinery effect of accumulative excitement or different excitement with the polarity of the conduction winding 100 excited magnetic pole as well as, the distribution of the magnetic line of force of required magnetic field.

Figure 82:
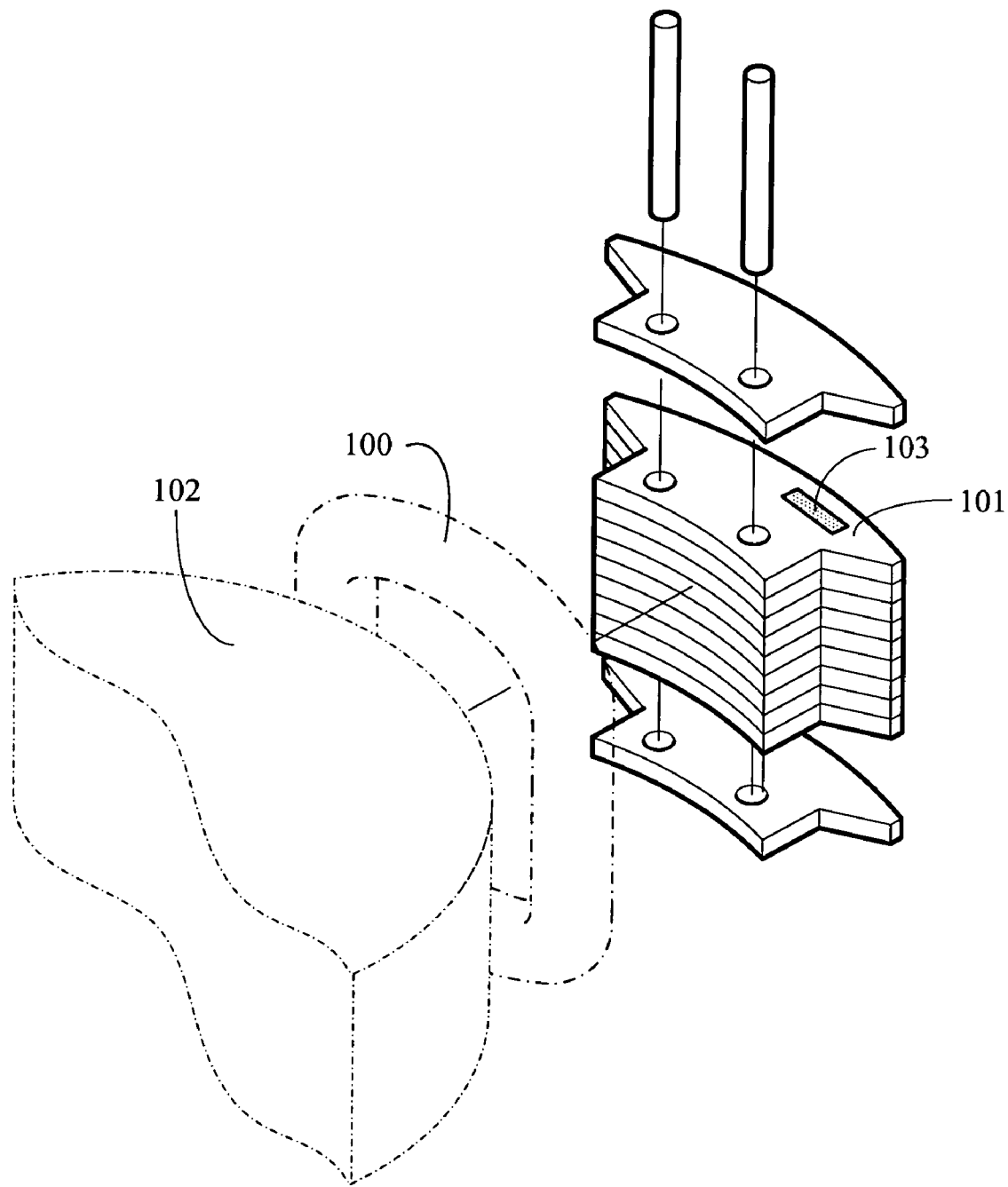
FIG. 82 is a schematic view showing an embodiment of the present invention applied in the inner layer electric machinery structure of a cylinder electric machinery structure, wherein one side of the polar axis of the magnetic pole at where near the EME coupling aspect is disposed with at least one transverse rabbet, of which the location of the transverse rabbet indicates a distribution of electrical phase angle difference with the polar axis of the magnetic pole for wrapping the PM magnetic with corresponding quantity and shape, so as to form the a distribution of magnetic line of force of required magnetic field.

FIG. 82 is a schematic view showing an embodiment of the present invention applied in the inner layer electric machinery structure of a cylinder electric machinery structure, wherein one side of the polar axis of the magnetic pole at where near the EME coupling aspect is disposed with at least one transverse rabbet, of which the location of the transverse rabbet indicates a distribution of electrical phase angle difference with the polar axis of the magnetic pole for wrapping the PM magnetic with corresponding quantity and shape, so as to form the a distribution of magnetic line of force of required magnetic field.

As illustrated in FIG. 82 is the present invention to be applied in the inner layer electric machinery structure of the cylinder electric machinery structure, wherein one side of the polar axis of the magnetic pole 101 at where near the EME coupling aspect is disposed with at least one transverse rabbet, which indicates a linear or arcuate or any required geometric shape, or is in a form of parallel along the EME coupling aspect, for placing a PM magnetic pole 103 with corresponding quantity and shape whereof the PM magnetic pole 103 wrapped by the transverse rabbet on the magnetic pole and the polar axis of the magnetic pole are having electrical phase angle difference, so as to form required electric machinery effect of accumulative excitement or different excitement with the polarity of the conduction winding 100 excited magnetic pole, as well as the distribution of the magnetic line of force of required magnetic field.

The specific structure as aforementioned in the embodied examples of FIG. 81 and FIG. 82 that one side of the polar axis of the conduction winding 100 excited magnetic pole 101 at where near the EME coupling aspect disposed with at least one transverse rabbet, which indicates a linear or arcuate or any required geometric shape, or is in a form parallel along the EME coupling aspect, for installing the PM magnetic pole 103 with corresponding quantity and shape, whereof the PM magnetic pole 103 wrapped by the transverse rabbet on the magnetic pole and the polar axis of the magnetic pole are having electrical phase angle difference so as to form the distribution of the magnetic line of force of required magnetic field can also be applied in plate or linear electric machinery structures according to the same operation principle; in addition, an optional protective cap made of either permeable material or non-permeable material can be disposed to one or both sides of the magnetic pole 103 as needed, whereof ways to disposed the protective cap include:

(1) the protective cap is not provided; or
(2) the protective cap is added on one or both sides of the PM magnetic pole 103, whereof the length of the protective cap is the same as the combined length of the magnetic pole 101 and the PM magnetic pole 103; or
(3) the protective cap is added on one or both sides of the magnetic pole 101 constituted by blocks or permeable laminated sheets for clamping the magnetic pole 101 constituted by permeable laminated sheets, whereof the protective cap extends at the direction facing the magnetic circuit 102 to connect with the magnetic circuit 102; or
(4) a PM magnetic pole 103 which is thinner than the thickness of the magnetic pole 101 is disposed into the transverse rabbet, whereby a protective cap is stuffed into or a filler is added into one or both ends of the transverse rabbet.

The electric machinery provided with a PM magnetic pole wrapped by conduction winding excited magnetic poles is further disposed with at least one transverse rabbet on each of both sides of the polar axis of the conduction winding 100 excited magnetic pole at where near the EME coupling aspect; the transverse rabbet indicates a linear, arcuate or any required geometric shape, or in a form of parallel along the EME coupling aspect, of which the location of the rabbet and the polar axis of the magnetic pole are with electrical phase angle difference for disposing two or above two PM magnetic poles with corresponding quantity and shape, so as to form the electric machinery effect of required accumulative excitement or differential excitement, as well as the distribution of the magnetic line of force of required magnetic field with the polarity of conduction winding 100 excited magnetic poles.

Figure 83:
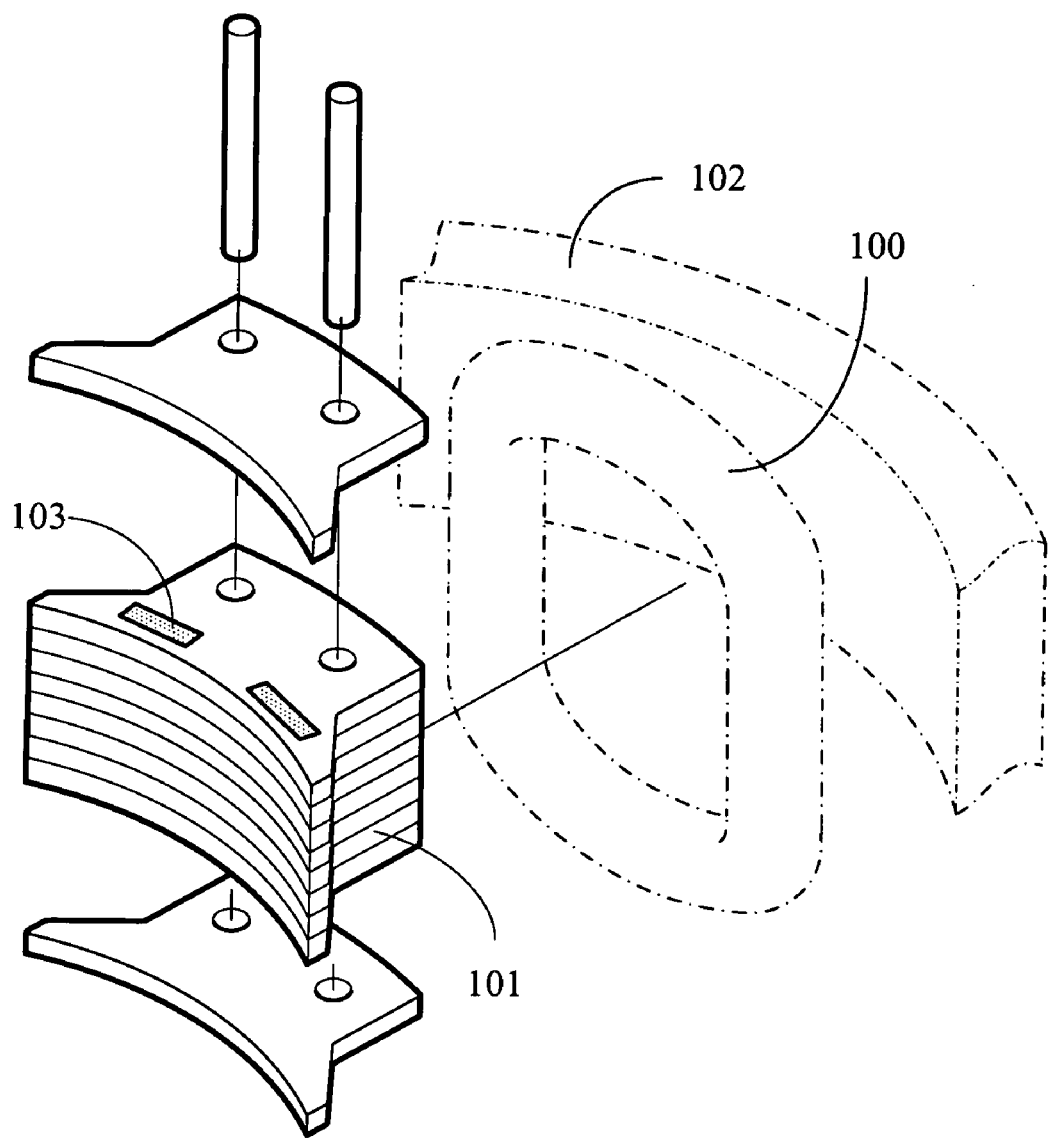
FIG. 83 is a schematic view showing an embodiment of the present invention applied in the outer layer electric machinery structure of a cylinder electric machinery structure, wherein each of both sides of the polar axis of the conduction winding excited magnetic pole at where near the EME coupling aspect is disposed with at least one transverse rabbet, of which the location of the transverse rabbet indicates a distribution of electrical phase angle difference with the polar axis of the magnetic pole for wrapping two or above two PM magnetic poles with corresponding quantity and shape, so as to form the electric machinery effect of accumulative excitement or differential excitement, as well as the distribution of the magnetic line of force of required magnetic field with the polarity of conduction winding excited magnetic poles.

FIG. 83 is a schematic view showing an embodiment of the present invention applied in the outer layer electric machinery structure of a cylinder electric machinery structure, wherein each of both sides of the polar axis of the conduction winding excited magnetic pole at where near the EME coupling aspect is disposed with at least one transverse rabbet, of which the location of the transverse rabbet indicates a distribution of electrical phase angle difference with the polar axis of the magnetic pole for wrapping two or above two PM magnetic poles with corresponding quantity and shape, so as to form the electric machinery effect of accumulative excitement or differential excitement, as well as the distribution of the magnetic line of force of required magnetic field with the polarity of conduction winding excited magnetic poles.

As illustrated in FIG. 83 is the present invention to be applied in the outer layer electric machinery structure of the cylinder electric machinery structure, wherein each of the both sides of the polar axis of the conduction winding 100 excited magnetic pole 101 of a block shape or constituted by permeable laminated sheets at where near the EME coupling aspect is disposed with at least one transverse rabbet indicating a linear, arcuate or any required geometric shape, or in a form of parallel along with the EME coupling aspect, of which the location of the transverse rabbet being indicating a distribution of electrical phase angle difference to the polar axis of the magnetic pole 101 for wrapping two or above two PM magnetic poles 103 with corresponding quantity and shape, so as to form the electric machinery effect of required accumulative excitement or differential excitement as well as the distribution of the magnetic line of force of required magnetic field with the polarity of conduction winding 100 excited magnetic poles 101.

Figure 84:
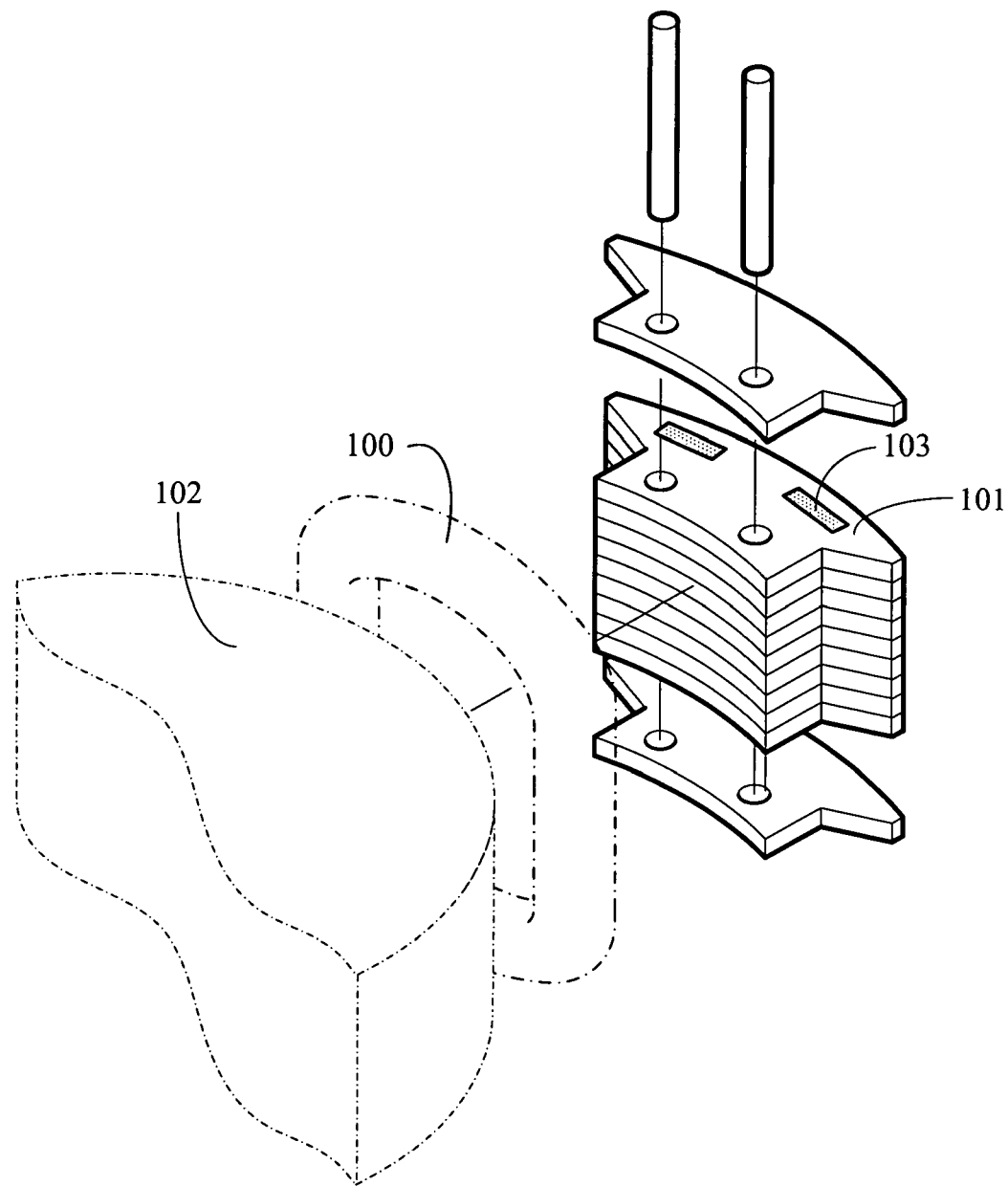
FIG. 84 is a schematic view showing an embodiment of the present invention applied in the inner layer electric machinery structure of a cylinder electric machinery structure, wherein each of both sides of the polar axis of the conduction winding excited magnetic pole at where near the EME coupling aspect is disposed with at least one transverse rabbet, of which the location of the transverse rabbet indicates a distribution of electrical phase angle difference with the polar axis of the magnetic pole for wrapping two or above two PM magnetic poles with corresponding quantity and shape, so as to form the electric machinery effect of accumulative excitement or differential excitement, as well as the distribution of the magnetic line of force of required magnetic field with the polarity of conduction winding excited magnetic poles.

FIG. 84 is a schematic view showing an embodiment of the present invention applied in the inner layer electric machinery structure of a cylinder electric machinery structure, wherein each of both sides of the polar axis of the conduction winding excited magnetic pole at where near the EME coupling aspect is disposed with at least one transverse rabbet, of which the location of the transverse rabbet indicates a distribution of electrical phase angle difference with the polar axis of the magnetic pole for wrapping two or above two PM magnetic poles with corresponding quantity and shape, so as to form the electric machinery effect of accumulative excitement or differential excitement, as well as the distribution of the magnetic line of force of required magnetic field with the polarity of conduction winding excited magnetic poles.

As illustrated in FIG. 84 is the present invention to be applied in the inner layer electric machinery structure of the cylinder electric machinery structure, wherein each of the both sides of the polar axis of the conduction winding 100 excited magnetic pole 101 of a block shape or constituted by permeable laminated sheets at where near the EME coupling aspect is disposed with at least one transverse rabbet indicating a linear, arcuate or any required geometric shape, or in a form of parallel along with the EME coupling aspect, of which the location of the transverse rabbet being indicating a distribution of electrical phase angle difference to the polar axis of the magnetic pole 101 for wrapping two or above two PM magnetic poles 103 with corresponding quantity and shape, so as to form the electric machinery effect of required accumulative excitement or differential excitement as well as the distribution of the magnetic line of force of required magnetic field with the polarity of conduction winding 100 excited magnetic poles 101.

The method as aforementioned in the embodied examples as shown in FIG. 83 and FIG. 84 that each of both sides of the polar axis of the conduction winding 100 excited magnetic pole 101 of a block shape or constituted by permeable laminated sheets at where near the EME coupling aspect is disposed with at least one transverse rabbet for wrapping two or above two PM magnetic poles 103 that having electrical phase angle difference to the polar axis of the magnetic pole 101 so as to form the electric machinery effect of required accumulative excitement or differential excitement as well as the distribution of the magnetic line of force of required magnetic field can be applied in both plate or linear electric machinery structures according to the same operation principle; in addition, an optional protective cap made of either permeable material or non-permeable material can be disposed to one or both sides of the magnetic pole 103 as needed, whereof ways to disposed the protective cap include:

(1) the protective cap is not provided; or
(2) the protective cap is added on one or both sides of the PM magnetic pole 103, whereof the length of the protective cap is the same as the combined length of the magnetic pole 101 and the PM magnetic pole 103; or
(3) the protective cap is added on one or both sides of the magnetic pole 101 constituted by blocks or permeable laminated sheets for clamping the magnetic pole 101 constituted by permeable laminated sheets, whereof the protective cap extends at the direction facing the magnetic circuit 102 to connect with the magnetic circuit 102; or
(4) a PM magnetic pole 103 which is thinner than the thickness of the magnetic pole 101 is disposed into the transverse rabbet, whereby a protective cap is stuffed into or a filler is added into one or both ends of the transverse rabbet.

The embodied examples as shown in FIG. 49~FIG. 84 are various structures to wrap the PM magnetic pole 103 applied in the cylinder electric machinery structure with inner and outer layers electric machinery structure, whereof it can be applied in the coaxial 3-ring type electric machinery structure or double layer type plate electric machinery structure or coaxial 3-layer type plate electric machinery structure and double layer type linear electric machinery structure or 3-layer type linear electric machinery structure according to the same operation principle, and ways to add the protective cap and selections of the permeability of the material of the protective cap are the same as illustrated in FIG. 49~FIG. 84.

Accordingly, the electric machinery provided with a PM magnetic pole wrapped in the conduction winding excited magnetic pole of the present invention by having disposed the PM magnetic pole 103 wrapped between the conduction winding excited magnetic pole 101 and the magnetic circuit 102 to reduce excited current is characterized in preventing PM magnetic pole from falling off and avoiding its magnetic force of the PM magnetic pole from being weakened by inverse excitation during the operation when compared to the conventional electric machinery having adhered a PM magnetic pole to a pole-face.

The invention claimed is:

1. An electric machinery comprising:
 a permeable magnetic circuit;
 a permeable conduction winding excited individual magnetic pole, wherein the permeable conduction winding excited individual magnetic pole is wrapped by a conduction winding capable of exciting the permeable conduction winding excited individual magnetic pole; and
 a PM magnetic pole having ends with different polarities wrapped by the permeable magnetic circuit and the permeable conduction winding excited individual magnetic pole, wherein the permeable magnetic circuit and the permeable conduction winding excited individual magnetic pole form two magnetic poles having the different polarities of the PM magnetic pole,
 wherein polarities between the conduction winding excited individual magnetic pole and the wrapped PM magnetic pole have either an accumaltive excitement effect of the same polarity or a differential excitement of opposite polarities, and
 wherein the combination of the permeable conduction winding excited individual magnetic pole and the permeable magnetic circuit having the different polarities on the PM magnetic poles forms a permeable circuit for passing through the permeable conduction winding excited individual magnetic pole a partial magnetic line of force on the PM magnetic pole while the PM magnetic pole remains to form a partial strength of the magnetic field on the pole-face of the permeable conduction winding excited individual magnetic pole, whereby when the PM magnetic pole is inversely excited in the course of the operation, two magnetic poles of different polarities on the PM magnetic pole keeps the magnetic circuit closed to maintain the magnetic line of force so as to enhance the property against inverse excitation.

2. The electric machinery provided with a PM magnetic pole wrapped by the permeable conduction winding excited individual magnetic pole as claimed in claim 1, wherein the permeable conduction winding excited individual magnetic pole is disposed to the individual magnetic pole to wrap the PM magnetic pole jointly with the magnetic circuit to constitute magnetic pole whereof the magnetic circuit or the magnetic pole is comprised of a material of silicon steel sheets, steel, or iron providing good permeability and made in an integral part or a stack of multiple sheets by lamination, or made by metallurgy from the dust of permeable material; a pole-face of the magnetic pole faces a structure of another electric machinery that interacts to execute EME; and the pole-face of the magnetic pole may be selected to indicate a convex, concave, or flat surface, or may be further disposed with a groove to indicate protrusion and indention pattern or a specific geometric form as applicable.

3. The electric machinery provided with a PM magnetic pole wrapped by the conduction winding excited magnetic pole as claimed in claim 1, wherein the permeable conduction winding excited individual magnetic pole provided with a conduction winding is further constituted by means of the neck section of the magnetic circuit on magnetic pole and the magnetic pole to jointly wrap the PM magnetic pole whereof the magnetic circuit the neck section of the magnetic circuit on magnetic pole and the magnetic pole are comprised of a material of silicon steel sheets, steel, or iron providing good permeability and made in an integral part or a stack of multiple sheets by lamination, or made by metallurgy from the dust of permeable material; a pole-face of the magnetic pole faces a structure of another electric machinery that interacts to execute EME; and the pole-face of the magnetic pole may be selected to indicate a convex, concave, or flat surface, or may be further disposed with a groove to indicate protrusion and indention pattern or a specific geometric form as applicable.

4. The electric machinery provided with a PM magnetic pole wrapped by the permeable conduction winding excited individual magnetic pole as claimed in claim 1 is related to a cylinder electric machinery in a construction comprised of an inner layer electric machinery structure and an outer layer electric machinery structure including an inner layer electric machinery structure and an outer layer electric machinery structure, comprising:
 a) an EME coupling aspect of the outer layer electric machinery structure in a direction facing the inner layer electric machinery structure to execute EME coupling; or
 b) an EME coupling aspect of the inner layer electric machinery structure in a direction facing the outer layer electric machinery structure to execute EME coupling;
 wherein the EME coupling aspects of above items a) and b) are respectively disposed with an conduction winding excited individual magnetic pole, and the PM magnetic pole indicating accumulative excitement is wrapped either in the mid section of magnetic circuit of the individual magnetic pole or between the permeable conduction winding excited individual magnetic pole and the magnetic circuit thus to constitute the cylinder electric machinery provided with the PM magnetic pole with accumulative excitement being wrapped between the conduction winding excited magnetic pole and the magnetic circuit.

5. The electric machinery provided with a PM magnetic pole wrapped by the permeable conduction winding excited individual magnetic pole as claimed in claim 1 is related to a coaxial 3-ring type electric machinery to engage in coaxial operation by insertion of an inner ring, a mid ring, and the outer ring electric machinery structures including the inner ring electric machinery structure, the mid ring electric machinery structure, and the outer ring electric machinery structure, comprising:

a) an EME coupling aspect of the outer ring electric machinery structure in a direction facing the mid ring electric machinery structure; or
b) an EME coupling aspect of the mid ring electric machinery structure in a direction facing the inner ring electric machinery structure; or
c) an EME coupling aspect of the inner ring electric machinery structure in a direction facing the mid ring electric machinery structure; or
d) an EME coupling aspect of the mid ring electric machinery structure in a direction facing the outer ring electric machinery structure;

wherein the EME coupling aspects of above items a), b), c) and d) are respectively disposed with an permeable conduction winding excited individual magnetic pole, and the PM magnetic pole indicating accumulative excitement is wrapped either in the mid section of the magnetic circuit of the individual magnetic pole or between the permeable conduction winding excited individual magnetic pole and the magnetic circuit thus to constitute the coaxial 3-ring type electric machinery provided with the PM magnetic pole with accumulative excitement being wrapped between the conduction winding excited magnetic pole and the magnetic circuit.

6. The electric machinery provided with a PM magnetic pole wrapped in the permeable conduction winding excited individual magnetic pole as claimed in claim 1 is related to a coaxial 3-ring type electric machinery to engage in coaxial operation by insertion of an inner ring, a mid ring, and the outer ring electric machinery structures including the inner ring electric machinery structure, the mid ring electric machinery structure, and the outer ring electric machinery structure, comprising:
   a) an EME coupling aspect of the outer ring electric machinery structure in a direction facing the mid ring electric machinery structure and an EME coupling aspect of the mid ring electric machinery structure in a direction facing the inner ring electric machinery structure; or
   b) an EME coupling aspect of the inner ring electric machinery structure in a direction facing the mid ring electric machinery structure and an EME coupling aspect of the mid ring electric machinery structure in a direction facing the outer ring electric machinery structure; or
   c) an EME coupling aspect of the outer ring electric machinery structure in a direction facing the mid ring electric machinery structure and an EME coupling aspect of the inner ring electric machinery structure in a direction facing the mid ring electric machinery structure; or
   d) two EME coupling aspects on both sides of the mid ring electric machinery structure respectively in a direction facing the outer ring electric machinery structure and in another direction facing the inner ring electric machinery structure;

wherein the EME coupling aspects of above items a), b), c) and d) are respectively disposed with an permeable conduction winding excited individual magnetic pole, and the PM magnetic pole indicating accumulative excitement is wrapped either in the mid section of the magnetic circuit of the individual magnetic pole or between the permeable conduction winding excited individual magnetic pole and the magnetic circuit thus to constitute the coaxial 3-ring type electric machinery provided with the PM magnetic pole with accumulative excitement being wrapped between the permeable conduction winding excited individual magnetic pole and the magnetic circuit.

7. The electric machinery provided with a PM magnetic pole wrapped by the permeable conduction winding excited individual magnetic pole as claimed in claim 1 is related to a coaxial 3-ring type electric machinery to engage in coaxial operation by insertion of an inner ring, a mid ring, and the outer ring electric machinery structures including the inner ring electric machinery structure, the mid ring electric machinery structure, and the outer ring electric machinery structure,
   wherein the mid ring electric machinery structure is arranged to wrap a PM magnetic pole by a permeable body to constitute a magnetic pole and a conduction excitement winding is wound to the PM magnetic pole; the magnetic poles on both ends of the PM magnetic pole are provided for respectively executing EME interaction of bilateral coupling with both the inner ring electric machinery structure and the outer ring electric machinery structure, thus further constituting a coaxial 3-ring type electric machinery with the accumulative excitement winding being wound to the PM magnetic pole.

8. The electric machinery provided with a PM magnetic pole wrapped by the conduction winding excited magnetic pole as claimed in claim 1 is related to a coaxial double layer type plate electric machinery comprised of two layers of electric machinery structure laminated to engage in coaxial operation including the inner layer plate electric machinery structure (31) and the outer layer plate electric machinery structure (32), and is characterized as:
   the PM magnetic pole (103) indicating accumulative excitement wrapped either in the mid section of the magnetic circuit of the conduction winding individual magnetic pole (101) or between the individual magnetic pole (101) and the magnetic circuit (102) to execute EME interaction with the outer layer plate electric machinery structure (32) is disposed on an EME coupling aspect of the inner layer plate electric machinery structure (31) in a direction facing the outer layer plate electric machinery structure (32); or the PM magnetic pole (103) indicating accumulative excitement wrapped either in the mid section of the magnetic circuit of the conduction winding individual magnetic pole (101) or between the individual magnetic pole (101) and the magnetic circuit (102) to execute EME interaction with the inner layer plate electric machinery structure (31) is disposed on an EME coupling aspect of the outer layer plate electric machinery structure (32) in a direction facing the inner layer plate electric machinery structure (31) thus to constitute a coaxial double layer type plate electric machinery provided with a PM magnetic pole (103) with accumulative excitement being wrapped between the conduction winding excited magnetic pole (101) and the magnetic circuit (102).

9. The electric machinery provided with a PM magnetic pole wrapped by the conduction winding excited magnetic pole as claimed in claim 1 is related to a coaxial 3-layer type plate electric machinery comprised of an inner, a mid, and an outer layer electric machinery structures coaxially laminated to engage in coaxial operation including the inner layer plate electric machinery structure (41), the mid layer plate electric machinery structure (42), and the outer layer plate electric machinery structure (43), and is characterized as having:
   a) an EME coupling aspect of the inner layer plate electric machinery (41) in a direction facing the mid layer plate electric machinery structure (42); or b) an EME coupling aspect of the mid layer plate electric machinery (42) in a direction facing the inner layer plate electric machinery structure (41); or c) an EME coupling aspect of the mid layer plate electric machinery (42) in a direction facing the outer layer plate electric machinery structure (43); or d) an EME coupling aspect of the outer layer plate electric machinery (43) in a direction facing the mid layer plate electric machinery structure (42);

the EME coupling aspects of above items a), b), c) and d) are respectively disposed with an conduction winding (100) excited individual magnetic pole (101), and the PM magnetic pole (103) indicating accumulative excitement is wrapped either in the mid section of the magnetic circuit of the individual magnetic pole (101) or between the individual magnetic pole (101) and the magnetic circuit (102) thus to constitute the coaxial 3-layer type plate electric machinery provided with the PM magnetic pole (103) with accumulative excitement being wrapped between the conduction winding excited magnetic pole (101) and the magnetic circuit (102).

10. The electric machinery provided with a PM magnetic pole wrapped by the conduction winding excited magnetic pole as claimed in claim 1 is related to a coaxial 3-layer type plate electric machinery comprised of an inner, a mid, and an outer layer electric machinery structures laminated to engage in coaxial operation including the inner layer plate electric machinery structure (41), the mid layer plate electric machinery structure (42), and the outer layer plate electric machinery structure (43), and is characterized as having:

a) two EME coupling aspects respectively of the inner layer plate electric machinery structure (41) in a direction facing the mid layer plate electric machinery structure (42) and of the mid layer plate electric machinery structure (42) in another direction facing the outer layer plate electric machinery structure (43); or b) two EME coupling aspects respectively of the outer layer plate electric machinery structure (43) in a direction facing the mid layer plate electric machinery structure (42) and of the mid layer plate electric machinery structure (42) in another direction facing the inner layer plate electric machinery structure (41); or c) two EME coupling aspects respectively of the inner layer plate electric machinery structure (41) and the outer layer plate electric machinery structure (43) in a direction facing the mid layer plate electric machinery structure (42); or d) two EME coupling aspects on both sides of the mid layer plate electric machinery structure (42) respectively in a direction facing the inner layer plate electric machinery structure (41) and in another direction facing the outer layer plate electric machinery structure (43);

the EME coupling aspects of above items a), b), c) and d) are respectively disposed with an conduction winding (100) excited individual magnetic pole (101), and the PM magnetic pole (103) indicating accumulative excitement is wrapped either in the mid section of the magnetic circuit of the individual magnetic pole (101) or between the individual magnetic pole (101) and the magnetic circuit (102) thus to constitute the coaxial 3-layer type plate electric machinery provided with the PM magnetic pole (103) with accumulative excitement being wrapped between the conduction winding excited magnetic pole (101) and the magnetic circuit (102).

11. The electric machinery provided with a PM magnetic pole wrapped by the conduction winding excited magnetic pole as claimed in claim 1 is related to a coaxial 3-layer type plate electric machinery comprised of an inner, a mid, and an outer layer electric machinery structures laminated to engage in coaxial operation including the inner layer plate electric machinery structure (41), the mid layer plate electric machinery structure (42), and the outer layer plate electric machinery structure (43), and is characterized as:

the mid layer plate electric machinery structure (42) is arranged to wrap a PM magnetic pole (103) by a permeable body to constitute a magnetic pole, and a conduction excitement winding (100) is wound to the PM magnetic pole (103); the magnetic poles on both ends of the PM magnetic pole (103) are provided for respectively executing EME interaction of bilateral coupling with the inner layer plate electric machinery structure (41) and the outer layer plate electric machinery structure (43) thus further constituting a coaxial 3-layer type plate electric machinery provided with an accumulative excitement winding being wound to the PM magnetic pole (103).

12. The electric machinery provided with a PM magnetic pole wrapped by the conduction winding excited magnetic pole as claimed in claim 1 is related to linearly coupled double layer type linear electric machinery comprised of two layers of linear electric machinery structures including the inner layer linear electric machinery structure (51) and the outer layer linear electric machinery structure (52), and is characterized as:

the PM magnetic pole (103) indicating accumulative excitement wrapped either in the mid section of the magnetic circuit of the conduction winding individual magnetic pole (101) or between the individual magnetic pole (101) and the magnetic circuit (102) to execute EME interaction with the outer layer linear electric machinery structure (52) is disposed on an EME coupling aspect of the inner layer linear electric machinery structure (51) in a direction facing the outer layer linear electric machinery structure (52); or the PM magnetic pole (103) indicating accumulative excitement wrapped either in the mid section of the magnetic circuit of the conduction winding individual magnetic pole (101) or between the individual magnetic pole (101) and the magnetic circuit (102) to execute EME interaction with the inner layer linear electric machinery structure (51) is disposed on an EME coupling aspect of the outer layer linear electric machinery structure (52) in a direction facing the inner layer linear electric machinery structure (51) thus to constitute a double layer type linear electric machinery provided with a PM magnetic pole (103) with accumulative excitement being wrapped between the conduction winding excited magnetic pole (101) and the magnetic circuit (102).

13. The electric machinery provided with a PM magnetic pole wrapped by the conduction winding excited magnetic pole as claimed in claim 1 is related to a linearly coupled 3-layer type linear electric machinery comprised of an inner layer, a mid layer, and the outer layer linear electric machinery structures including the inner layer linear electric machinery structure (61), the mid layer linear electric machinery structure (62), and the outer layer linear electric machinery structure (63), and is characterized as having:

a) an EME coupling aspect of the inner layer linear electric machinery structure (61) in a direction facing the mid layer linear electric machinery structure (62); or b) an EME coupling aspect of the mid layer linear electric machinery structure (62) in a direction facing the inner layer linear electric machinery structure (61); or c) an EME coupling aspect of the outer layer linear electric machinery structure (63) in a direction facing the mid layer linear electric machinery structure (62); or d) an EME coupling aspect of the mid layer linear electric machinery structure (62) in a direction facing the outer layer linear electric machinery structure (63);

the EME coupling aspects of above items a), b), c) and d) are respectively disposed with an conduction winding (100) excited individual magnetic pole (101), and the PM magnetic pole (103) indicating accumulative excitement is wrapped either in the mid section of the magnetic circuit of the individual magnetic pole (101) or between the individual magnetic pole (101) and the magnetic circuit (102) thus to constitute the 3-layer type linear electric machinery provided with the PM magnetic pole (103) with accumulative excitement being wrapped between the conduction winding excited magnetic pole (101) and the magnetic circuit (102).

14. The electric machinery provided with a PM magnetic pole wrapped by the conduction winding excited magnetic pole as claimed in claim 1 is related to a linearly coupled 3-layer type linear electric machinery comprised of an inner layer, a mid layer, and the outer layer linear electric machinery structures including the inner layer linear electric machinery structure (61), the mid layer linear electric machinery structure (62), and the outer layer linear electric machinery structure (63), and is characterized as having:

a) two EME coupling aspects respectively of the mid layer linear electric machinery structure (62) in a direction facing the outer layer linear electric machinery structure (63) and of the inner layer linear electric machinery structure (61) in a direction facing the mid layer linear electric machinery structure (62); or b) two EME coupling aspects respectively of the outer layer linear electric machinery structure (63) in a direction facing the mid layer linear electric machinery structure (62) and of the mid layer linear electric machinery structure (62) in a direction facing the inner layer linear electric machinery structure (61); or c) two EME coupling aspects respectively of the outer layer linear electric machinery structure (63) in a direction facing the mid layer linear electric machinery structure (62) and of the inner layer linear electric machinery structure (61) in a direction facing the mid layer linear electric machinery structure (62); or d) two EME coupling aspects on both sides of the mid layer linear electric machinery structure (62) respectively in a direction facing the outer layer linear electric machinery structure (63) and in another direction facing the inner layer linear electric machinery structure (61);

the EME coupling aspects of above items a), b), c) and d) are respectively disposed with an conduction winding (100) excited individual magnetic pole (101), and the PM magnetic pole (103) indicating accumulative excitement is wrapped either in the mid section of the magnetic circuit of the individual magnetic pole (101) or between the individual magnetic pole (101) and the magnetic circuit (102) thus to constitute the 3-layer type linear electric machinery provided with the PM magnetic pole (103) with accumulative excitement being wrapped by the conduction winding excited magnetic pole (101) and the magnetic circuit (102).

15. The electric machinery provided with a PM magnetic pole wrapped by the conduction winding excited magnetic pole as claimed in claim 1 is related to a linearly coupled 3-layer type linear electric machinery comprised of an inner layer, a mid layer, and the outer layer linear electric machinery structures including the inner layer linear electric machinery structure (61), the mid layer linear electric machinery structure (62), and the outer layer linear electric machinery structure (63), and is characterized as:

the mid layer electric machinery structure (62) is arrange to wrap a PM magnetic pole (103) by a permeable body to constitute a magnetic pole, and a conduction excitement winding (100) is wound to the PM magnetic pole (103); the magnetic poles on both ends of the PM magnetic pole (103) are provided for respectively executing EME interaction of bilateral coupling with the inner layer electric machinery structure (61) and the outer layer electric machinery structure (63) thus further constituting a 3-layer type linear electric machinery provided with an accumulative excitement winding being wound to the PM magnetic pole (103).

16. The electric machinery provided with a PM magnetic pole wrapped by the permeable conduction winding excited individual magnetic pole as claimed in claim 1, in the cylinder electric machinery structure with inner layer and outer layer electric machinery structures or coaxial 3-ring type electric machinery structure, or in the double layer type plate electric machinery structure or coaxial 3-layer type plate electric machinery structure, or in the double layer type linear electric machinery structure or 3-layer type linear electric machinery structure, wherein the permeable conduction winding excited individual magnetic pole disposed with a conduction winding and the magnetic circuit between magnetic poles wrap the PM magnetic pole and form a magnetic circuit made of permeable material on one or above one sides of the magnetic poles of different polarities of the PM magnetic poles to constitute a permeable magnetic circuit wrapped at least on one side or overall covering between two magnetic poles of different polarities of the PM magnetic pole for passing through partial magnetic line of force while the PM magnetic pole remains to form partial strength of the magnetic field on the pole-face of the magnetic pole disposed with a conduction winding coupled with the magnetic circuit so that when the PM magnetic pole being inversely excited in the course of the operation, two magnetic poles of different polarities on the PM magnetic pole keeps closed magnetic circuit to maintain its magnetic line of force so as to enhance the property to against inverse excitation.

17. The electric machinery provided with a PM magnetic pole wrapped by the permeable conduction winding excited individual magnetic pole as claimed in claim 1, wherein the applied structures include the cylinder electric machinery comprised of two structural components of electric machinery operating by EME interaction, the double layer type plate electric machinery, or the double layer type linear electric machinery for producing function of a generator, a motor, both a generator and a motor, an EME vortex coupling transmission, or EME vortex braking function; and its operating styles include:

a) either electric machinery structural component serves as a static portion of the electric machinery while another electric machinery structural component serves as a mobile portion of the electric machinery; or b) both electric machinery structural components function as the mobile portions of the electric machinery.

18. The electric machinery provided with a PM magnetic pole wrapped by the permeable conduction winding excited individual magnetic pole as claimed in claim 1, wherein the applied structure comprised of the electric machinery structure with three electric machinery structural components interacting by EME including the coaxial 3-ring type electric machinery, the coaxial 3-layer type plate electric machinery, the 3-layer type linear electric machinery or any other electric machinery structure that comprised of 3-piece electric machinery structure executing EME interaction for producing function of a generator, a motor, both a generator and a motor, an EME vortex coupling transmission, or EME vortex braking function; and its operating styles include:
  a) one EM structural component serves as a static portion of the electric machinery while the other two EM structural components serve as two mobile portions of the electric machinery; or
  b) two EM structural components serve as two static portions of the electric machinery while the third EM structural component serves as a mobile portion of the electric machinery; or
  c) all three EM structural components each serves as mobile portions of the electric machinery.

19. The electric machinery provided with a PM magnetic pole wrapped by the permeable conduction winding excited individual magnetic pole as claimed in claim 1, wherein selection and layout of the electric machinery structure and the winding for the electric machinery structural components including the permeable conduction winding excited individual magnetic pole for wrapping the PM magnetic pole and other structural components of the electric machinery to execute EME interaction are made according to the properties of the entire assembly of the electric machinery, nature of inputted electric energy, control function, control mode, and output performance requirements; according to the selection of EME operational properties and the quantity of disposed magnetic poles, the assembly of the electric machinery having a PM magnetic pole wrapped in the conduction winding excited magnetic pole include those available for operating in DC or AC revolution or linear electric machinery are comprised of commutator brush, brushless, ring-brush, synchronous, asynchronous, internal revolving, external revolving, revolving at the middle of the electric machinery, double-acting, triple-acting, multi-layer type, multi-ring type, linear, DC brushless, or inverter electric machinery, or an electric machinery functioning as a generator or as a motor, or functioning as both a generator and a motor, coupling transmission device, as an EME vortex coupling transmission device, or an EME vortex braking device.

20. The electric machinery provided with a PM magnetic pole wrapped by the conduction winding excited magnetic pole as claimed in claim 1, when applied in the cylinder electric machinery structure with inner layer and outer layer electric machinery structures or coaxial 3-ring type electric machinery structure, or in the double layer type plate electric machinery structure or coaxial 3-layer type plate electric machinery structure, or in the double layer type linear electric machinery structure or 3-layer type linear electric machinery structure, the magnetic pole (101) of a block shape or constituted by permeable laminated sheets that provided with a conduction winding (100) at where near the edge of the EME coupling aspect is disposed with a transverse rabbet, which indicates a linear or arcuate or any required geometric shape, or in a form of parallel along the EME coupling aspect for installing the PM magnetic pole (103) with corresponding shape, and an optional protective cap (1011), made of either permeable material or non-permeable material, is further disposed to one or both sides of the magnetic pole (101) as needed; constitution of the protective cap (1011) includes:
  a) a protective cap (1011) with the same length as the magnetic pole is disposed to one or both sides of the magnetic pole (101) of a block shape or constituted by permeable laminated sheets for clamping the magnetic pole (101) of a block shape or constituted by permeable laminated sheets that provided with a conduction winding (100) and for wrapping the PM magnetic pole (103); or
  b) a protective cap (1011) is disposed to one or both sides of the magnetic pole (101) provided with a conduction winding (100) for clamping the magnetic pole (101) constituted by permeable laminated sheets and wrapping the PM magnetic pole (103) whereof the protective cap (1011) extends in a direction facing the magnetic circuit (102) to connect with the magnetic circuit (102); or
  c) a protective cap (1011) is disposed to one or both sides of the magnetic pole (101) of a block structure that provided with a conduction winding (100) for clamping the block-shaped magnetic pole (101) and wrapping the PM magnetic pole (103) whereof the protective cap (1011) extends in a direction facing the magnetic circuit (102) to connect with the magnetic circuit (102); or
  d) a PM magnetic pole (103) which is thinner than the thickness of the magnetic pole (101) is disposed into the transverse rabbet, whereof a protective cap is stuffed into or a filler is added into one or both ends of the transverse rabbet.

21. The electric machinery provided with a PM magnetic pole wrapped by the conduction winding excited magnetic pole as claimed in claim 1, when applied in the cylinder electric machinery structure with inner layer and outer layer electric machinery structures or coaxial 3-ring type electric machinery structure, or in the double layer type plate electric machinery structure or coaxial 3-layer type plate electric machinery structure, or in the double layer type linear electric machinery structure or 3-layer type linear electric machinery structure, the magnetic pole (101) of a block shape or constituted by permeable laminated sheets that provided with a conduction winding (100) at where near the edge of the magnetic circuit (102) is disposed with an axial notch structure, whereof the concave bottom of the axial notch is a flat or curved surface or any required geometric shape, or in a form of parallel along the EME coupling aspect for installing the PM magnetic pole (103) with corresponding shape, and an optional protective cap (1012), made of either permeable material or non-permeable material, is further disposed to one or both sides of the magnetic pole (101) as needed; constitution of the protective cap (1012) includes:
  a) A protective cap is not disposed; or
  b) A protective cap (1012) is disposed to one or both sides of the magnetic pole (101) constituted by permeable laminated sheets that provided with a conduction winding (100) for clamping the magnetic pole (101) constituted by permeable laminated sheets whereof the protective cap (1012) extends in the direction of the magnetic circuit (102) to connect with the magnetic circuit (102); or
  c) A protective cap (1012) is disposed to one or both sides of the block-shaped magnetic pole (101) provided with a conduction winding (100) for clamping the block-shaped magnetic pole (101) whereof the protective cap (1012) extends in the direction of the magnetic circuit (102) to connect with the magnetic circuit (102); or
  d) On one or both sides of the integrally block-shaped magnetic pole (101) provided with a conduction winding (100) extends in a direction of the magnetic circuit (102) to connect with the magnetic circuit (102) so as to form a protective cap (1012) on one or both sides of the PM magnetic pole (103).

22. The electric machinery provided with a PM magnetic pole wrapped by the conduction winding excited magnetic pole as claimed in claim 1, when applied in the cylinder electric machinery structure with inner layer and outer layer electric machinery structures or coaxial 3-ring type electric machinery structure, or in the double layer type plate electric machinery structure or coaxial 3-layer type plate electric machinery structure, or in the double layer type linear electric machinery structure or 3-layer type linear electric machinery structure, wherein the magnetic pole (101) of a block shape or constituted by permeable laminated sheets that provided with a conduction winding (100) at where near the edge of the magnetic circuit (102) is disposed with an axial notch structure, whereof the concave bottom of the axial notch is a flat or curved surface or any required geometric shape, or in a form of parallel along the EME coupling aspect for installing the PM magnetic pole (103) with corresponding shape, and an optional protective cap (1013), made of either permeable material or non-permeable material, is further disposed to one or both sides of the magnetic pole (101) as needed; constitution of the protective cap (1013) includes:

a) A protective cap (1013) is disposed to one or both sides of the magnetic pole (101) provided with a conduction winding (100) for clamping the magnetic pole (101) constituted by permeable laminated sheets and sandwiching the PM magnetic pole (103); or b) A protective cap (1013) is disposed to one or both sides of the magnetic pole (101) constituted by permeable laminated sheets that provided with a conduction winding (100) for clamping the magnetic pole (101) constituted by permeable laminated sheets and sandwiching the PM magnetic pole (103) whereof the protective cap (1013) extends in the direction of the magnetic circuit (102) to connect with the magnetic circuit (102); or c) A protective cap (1013) is disposed to one or both sides of the magnetic pole (101) provided with a conduction winding (100) for clamping the block-shaped magnetic pole (101) and sandwiching the PM magnetic pole (103) whereof the protective cap (1013) extends in the direction of the magnetic circuit (102) to connect with the magnetic circuit (102); or d) One side of the magnetic pole (101) constituted by a block integrally that provided with a conduction winding (100) and the magnetic circuit (102) is disposed with a concave socket for installing the PM magnetic pole (103) with chosen geometric shape as needed whereof a protective cap (1014) on one or both sides of the integrally block-shaped magnetic pole (101) extends in the direction of the magnetic circuit (102) to connect with the magnetic circuit (102).

23. The electric machinery provided with a PM magnetic pole wrapped by the conduction winding excited magnetic pole as claimed in claim 1, when applied in the cylinder electric machinery structure with inner layer and outer layer electric machinery structures or coaxial 3-ring type electric machinery structure, or in the double layer type plate electric machinery structure or coaxial 3-layer type plate electric machinery structure, or in the double layer type linear electric machinery structure or 3-layer type linear electric machinery structure, wherein at where between the magnetic pole (101) of a block shape or constituted by permeable laminated sheets that provided with a conduction winding (100) and the magnetic circuit (102) is sandwiched with a PM magnetic pole (103) in chosen geometric shape as needed, and one or both sides of the PM magnetic pole (103) is further provided with a protective cap (1014) made of either permeable material or non-permeable material; constitution of the protective cap (1014) includes:

a) A protective cap (1014), made of permeable material, is disposed to one or both sides of the PM magnetic pole (103) whereof the length of the protective cap (1014) is selectable from at least covering across two magnetic poles of different polarities of the PM magnetic pole (103) to being the same length as the combined length of the magnetic pole (101) and the PM magnetic pole (103); or b) A protective cap (1014), made of permeable material, is disposed to one or both sides of the magnetic pole (101) constituted by permeable laminated sheets that provided with a conduction winding (100) for clamping the magnetic pole (101) constituted by permeable laminated sheets the length of the protective cap (1014) is selectable from at least covering across two magnetic poles of different polarities of the PM magnetic pole (103) to covering the combined length of the magnetic pole (101) and the PM magnetic pole (103) that extending at the direction facing the magnetic circuit (102) to connect with the magnetic circuit (102); or c) A protective cap (1014), made of permeable material, is disposed to one or both sides of the PM magnetic pole (103) for clamping the block-shaped magnetic pole (101) whereof the length of the protective cap (1014) is selectable from at least covering across two magnetic poles of different polarities of the PM magnetic pole (103) to covering the combined length of the magnetic pole (101) and the PM magnetic pole (103) that extending at the direction facing the magnetic circuit (102) to connect with the magnetic circuit (102); or d) At where between the magnetic pole (101) constituted by a block integrally that provided with a conduction winding (100) and the magnetic circuit (102) is disposed with a PM magnetic pole (103) with chosen geometric shape as needed whereof one or both sides of the integrally block-shaped magnetic pole (101) extends in the direction facing the magnetic circuit (102) so as to form a protective cap (1014) on one or both sides of the PM magnetic pole (103) to connect with the magnetic circuit (102).

* * * * *